US012809181B2

(12) United States Patent
Lee et al.

(10) Patent No.: US 12,809,181 B2
(45) Date of Patent: Nov. 24, 2026

(54) WEARABLE DEVICE, METHOD, AND NON-TRANSITORY COMPUTER-READABLE STORAGE MEDIUM FOR DISPLAYING SCREEN BASED ON VISUAL ACUITY OF USER

(71) Applicant: Samsung Electronics Co., Ltd., Suwon-si (KR)

(72) Inventors: Jungkun Lee, Suwon-si (KR); Sungyong Kim, Suwon-si (KR); Youngchan Lee, Suwon-si (KR); Jongwook Choi, Suwon-si (KR); Joayoung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/259,811

(22) Filed: Jul. 3, 2025

(65) Prior Publication Data

US 2026/0072277 A1 Mar. 12, 2026

Related U.S. Application Data

(63) Continuation of application No. PCT/KR2025/008264, filed on Jun. 16, 2025.

(30) Foreign Application Priority Data

Sep. 10, 2024 (KR) ........................ 10-2024-0123558
Oct. 15, 2024 (KR) ........................ 10-2024-0140672

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/01* (2013.01);
(Continued)

(58) Field of Classification Search
CPC .. G02B 27/01; G02B 27/017; G02B 27/0172; G02B 27/0093; G02B 27/0179;
(Continued)

(56) References Cited

U.S. PATENT DOCUMENTS 9,640,145 B2 5/2017 Cho
10,484,673 B2 11/2019 Jin
(Continued)

FOREIGN PATENT DOCUMENTS

JP 2024-122801 9/2024
KR 10-2015-0006128 1/2015
(Continued)

OTHER PUBLICATIONS

Search Report and Written Opinion dated Oct. 7, 2025 issued in International Patent Application No. PCT/KR2025/008264.

*Primary Examiner* — Cory A Almeida
(74) *Attorney, Agent, or Firm* — Nixon & Vanderhye, P.C.

(57) ABSTRACT

A wearable device is disclosed. The wearable device receives an input for changing a distance between a user and a virtual window. While receiving the input, based on changing the distance between the user and the virtual window from a first distance, the wearable device identifies that a size of the at least one content included in the virtual window at a second distance of the virtual window from the user, which is changed from the first distance, corresponds to visual acuity information of the user from the gaze of the user, and based on identifying the second distance of the virtual window based on the visual acuity information,
(Continued)

ceases changing the distance between the user and the virtual window according to the input being received.

13 Claims, 43 Drawing Sheets

(51) Int. Cl.

| | |
|---|---|
| ***G06F 1/16*** | (2006.01) |
| ***G06F 3/01*** | (2006.01) |
| ***G06F 3/04815*** | (2022.01) |
| ***G06F 3/0484*** | (2022.01) |
| ***G06T 19/00*** | (2011.01) |
| ***G06V 40/18*** | (2022.01) |
| ***G06V 40/20*** | (2022.01) |

(52) U.S. Cl.
CPC ........... *G02B 27/0179* (2013.01); *G06F 1/16* (2013.01); *G06F 3/01* (2013.01); *G06F 3/04815* (2013.01); *G06F 3/0484* (2013.01); *G06T 19/00* (2013.01); *G06V 40/18* (2022.01); *G06V 40/20* (2022.01); *G02B 2027/0138* (2013.01); *G02B 2027/0178* (2013.01); *G02B 2027/0185* (2013.01)

(58) Field of Classification Search
CPC .... G02B 2027/0138; G02B 2027/0185; G02B 2027/0178; G06F 1/16; G06F 3/01; G06F 3/04815; G06F 3/0484; G06T 19/00; G06V 40/18; G06V 40/20
See application file for complete search history.

(56) References Cited

U.S. PATENT DOCUMENTS

| | | | | |
|---|---|---|---|---|
| 11,366,328 | B1 * | 6/2022 | Marshall | H04N 23/69 |
| 2016/0011657 | A1 | 1/2016 | Estacio | |
| 2019/0114051 | A1 * | 4/2019 | McBeth | G06F 3/04815 |
| 2019/0371075 | A1 * | 12/2019 | Stafford | G06F 3/0482 |
| 2023/0103091 | A1 * | 3/2023 | Held | G02B 27/0172 345/630 |
| 2024/0289927 | A1 | 8/2024 | Fujiwara | |
| 2024/0353680 | A1 | 10/2024 | Browy et al. | |

FOREIGN PATENT DOCUMENTS

| | | | |
|---|---|---|---|
| KR | 101658629 | B1 | 9/2016 |
| KR | 10-2017-0026615 | | 3/2017 |
| KR | 20180052501 | A | 5/2018 |
| KR | 102303115 | B1 | 9/2021 |
| KR | 10-2546994 | | 6/2023 |
| KR | 20230130773 | A | 9/2023 |
| KR | 20240047458 | A | 4/2024 |
| WO | 2023049418 | A2 | 3/2023 |

* cited by examiner

WEARABLE DEVICE, METHOD, AND NON-TRANSITORY COMPUTER-READABLE STORAGE MEDIUM FOR DISPLAYING SCREEN BASED ON VISUAL ACUITY OF USER

CROSS-REFERENCE TO RELATED APPLICATIONS

This application is a continuation of International Application No. PCT/KR2025/008264 designating the United States, filed on Jun. 16, 2025, in the Korean Intellectual Property Receiving Office and claiming priority to Korean Patent Application Nos. 10-2024-0123558, filed on Sep. 10, 2024, and 10-2024-0140672, filed on Oct. 15, 2024, in the Korean Intellectual Property Office, the disclosures of each of which are incorporated by reference herein in their entireties.

BACKGROUND

Field

The disclosure relates to a wearable device, a method, and a non-transitory computer readable storage medium for displaying a screen based on visual acuity of a user.

Description of Related Art

In order to provide an enhanced user experience, an electronic device that provides an augmented reality (AR) service displaying information generated by a computer in conjunction with an external object in the real-world is being developed. The electronic device may be a wearable device that may be worn by a user. For example, the electronic device may be AR glasses and/or a head-mounted device (HMD). A display of the electronic device may display a screen of an external electronic device.

SUMMARY

According to an example embodiment, a wearable device is disclosed. The wearable device may comprise: a display assembly including displays arranged directly to eyes of a user, based on the user wearing the wearable device, at least one processor comprising processing circuitry, and memory, comprising one or more storage mediums, storing instructions. The instructions, when executed by the at least one processor individually or collectively, may cause the wearable device to: display a virtual window including at least one content at a position at a first distance from the user on a gaze of the user on the display assembly; receive an input for changing a distance between the user and the virtual window; while receiving the input, based on changing the distance between the user and the virtual window from the first distance, identify that a size of the at least one content included in the virtual window at a second distance of the virtual window from the user, changed from the first distance, corresponds to visual acuity information of the user from the gaze of the user; and based on identifying the second distance of the virtual window based on the visual acuity information, cease changing the distance between the user and the virtual window according to the input being received.

According to an example embodiment, a method is disclosed. The method may be performed by a wearable device including a display assembly including displays arranged directly to eyes of a user, based on the user wearing the wearable device. The method may comprise: displaying a virtual window including at least one content at a position at a first distance from the user on a gaze of the user on the display assembly; receiving an input for changing a distance between the user and the virtual window; while receiving the input, based on changing the distance between the user and the virtual window from the first distance, identifying that a size of the at least one content included in the virtual window at a second distance of the virtual window from the user, changed from the first distance, corresponds to visual acuity information of the user from the gaze of the user; and based on identifying the second distance of the virtual window based on the visual acuity information, ceasing changing the distance between the user and the virtual window according to the input being received.

According to an example embodiment non-transitory computer-readable storage medium is disclosed. The non-transitory computer-readable storage medium may store a program including instructions. The instructions, when executed by at least one processor, comprising processing circuitry, individually or collectively of a wearable device comprising a display assembly including displays arranged directly to eyes of a user, based on the user wearing the wearable device, may cause the wearable device to: display a virtual window including at least one content at a position at a first distance from the user on a gaze of the user on the display assembly; receive an input for changing a distance between the user and the virtual window; while receiving the input, based on changing the distance between the user and the virtual window from the first distance, identify that a size of the at least one content included in the virtual window at a second distance of the virtual window from the user, changed from the first distance, corresponds to visual acuity information of the user from the gaze of the user; and based on identifying the second distance of the virtual window based on the visual acuity information, cease changing the distance between the user and the virtual window according to the input being received.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
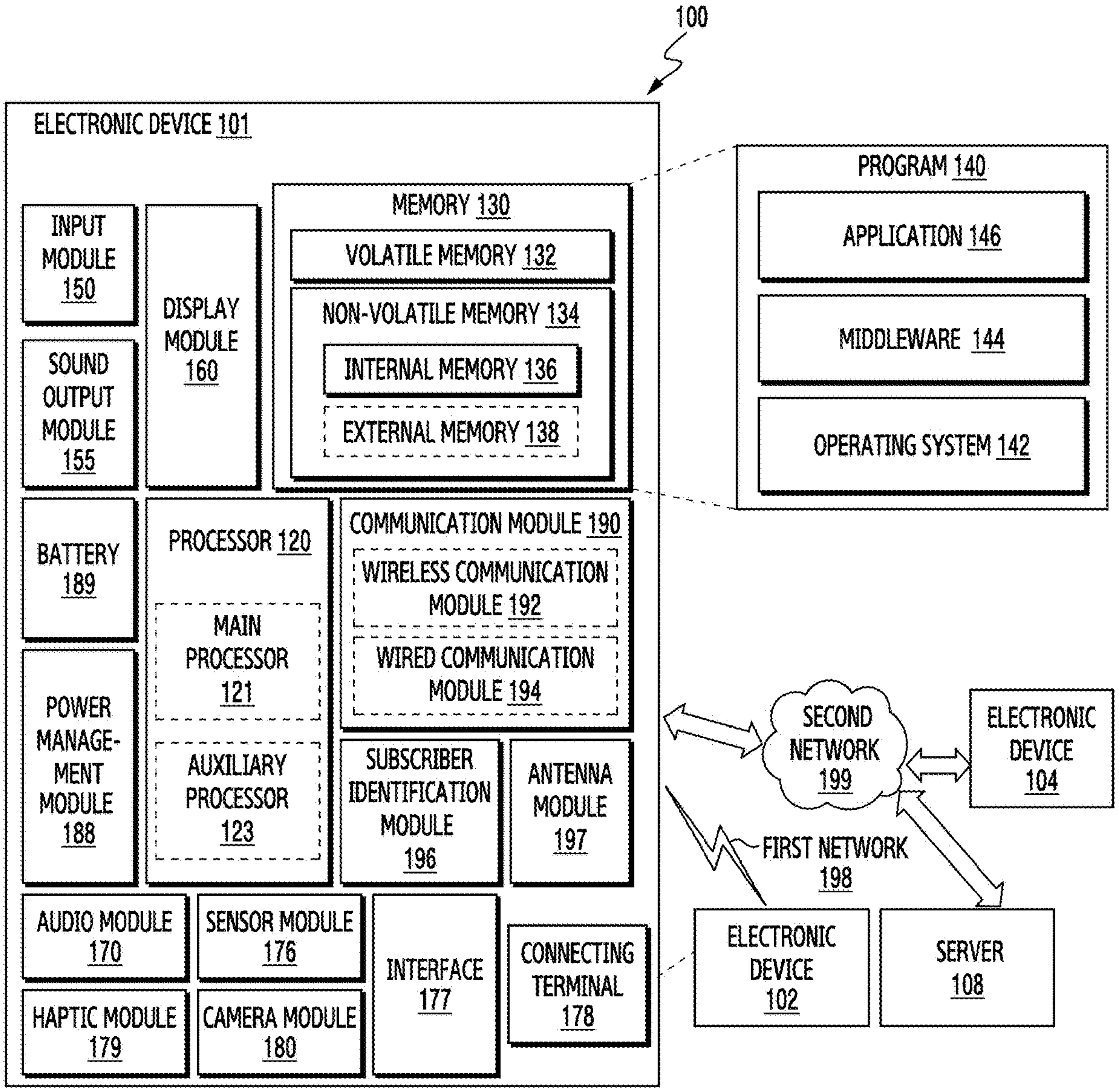
FIG. 1 is a block diagram of illustrating an example electronic device in a network environment according to various embodiments.

FIG. 1 is a block diagram of illustrating an example electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121. Thus, the processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
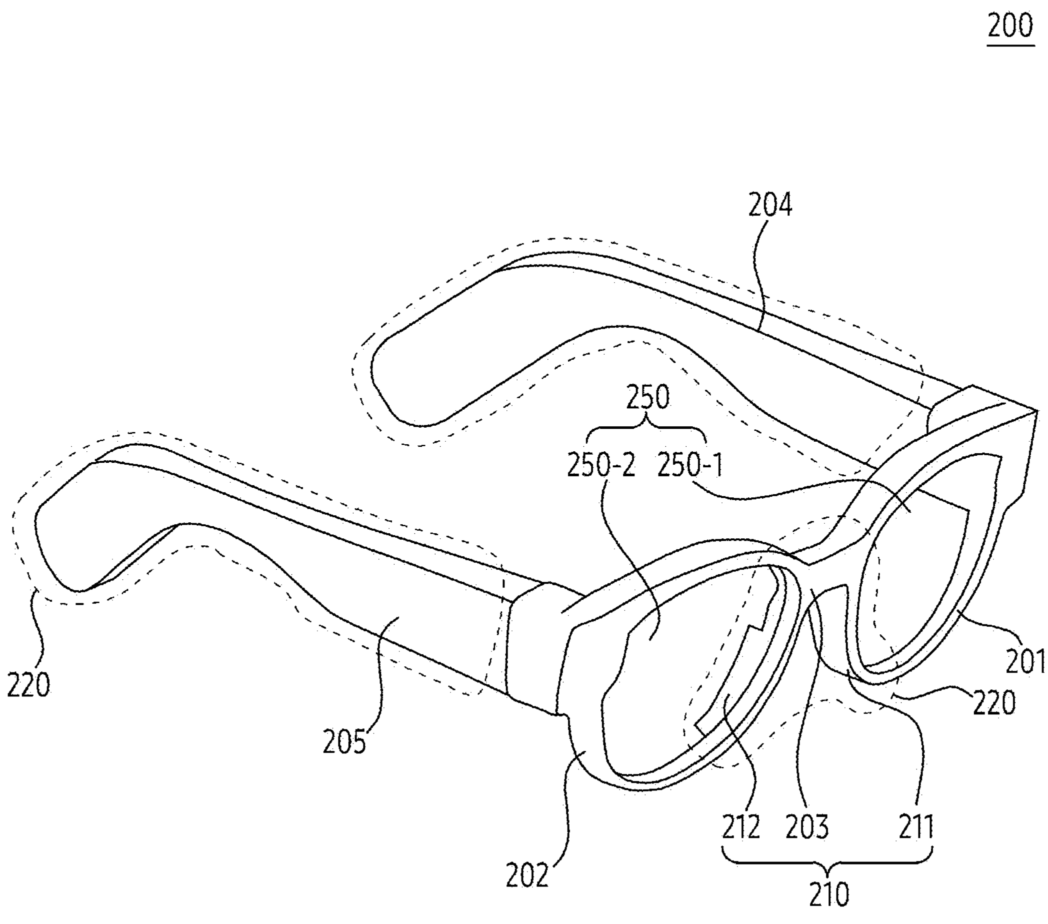
FIG. 2A is a perspective view of an example wearable device according to various embodiments.
Figure 2B:
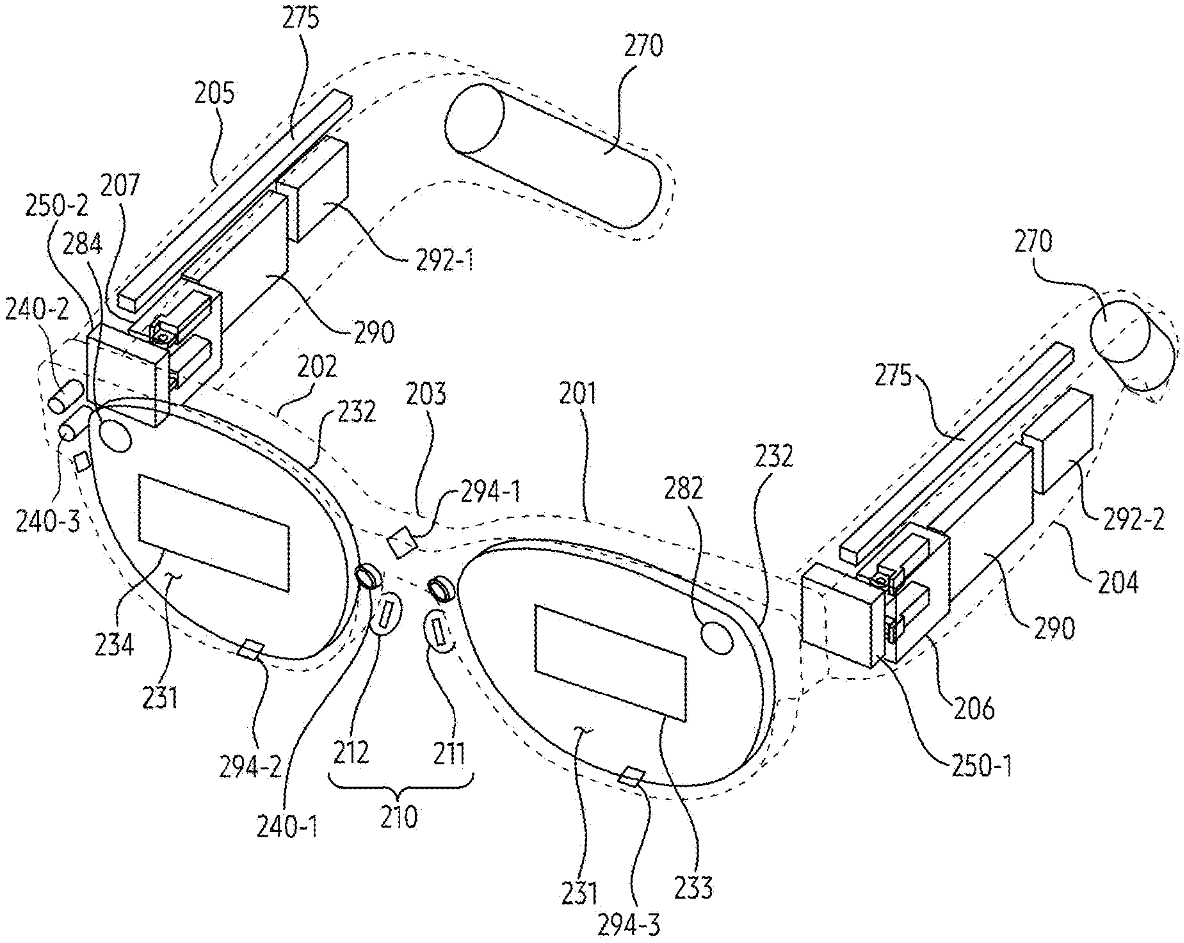
FIG. 2B is a perspective view illustrating one or more hardware disposed in an example wearable device according to various embodiments.

FIG. 2A is a perspective view illustrating an example wearable device 200 according to various embodiments. FIG. 2B is a perspective view illustrating an example of one or more hardware disposed in the wearable device 200 according to various embodiments. The wearable device 200 of FIGS. 2A and 2B may correspond to the electronic device 101 of FIG. 1. As shown in FIG. 2A, the wearable device 200 according to an embodiment may include at least one display 250 and a frame supporting the at least one display 250.

According to an embodiment, the wearable device 200 may be wearable on a portion of the user's body. The wearable device 200 may provide augmented reality (AR), virtual reality (VR), or mixed reality (MR) combining the augmented reality and the virtual reality to a user wearing the wearable device 200. For example, the wearable device 200 may output a virtual reality image through at least one display 250, in response to a user's preset (e.g., specified) gesture obtained through a motion recognition camera 240-2 of FIG. 2B.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 2B, the at least one display 250 may form a display area on the lens to provide a user wearing the wearable device 200 with visual information included in ambient light passing through the lens and other visual information distinct from the visual information. The lens may be formed based on at least one of a fresnel lens, a pancake lens, or a multi-channel lens. The display area formed by the at least one display 250 may be formed on the second surface 232 of the first surface 231 and the second surface 232 of the lens. When the user wears the wearable device 200, ambient light may be transmitted to the user by being incident on the first surface 231 and being penetrated through the second surface 232. For another example, the at least one display 250 may display a virtual reality image to be coupled with a reality screen transmitted through ambient light. The virtual reality image output from the at least one display 250 may be transmitted to eyes of the user, through one or more hardware (e.g., optical devices 282 and 284, and/or at least one waveguides 233 and 234) included in the wearable device 200.

According to an embodiment, the wearable device 200 may include waveguides 233 and 234 that transmit light transmitted from the at least one display 250 and relayed by the at least one optical device 282 and 284 by diffracting to the user. The waveguides 233 and 234 may be formed based on at least one of glass, plastic, or polymer. A nano pattern may be formed on at least a portion of the outside or inside of the waveguides 233 and 234. The nano pattern may be formed based on a grating structure having a polygonal or curved shape. Light incident to an end of the waveguides 233 and 234 may be propagated to another end of the waveguides 233 and 234 by the nano pattern. The waveguides 233 and 234 may include at least one of at least one diffraction element (e.g., a diffractive optical element (DOE), a holographic optical element (HOE)), and a reflection element (e.g., a reflection mirror). For example, the waveguides 233 and 234 may be disposed in the wearable device 200 to guide a screen displayed by the at least one display 250 to the user's eyes. For example, the screen may be transmitted to the user's eyes through total internal reflection (TIR) generated in the waveguides 233 and 234.

According to an embodiment, the wearable device 200 may analyze an object included in a real image collected through a photographing camera 240-1, combine with a virtual object corresponding to an object that become a subject of augmented reality provision among the analyzed object, and display on the at least one display 250. The virtual object may include at least one of text and images for various information associated with the object included in the real image. The wearable device 200 may analyze the object based on a multi-camera such as a stereo camera. For the object analysis, the wearable device 200 may execute time-of-flight (ToF) and/or simultaneous localization and mapping (SLAM) supported by the multi-camera. The user wearing the wearable device 200 may watch an image displayed on the at least one display 250.

According to an embodiment, a frame may be configured with a physical structure in which the wearable device 200 may be worn on the user's body. According to an embodiment, the frame may be configured so that when the user wears the wearable device 200, the first display 250-1 and the second display 250-2 may be positioned corresponding to the user's left and right eyes. The frame may support the at least one display 250. For example, the frame may support the first display 250-1 and the second display 250-2 to be positioned at positions corresponding to the user's left and right eyes.

Referring to FIG. 2A, according to an embodiment, the frame may include an area 220 at least partially in contact with the portion of the user's body in case that the user wears the wearable device 200. For example, the area 220 of the frame in contact with the portion of the user's body may include an area in contact with a portion of the user's nose, a portion of the user's ear, and a portion of the side of the user's face that the wearable device 200 contacts. According to an embodiment, the frame may include a nose pad 210 that is contacted on the portion of the user's body. When the wearable device 200 is worn by the user, the nose pad 210 may be contacted on the portion of the user's nose. The frame may include a first temple 204 and a second temple 205, which are contacted on another portion of the user's body that is distinct from the portion of the user's body.

For example, the frame may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the wearable device 200 may identify an external object (e.g., a user's fingertip) touching the frame and/or a gesture performed by the external object using a touch sensor, a grip sensor, and/or a proximity sensor formed on at least a portion of the surface of the frame.

According to an embodiment, the wearable device 200 may include hardware (e.g., hardware described above based on the block diagram of FIG. 1) that performs various functions. For example, the hardware may include a battery module 270, an antenna module 275, optical devices 282 and 284, speakers 292-1 and 292-2, microphones 294-1, 294-2, and 294-3, a depth sensor module (not illustrated), and/or a printed circuit board (PCB) 290. Various hardware may be disposed in the frame.

According to an embodiment, the microphones 294-1, 294-2, and 294-3 of the wearable device 200 may obtain a sound signal, by being disposed on at least a portion of the frame. The first microphone 294-1 disposed on the nose pad 210, the second microphone 294-2 disposed on the second rim 202, and the third microphone 294-3 disposed on the first rim 201 are illustrated in FIG. 2B, but the number and disposition of the microphone 294 are not limited to an embodiment of FIG. 2B. In a case that the number of the microphone 294 included in the wearable device 200 is two or more, the wearable device 200 may identify a direction of the sound signal using a plurality of microphones disposed on different portions of the frame.

According to an embodiment, the optical devices 282 and 284 may transmit a virtual object transmitted from the at least one display 250 to the wave guides 233 and 234. For example, the optical devices 282 and 284 may be projectors. The optical devices 282 and 284 may be disposed adjacent to the at least one display 250 or may be included in the at least one display 250 as a portion of the at least one display 250. The first optical device 282 may correspond to the first display 250-1, and the second optical device 284 may correspond to the second display 250-2. The first optical device 282 may transmit light output from the first display 250-1 to the first waveguide 233, and the second optical device 284 may transmit light output from the second display 250-2 to the second waveguide 234.

In an embodiment, a camera 240 may include an eye tracking camera (ET CAM) 240-1, a motion recognition camera 240-2 and/or the photographing camera 240-3. The photographing camera, the eye tracking camera 240-1, and the motion recognition camera 240-2 may be disposed at different positions on the frame and may perform different functions. The eye tracking camera 240-1 may output data indicating a gaze of the user wearing the wearable device 200. For example, the wearable device 200 may detect the gaze from an image including the user's pupil, obtained through the eye tracking camera 240-1. An example in which the eye tracking camera 240-1 is disposed toward the user's right eye is illustrated in FIG. 2B, but the disclosure is not limited thereto, and the eye tracking camera 240-1 may be disposed alone toward the user's left eye or may be disposed toward two eyes.

In an embodiment, the photographing camera 240-3 may photograph a real image or background to be matched with a virtual image in order to implement the augmented reality or mixed reality content. The photographing camera may photograph an image of a specific object existing at a position viewed by the user and may provide the image to the at least one display 250. The at least one display 250 may display one image in which a virtual image provided through the optical devices 282 and 284 is overlapped with information on the real image or background including the image of the specific object obtained using the photographing camera. In an embodiment, the photographing camera may be disposed on the bridge 203 disposed between the first rim 201 and the second rim 202.

In an embodiment, the eye tracking camera 240-1 may implement a more realistic augmented reality by matching the user's gaze with the visual information provided on the at least one display 250, by tracking the gaze of the user wearing the wearable device 200. For example, when the user looks at the front, the wearable device 200 may naturally display environment information associated with the user's front on the at least one display 250 at a position where the user is positioned. The eye tracking camera 240-1 may be configured to capture an image of the user's pupil in order to determine the user's gaze. For example, the eye tracking camera 240-1 may receive gaze detection light reflected from the user's pupil and may track the user's gaze based on the position and movement of the received gaze detection light. In an embodiment, the eye tracking camera 240-1 may be disposed at a position corresponding to the user's left and right eyes. For example, the eye tracking camera 240-1 may be disposed in the first rim 201 and/or the second rim 202 to face the direction in which the user wearing the wearable device 200 is positioned.

The motion recognition camera 240-2 may provide a specific event to the screen provided on the at least one display 250 by recognizing the movement of the whole or portion of the user's body, such as the user's torso, hand, or face. The motion recognition camera 240-2 may obtain a signal corresponding to motion by recognizing the user's gesture, and may provide a display corresponding to the signal to the at least one display 250. A processor may identify a signal corresponding to the operation and may perform a preset function based on the identification. In an embodiment, the motion recognition camera 240-2 may be disposed on the first rim 201 and/or the second rim 202.

In an embodiment, the camera 240 included in the wearable device 200 is not limited to the above-described eye tracking camera 240-1 and the motion recognition camera 240-2. For example, the wearable device 200 may identify an external object included in the FoV using the photographing camera 240-3 disposed toward the user's FoV. The wearable device 200 identifying the external object may be performed based on a sensor for identifying a distance between the wearable device 200 and the external object, such as a depth sensor and/or a time of flight (ToF) sensor. The camera 240 disposed toward the FoV may support an autofocus function and/or an optical image stabilization (OIS) function. For example, in order to obtain an image including a face of the user wearing the wearable device 200, the wearable device 200 may include the camera 240 (e.g., a face tracking (FT) camera) disposed toward the face.

Although not illustrated, the wearable device 200 according to an embodiment may further include a light source (e.g., LED) that emits light toward a subject (e.g., user's eyes, face, and/or an external object in the FoV) photographed using the camera 240. The light source may include an LED having an infrared wavelength. The light source may be disposed on at least one of the frame, and the hinge units 206 and 207.

According to an embodiment, the battery module 270 may supply power to electronic components of the wearable device 200. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In an embodiment, the battery module 270 may be disposed at an end of the first temple 204 and/or the second temple 205.

The antenna module 275 may transmit the signal or power to the outside of the wearable device 200 or may receive the signal or power from the outside. The antenna module 275 may be electrically and/or operably connected to the communication module 190 of FIG. 1. In an embodiment, the antenna module 275 may be disposed in the first temple 204 and/or the second temple 205. For example, the antenna module 275 may be disposed close to one surface of the first temple 204 and/or the second temple 205.

According to an embodiment, the speakers 292-1 and 292-2 may output a sound signal to the outside of the wearable device 200. A sound output module may be referred to as a speaker. In an embodiment, the speakers 292-1 and 292-2 may be disposed in the first temple 204 and/or the second temple 205 in order to be disposed adjacent to the ear of the user wearing the wearable device 200. For example, the wearable device 200 may include a second speaker 292-2 disposed adjacent to the user's left ear by being disposed in the first temple 204, and a first speaker 292-1 disposed adjacent to the user's right ear by being disposed in the second temple 205.

According to an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 200 to the user. For example, when the wearable device 200 requires charging, it may emit repeatedly red light at a specific timing. In an embodiment, the light emitting module may be disposed on the first rim 201 and/or the second rim 202.

Referring to FIG. 2B, according to an embodiment, the wearable device 200 may include the printed circuit board (PCB) 290. The PCB 290 may be included in at least one of the first temple 204 or the second temple 205. The PCB 290 may include an interposer disposed between at least two sub PCBs. On the PCB 290, one or more hardware included in the wearable device 200 may be disposed. The wearable device 200 may include a flexible PCB (FPCB) for interconnecting the hardware.

According to an embodiment, the wearable device 200 may include at least one of a gyro sensor, a gravity sensor, and/or an acceleration sensor for detecting the posture of the wearable device 200 and/or the posture of a body part (e.g., a head) of the user wearing the wearable device 200. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 200 may identify the user's motion and/or gesture performed to execute or stop a specific function of the wearable device 200 based on the IMU.

Figure 3A:
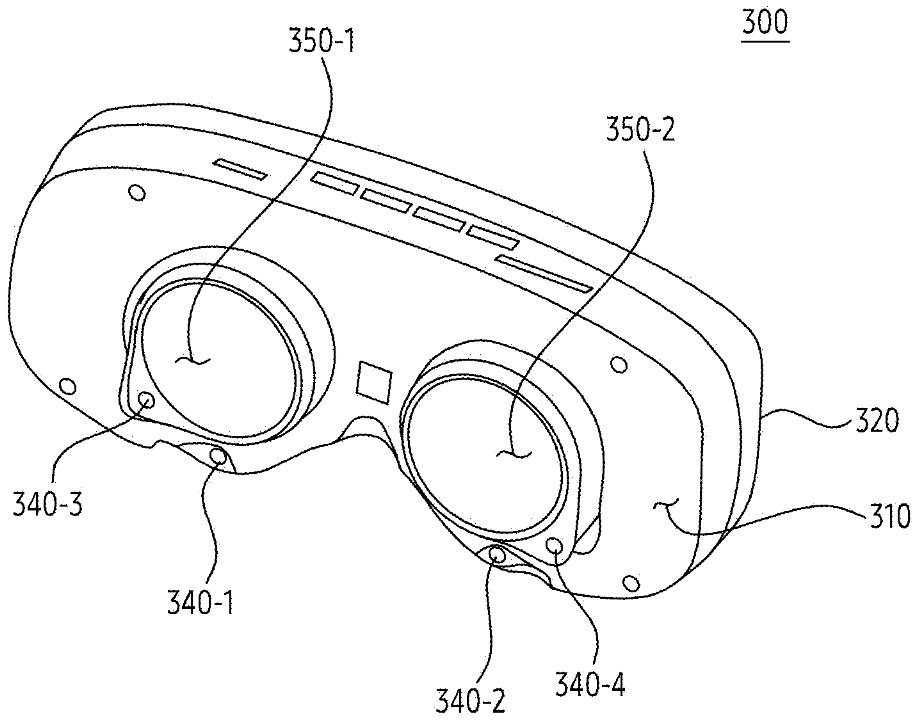
FIG. 3A is a perspective view illustrating an example of an exterior of a wearable device according to various embodiments.
Figure 3B:
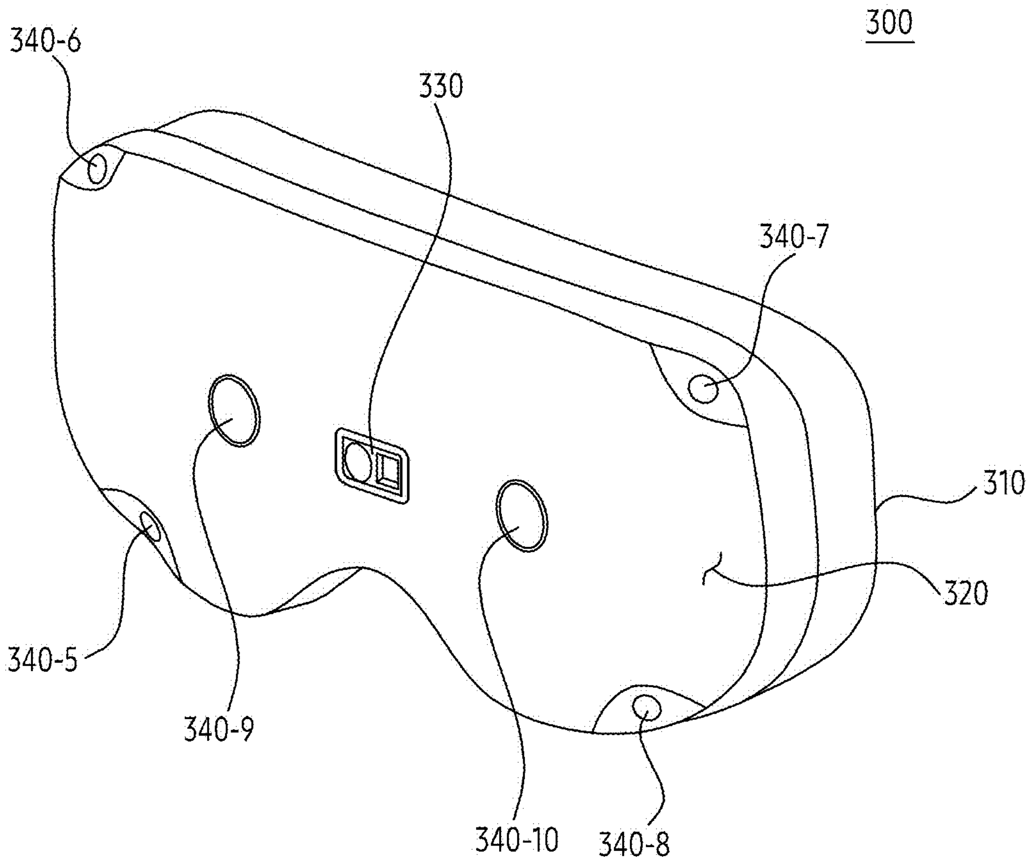
FIG. 3B is a perspective view illustrating an example of an exterior of a wearable device according to various embodiments.

FIGS. 3A and 3B are perspective views illustrating an example of an exterior of a wearable device 300 according to various embodiments. The wearable device 300 of FIGS. 3A and 3B may be included in the electronic device 101 of FIG. 1. According to an embodiment, an example of an exterior of a first surface 310 of a housing of the wearable device 300 is illustrated in FIG. 3A, and an example of an exterior of a second surface 320 opposite to the first surface 310 may be illustrated in FIG. 3B.

Referring to FIG. 3A, according to an embodiment, the first surface 310 of the wearable device 300 may have an attachable shape on the user's body part (e.g., the user's face). Although not illustrated, the wearable device 300 may further include a strap for being fixed on the user's body part, and/or one or more temples (e.g., the first temple 204 and/or the second temple 205 of FIGS. 2A to 2B). A first display 350-1 for outputting an image to the left eye among the user's two eyes and a second display 350-2 for outputting an image to the right eye among the user's two eyes may be disposed on the first surface 310. The wearable device 300 may further include rubber or silicon packing, which are formed on the first surface 310, for preventing and/or reducing interference by light (e.g., ambient light) different from the light emitted from the first display 350-1 and the second display 350-2.

According to an embodiment, the wearable device 300 may include cameras 340-1 and 340-2 for photographing and/or tracking two eyes of the user adjacent to each of the first display 350-1 and the second display 350-2. The cameras 340-1 and 340-2 may be referred to as the ET camera. According to an embodiment, the wearable device 300 may include cameras 340-3 and 340-4 for photographing and/or recognizing the user's face. The cameras 340-3 and 340-4 may be referred to as a FT camera.

Referring to FIG. 3B, a camera (e.g., cameras 340-5, 340-6, 340-7, 340-8, 340-9, and 340-10), and/or a sensor (e.g., the depth sensor 330) for obtaining information associated with the external environment of the wearable device 300 may be disposed on the second surface 320 opposite to the first surface 310 of FIG. 3A. For example, the cameras 340-5, 340-6, 340-7, 340-8, 340-9, and 340-10 may be disposed on the second surface 320 in order to recognize an external object distinct from the wearable device 300. For example, using cameras 340-9 and 340-10, the wearable device 300 may obtain an image and/or video to be transmitted to each of the user's two eyes. The camera 340-9 may be disposed on the second surface 320 of the wearable device 300 to obtain an image to be displayed through the second display 350-2 corresponding to the right eye among the two eyes. The camera 340-10 may be disposed on the second surface 320 of the wearable device 300 to obtain an image to be displayed through the first display 350-1 corresponding to the left eye among the two eyes.

According to an embodiment, the wearable device 300 may include the depth sensor 330 disposed on the second surface 320 in order to identify a distance between the wearable device 300 and the external object. Using the depth sensor 330, the wearable device 300 may obtain spatial information (e.g., a depth map) about at least a portion of the FoV of the user wearing the wearable device 300.

Although not illustrated, a microphone for obtaining sound output from the external object may be disposed on the second surface 320 of the wearable device 300. The number of microphones may be one or more according to embodiments.

As described above, the wearable device 300 according to an embodiment may have a form factor for being worn on a head of a user. The wearable device 300 may provide a user experience based on augmented reality, virtual reality, and/or mixed reality in a state of being worn on the head. Using the cameras 340-5, 340-6, 340-7, 340-8, 340-9, and 340-10 for recording a video for an external space, the wearable device 300 and a server (e.g., the server 110 of FIG. 1) connected to the wearable device 300 may provide an on-demand service and/or a metaverse service that provides video of a location and/or a place selected by the user.

According to an embodiment, the wearable device 300 may display frames obtained through the cameras 340-9 and 340-10 on each of the first display 350-1 and the second display 350-2. The wearable device 300 may provide the user with a user experience (e.g., video see-through (VST)) in which a real object and a virtual object are mixed, by coupling the virtual object in a frame including the real object and displayed through the first display 350-1 and the second display 350-2. The wearable device 300 may change the virtual object based on information obtained by the cameras 340-1, 340-2, 340-3, 340-4, 340-5, 340-6, 340-7, and 340-8 and/or the depth sensor 330. For example, in a case that a visual object corresponding to a real object and a virtual object are at least partially overlapped in the frame, the wearable device 300 may cease displaying the virtual object based on detecting a motion to interact with the real object. By ceasing displaying the virtual object, the wearable device 300 may prevent and/or reduce visibility of the real object from being reduced as the visual object corresponding to the real object is occluded by the virtual object.

Figure 4A:
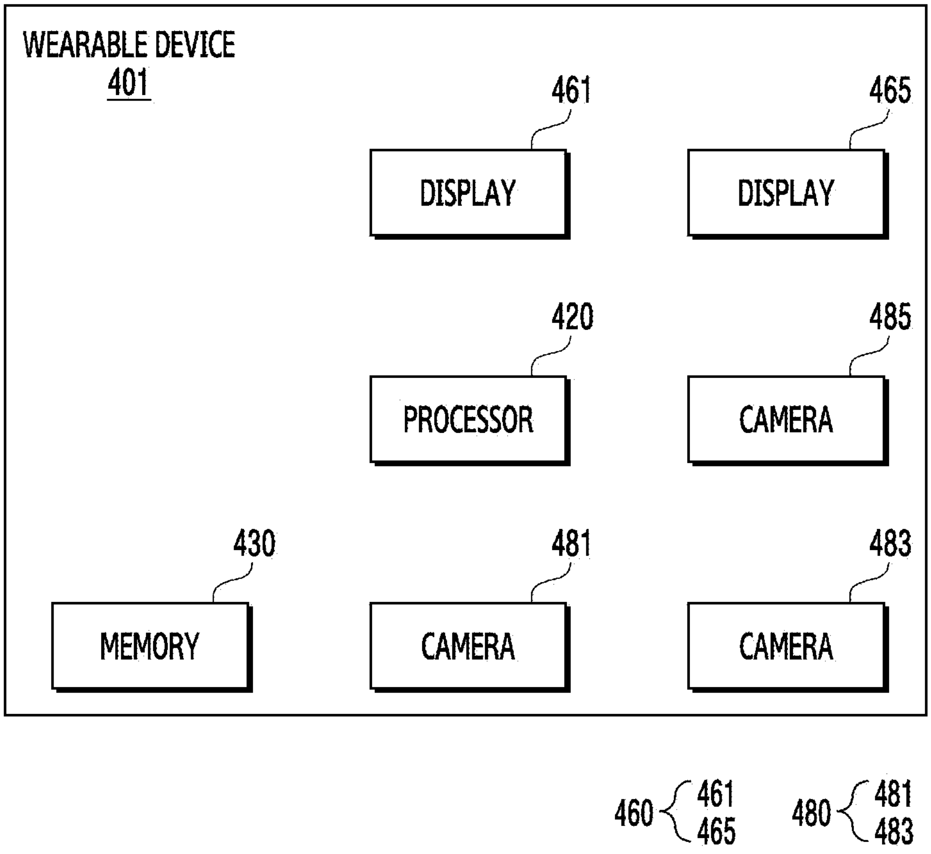
FIG. 4A is a block diagram illustrating an example configuration of a wearable device according to various embodiments.
Figure 4B:
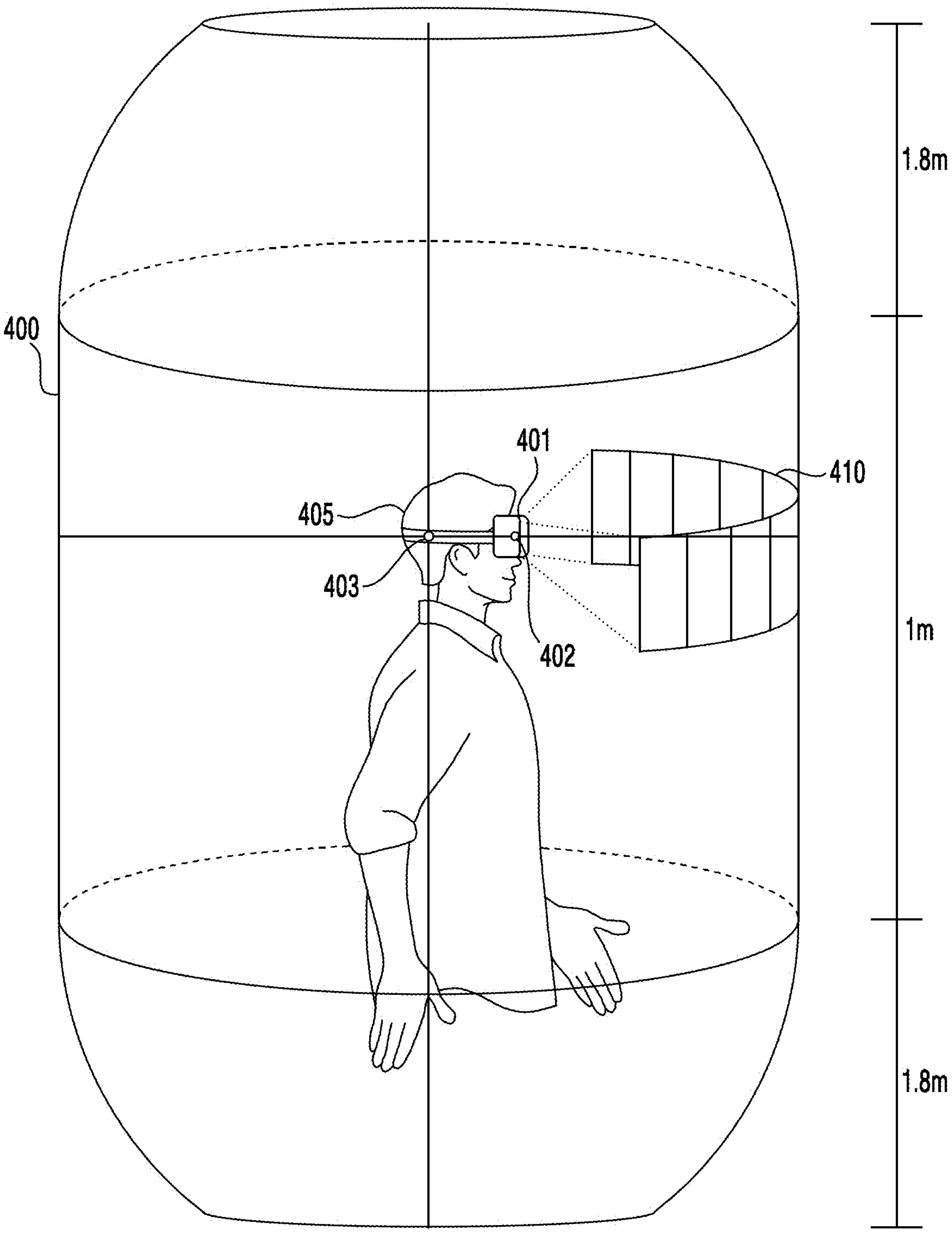
FIG. 4B is a diagram illustrating an example of a virtual three-dimensional space described by a wearable device according to various embodiments.
Figure 4C:
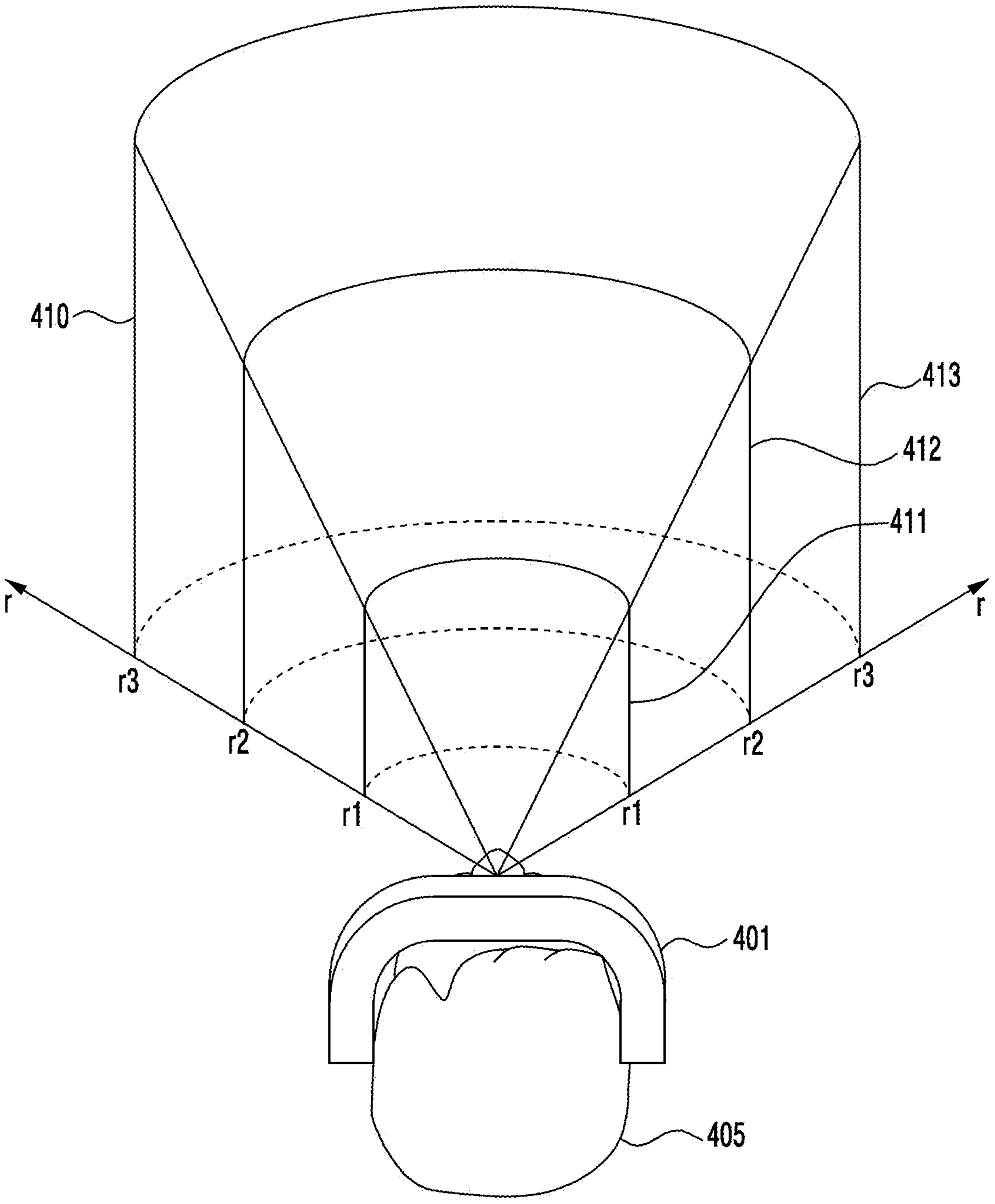
FIG. 4C is a diagram illustrating an example of a field of view of a user displayed by a wearable device according to various embodiments.

FIG. 4A is a block diagram illustrating an example configuration of a wearable device according to various embodiments. FIG. 4B is a diagram illustrating an example of a virtual three-dimensional space described by a wearable device according to various embodiments. FIG. 4C is a diagram illustrating an example of a field of view of a user displayed by a wearable device according to various embodiments.

A wearable device 401 of FIG. 4A may correspond to the electronic device 101 of FIG. 1. The wearable device 401 of FIG. 4A may correspond to the wearable device 200 of FIGS. 2A and 2B. The wearable device 401 of FIG. 4A may correspond to the wearable device 300 of FIGS. 3A and 3B.

Referring to FIG. 4A, the wearable device 401 may include at least one of a processor (e.g., including processing circuitry) 420, memory 430, displays 461 and 465, and/or cameras 481, 483, and 485. The processor 420 of FIG. 4A may correspond to the processor 120 of FIG. 1 and the detailed description above regarding processor 120 applies equally to the processor 420. The memory 430 of FIG. 4A may correspond to the memory 130 of FIG. 1. The displays 461 and 465 of FIG. 4A may correspond to the display module 160 of FIG. 1. The cameras 481, 483, and 485 of FIG. 4A may correspond to the camera module 180 of FIG. 1.

In an embodiment, the processor 420 may include various processing circuitry including a hardware component for processing data based on one or more instructions. The hardware component for processing data may include, for example, an arithmetic and logic unit (ALU), a field programmable gate array (FPGA), and/or a central processing unit (CPU). The number of the processors 420 may be one or more. For example, the processor 420 may have a structure of a multi-core processor such as a dual core, a quad core, or a hexa core.

In an embodiment, the memory 430 may include a hardware component for storing data and/or instructions input to and/or output from the processor 420. The memory 430 may include, for example, volatile memory, such as random-access memory (RAM), and/or non-volatile memory, such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, a hard disk, a compact disk, and an embedded multi media card (eMMC).

In an embodiment, the displays 461 and 465 may output visualized information to a user 405 of the wearable device 401. For example, the displays 461 and 465 may output the visualized information to the user 405 by being controlled by the processor 420 including circuitry such as a graphic processing unit (GPU). The displays 461 and 465 may include a flat panel display (FPD) and/or electronic paper. The FPD may include a liquid crystal display (LCD), a plasma display panel (PDP), and/or one or more light emitting diodes (LEDs). The LED may include an organic LED (OLED).

In an embodiment, the displays 461 and 465 may be arranged respectively toward eyes of the user 405 when the wearable device 401 is worn by the user 405. In an embodiment, the displays 461 and 465 may be referred to as a display assembly 460. In an embodiment, the display assembly 460 may correspond to the display 250 of FIGS. 2A and 2B, or the display 350 of FIGS. 3A and 3B.

In an embodiment, referring to FIG. 4B, the display assembly 460 may provide a field of view (FOV) 410 to the user 405 in a three-dimensional virtual space 400 (or a boundary). In an embodiment, the FOV 410 may refer, for example, to an area viewable by the user 405. In an embodiment, the FOV 410 may refer, for example, to a display area of the wearable device 401 viewable by the user 405. In an embodiment, the FOV 410 may be a three-dimensional area viewable by the user 405 based on a point (or a field of view) that the user 405 views in the three-dimensional virtual space 400 (or the boundary). In an embodiment, the three-dimensional virtual space 400 may be in a form of a capsule. A size of the virtual space 400 in the form of the capsule may be set in consideration of the user 405 (e.g., a height of the user 405). As an example, a height of an upper hemisphere and a lower hemisphere of the virtual space 400 may be set to approximately 1.8 m. A height of a cylindrical portion between the upper hemisphere and the lower hemisphere may be set to approximately 1 m. A total height of the virtual space 400 including the upper hemisphere, the lower hemisphere, and the cylindrical portion may be set to approximately 4.6 m.

A content (or an object) may be displayed in a certain area (or the FOV 401) including a surface of the virtual space 400. A content displayed near the surface of the virtual space 400 may be displayed at different distances from the user according to a type. As an example, a task window and/or an application may be displayed at a distance of approximately 1.3 m to approximately 2 m from a center point 402 of the user. A system-related object may be displayed at a distance of approximately 0.7 m from the center point 402 of the user.

When generating the virtual space 400, the wearable device 401 may generate the virtual space 400 in consideration of an offset for visual convenience, operational convenience, and/or disposition at a natural (or smooth) angle between contents (e.g., an application) for the user. As an example, the wearable device 401 may generate the virtual space 400 to form a center point 403 of the virtual space 400 behind the center point 402 of a face of the user (or the worn wearable device 401) by a certain distance. A distance between the center point 403 of the virtual space 400 and the center point 402 of the face of the user may be an offset of the virtual space 400. As an example, the offset of the virtual space 400 may be set to approximately 0.5 m.

In an embodiment, images displayed on the display assembly 460 may be images in consideration of binocular parallax of the eyes of the user 405. In an embodiment, the images displayed on the display assembly 460 may be images in consideration of binocular parallax indicating the FOV 410 determined according to a gaze of the user 405. In an embodiment, the images corresponding to the binocular parallax of the user 405 may be referred to as images having binocular parallax. In an embodiment, the images corresponding to the binocular parallax of the user 405 may be referred to as stereoscopic images. For example, the images corresponding to the binocular parallax of the user 405 may have parallax corresponding to parallax between an image formed on a first eye (e.g., a right eye) of the user 405 and an image formed on a second eye (e.g., a left eye) of the user 405 according to the gaze of the user 405.

In an embodiment, the images displayed on the display assembly 460 may be images for providing a sense of depth to the user 405. For example, the images displayed on the display assembly 460 may be images having binocular parallax to indicate areas by a specific distance from the user 405 in the three-dimensional virtual space 400. For example, referring to FIG. 4C, the images displayed on the display assembly 460 may be images having binocular parallax to indicate an area 411 far away from the user 405 by a first distance r1 in the three-dimensional virtual space 400. For example, the images displayed on the display assembly 460 may be images having binocular parallax to indicate an area 412 far away from the user 405 by a second distance r2 in the three-dimensional virtual space 400. For example, the images displayed on the display assembly 460 may be images having binocular parallax to indicate an area 413 far away from the user 405 by a third distance r3 in the three-dimensional virtual space 400.

In an embodiment, as the images corresponding to the binocular parallax of the user 405 are output to the display 461 and the display 465, the user 405 may feel a sense of depth according to a gaze in the three-dimensional virtual space 400.

In an embodiment, the cameras 481, 483, and 485 of the wearable device 401 may include one or more optical sensors (e.g., a charged coupled device (CCD) sensor and a complementary metal oxide semiconductor (CMOS) sensor) that generate an electrical signal indicating a color and/or brightness of light. A plurality of optical sensors included in the cameras 481, 483, and 485 may be disposed in a form of a two-dimensional array. The cameras 481, 483, and 485 may generate two-dimensional frame data corresponding to light reaching the optical sensors of the two-dimensional array, by obtaining electrical signals of each of the plurality of optical sensors substantially simultaneously. For example, photographic data captured using the cameras 481, 483, and 485 may refer, for example, to one two-dimensional frame data obtained from the cameras 481, 483, and 485. For example, video data captured using the cameras 481, 483, and 485 may refer, for example, to a sequence of a plurality of two-dimensional frame data obtained from the cameras 481, 483, and 485 according to a frame rate. The cameras 481, 483, and 485 may be disposed toward a direction in which the cameras 481, 483, and 485 receive light, and may further include a flash light for outputting light toward the direction.

In an embodiment, the cameras 481, 483, and 485 may be disposed toward different directions. The cameras 481 and 483 among the cameras 481, 483, and 485 may be disposed on the same surface as the displays 461 and 465. In an embodiment, the cameras 481 and 483 may be respectively arranged toward the eyes of the user 405 when the wearable device 401 is worn by the user 405. In an embodiment, the cameras 481 and 483 may be referred to as a camera assembly 480. In an embodiment, the camera assembly 480 may be disposed such that the camera 485 shoots a rear surface (or a surface facing the user 405 when the wearable device 401 is worn by the user 405) of the wearable device 401. In an embodiment, the camera assembly 480 may correspond to the cameras 240-1 and 240-2 of FIGS. 2A and 2B, or the cameras 340-1, 340-2, 340-3, and 340-4 of FIGS. 3A and 3B.

In an embodiment, the camera 485 among the cameras 481, 483, and 485 may be disposed on a different surface from the displays 461 and 465. In an embodiment, the camera 485 may be disposed to shoot a front surface (or a surface that does not face the user 405 when the wearable device 401 is worn by the user 405) of the wearable device 401. In an embodiment, the camera 485 may correspond to the cameras 240-3 of FIGS. 2A and 2B, or the cameras 340-5, 340-6, 340-7, 340-8, 340-9, and 340-10 of FIGS. 3A and 3B.

According to an embodiment, in the memory 430 of the wearable device 401, one or more instructions (or commands) indicating a calculation and/or an operation to be performed by the processor 420 of the wearable device 401 on data may be stored. A set of one or more instructions may be referred to as firmware, an operating system, a process, a routine, a sub-routine, and/or an application. For example, the wearable device 401 and/or the processor 420 may perform at least one of operations described in greater detail below with reference to FIGS. 12, 13, 14, 15, 16 and 17 when a set of a plurality of instructions distributed in a form of an operating system, firmware, a driver, and/or an application is executed. Hereinafter, an application being installed in the wearable device 401 may refer, for example, to one or more instructions provided in a form of an application being stored in the memory 430, and that the one or more applications are stored in a format (e.g., a file having an extension specified by an operating system of the wearable device 401) executable by the processor 420. As an example, an application may include a program and/or a library related to a service provided to the user 405.

Figure 5A:
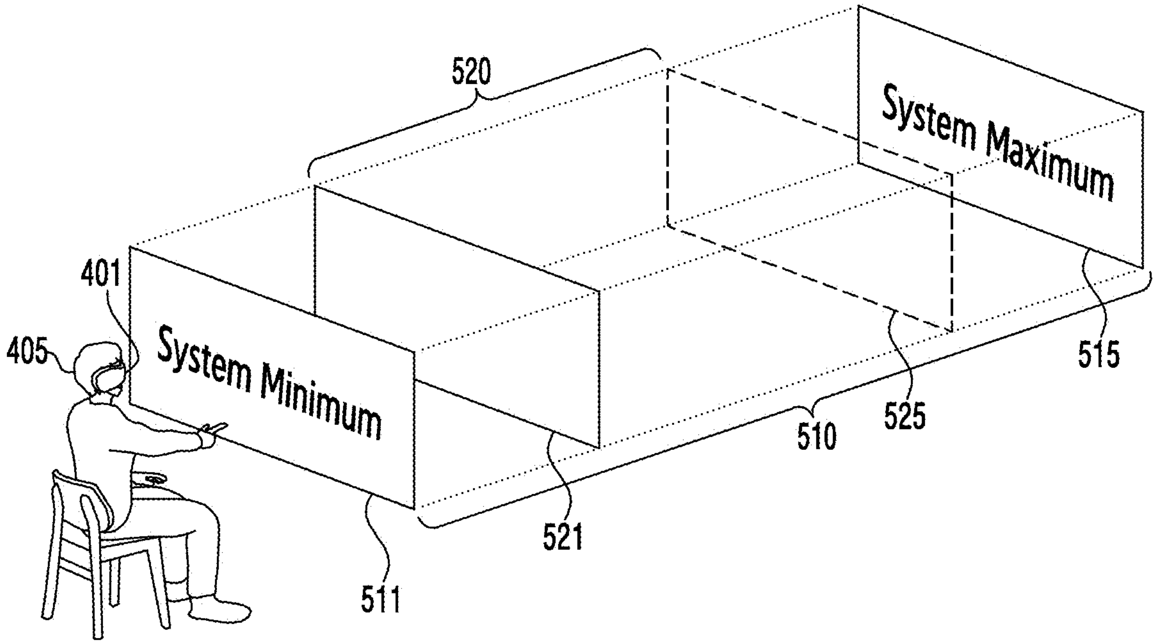
FIG. 5A is a diagram illustrating an example of a depth range in which a content is resolvable by a user according to visual acuity of the user in a virtual three-dimensional space according to various embodiments.
Figure 5B:
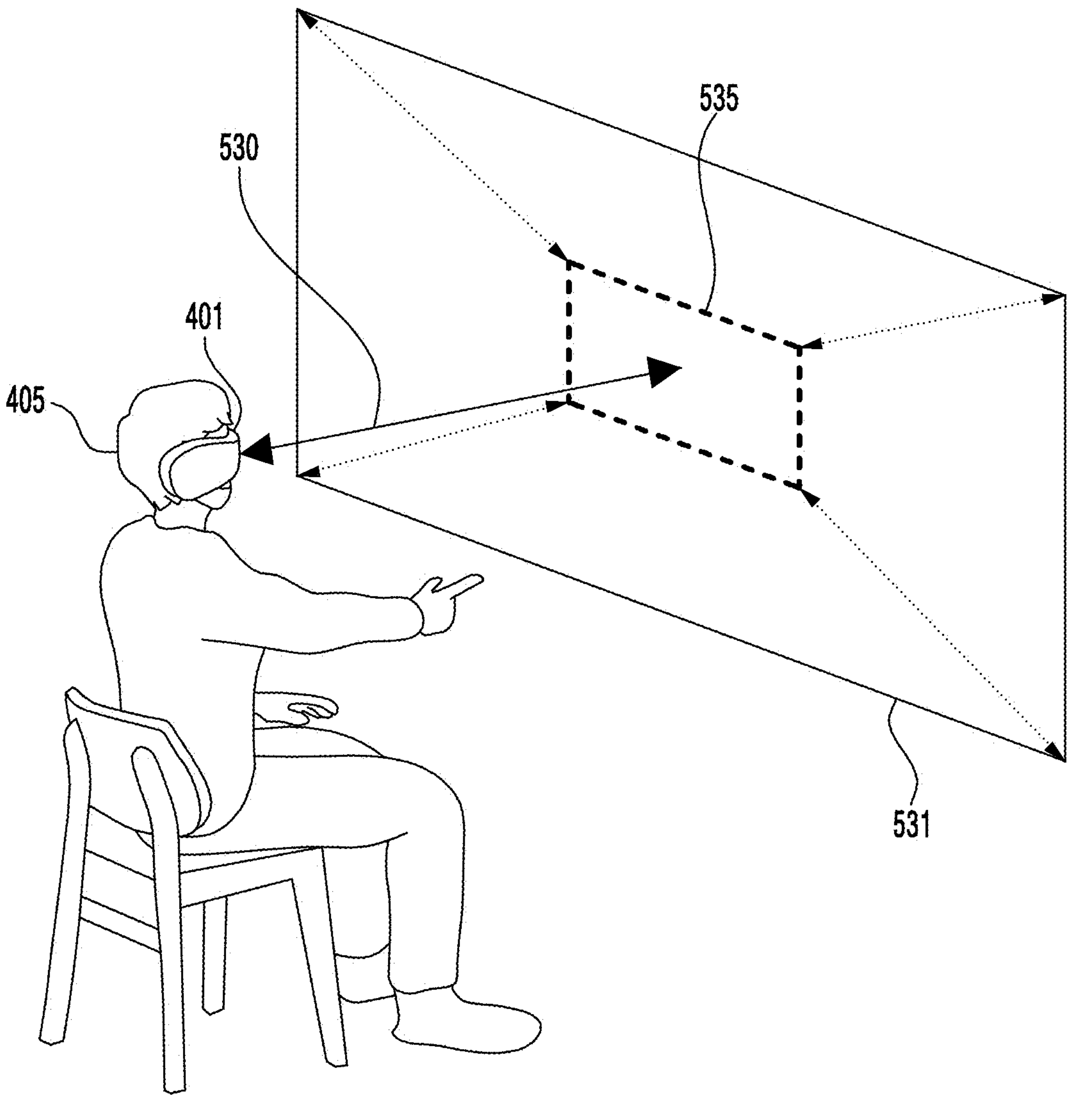
FIG. 5B is a diagram illustrating an example of a size range in which a content is resolvable by a user according to visual acuity of the user at a specific depth in a virtual three-dimensional space according to various embodiments.
Figure 5C:
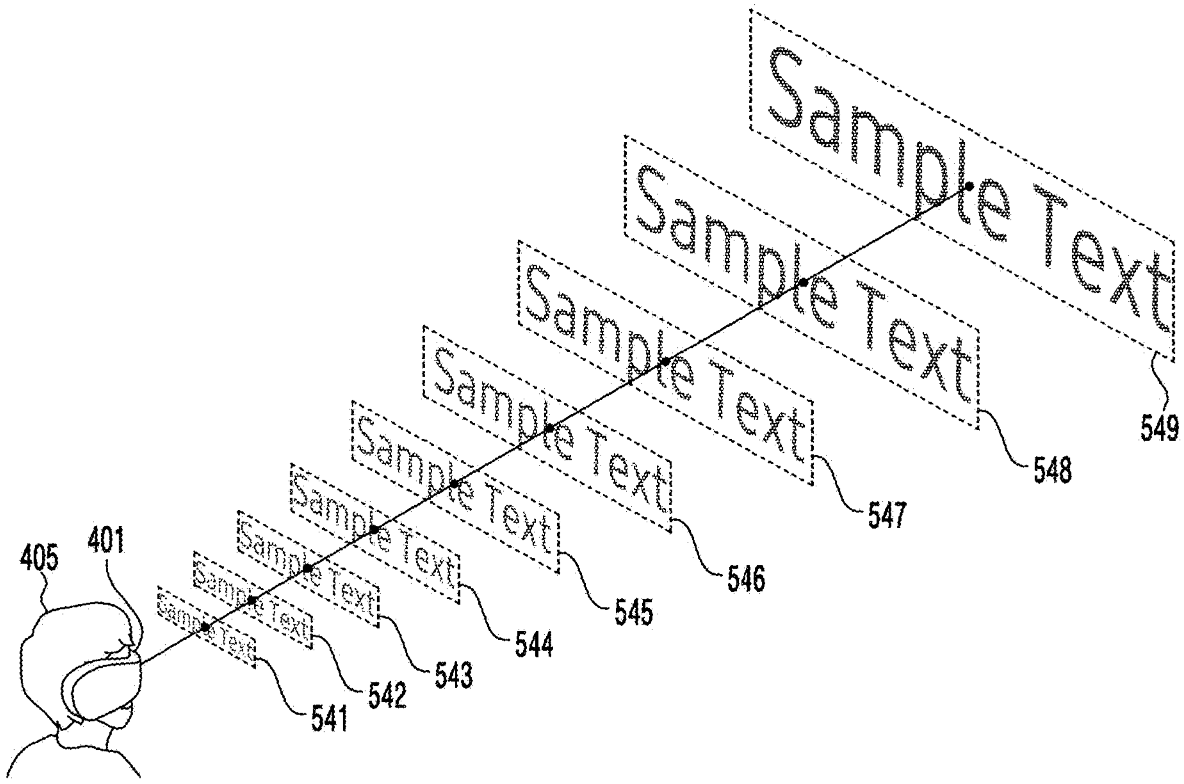
FIG. 5C is a diagram illustrating an example of contents having different sizes displayed within a depth range in a virtual three-dimensional space according to various embodiments.
Figure 5D:
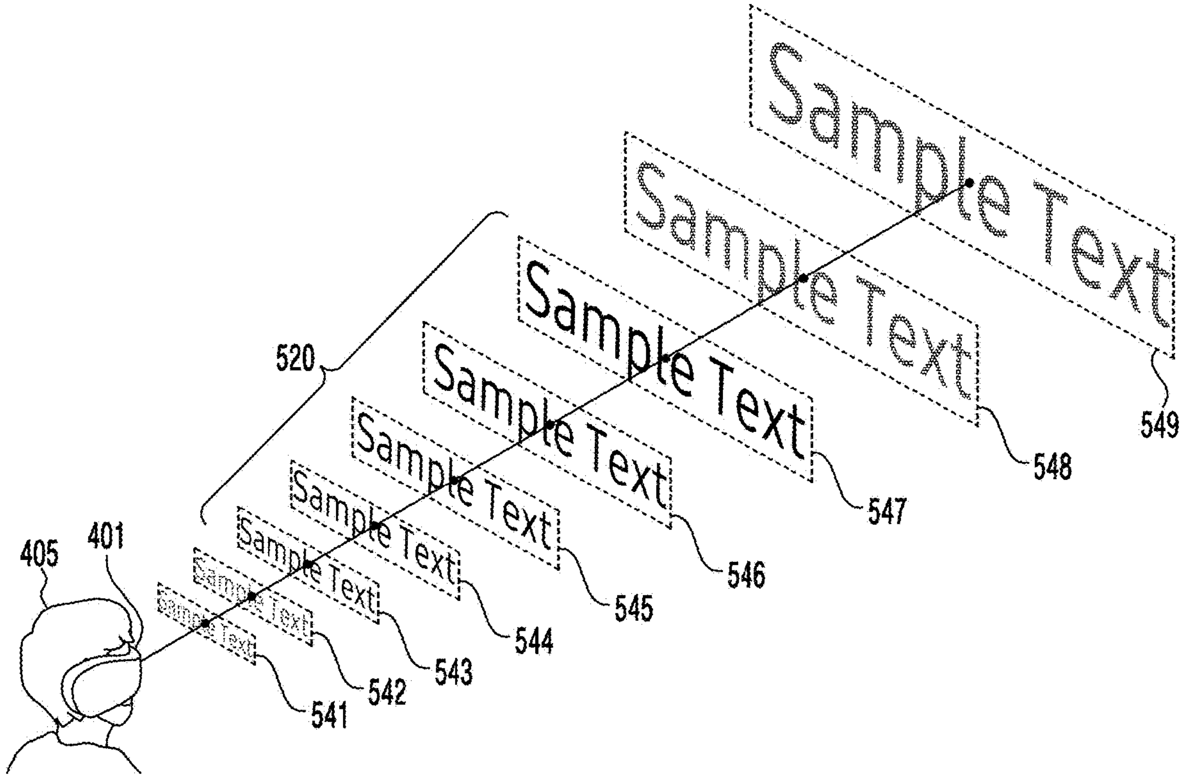
FIG. 5D is a diagram illustrating an example of contents having a size resolvable by a user according to visual acuity of the user among contents having different sizes displayed within a depth range in a virtual three-dimensional space according to various embodiments.
Figure 5E:
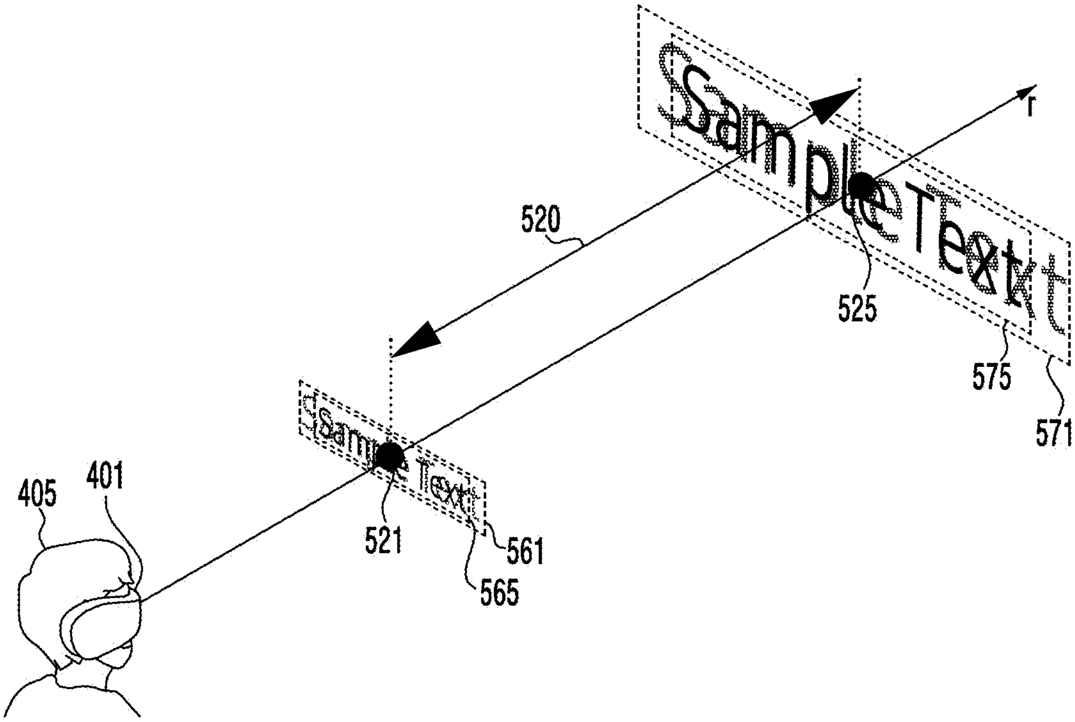
FIG. 5E is a diagram illustrating an example of contents within a size range and a depth range resolvable by a user according to visual acuity of the user in a virtual three-dimensional space according to various embodiments.

FIG. 5A is a diagram illustrating an example of a depth range in which a content is resolvable by a user according to visual acuity of the user in a virtual three-dimensional space according to various embodiments. FIG. 5B is a diagram illustrating an example of a size range in which a content is resolvable by a user according to visual acuity of the user at a specific depth in a virtual three-dimensional space according to various embodiments. FIG. 5C is a diagram illustrating an example of contents having different sizes displayed within a depth range in a virtual three-dimensional space according to various embodiments. FIG. 5D is a diagram illustrating an example of contents having a size resolvable by a user according to visual acuity of the user among contents having different sizes displayed within a depth range in a virtual three-dimensional space according to various embodiments. FIG. 5E is a diagram illustrating an example of contents within a size range and a depth range resolvable by a user according to visual acuity of the user in a virtual three-dimensional space according to various embodiments.

FIGS. 5A, 5B, 5C, 5D and 5E may be described with reference to FIGS. 1, 2A, 2B, 3A, 3B, 4A, 4B and 4C.

Referring to FIG. 5A, the wearable device 401 may display a window within a system depth range 510 when displaying a FOV 410 in a three-dimensional virtual space 400 through a display assembly 460. In an embodiment, a system depth 511 may include the closest distance to a user 405 that the wearable device 401 may render in the three-dimensional virtual space 400. In an embodiment, a system depth 515 may include the farthest distance from the user 405 that the wearable device 401 may render in the three-dimensional virtual space 400. In an embodiment, the system depth range 510 may have the system depth 511 as a lower limit depth and the system depth 515 as an upper limit depth.

In an embodiment, when a window (or a virtual object) (or a content) is displayed at a specific size within a resolvable depth range 520, the user 405 may clearly recognize (or identify) the window (or the virtual object) (or the content). In an embodiment, the user 405 clearly recognizing (or identifying) the window may include the user 405 distinguishing details (e.g., a figure, a shape, and a color) of the window. In an embodiment, the user 405 clearly recognizing (or identifying) the window may include the user 405 distinguishing the window from another window. In an embodiment, the user 405 clearly recognizing (or identifying) the window may include the user 405 being capable of reading a content (e.g., text) within the window.

In an embodiment, a resolvable depth 521 may indicate the closest distance that the user 405 may clearly recognize (or identify) the window in the three-dimensional virtual space 400. In an embodiment, a resolvable depth 525 may indicate the farthest distance that the user 405 may clearly recognize (or identify) the window in the three-dimensional virtual space 400. In an embodiment, the resolvable depth range 520 may have the resolvable depth 521 as a lower limit depth and the resolvable depth 525 as an upper limit depth.

Referring to FIG. 5B, when a window is displayed at a specific depth 530 between a maximum size 531 and a minimum size 535, the user 405 may clearly recognize (or identify) the window. Accordingly, obtaining visual acuity information of the user 405 may be important when the wearable device 401 determines a position where to display the window. Herein, the visual acuity information of the user 405 may include distance information (or depth information) and/or size information that the user 405 may clearly recognize (or identify) the window in the three-dimensional virtual space 400.

Hereinafter, an operation in which the wearable device 401 obtains the visual acuity information of the user 405 may be described with reference to FIGS. 5C, 5D and 5E.

In an embodiment, referring to FIG. 5C, the wearable device 401 may display virtual objects 541 to 549 at different distances. In an embodiment, the wearable device 401 may sequentially display the virtual objects 541 to 549 at the different distances. For example, the wearable device 401 may sequentially display the virtual objects 541 to 549 having the same size (or font size) at the different distances. For example, the virtual objects 541 to 549 having the same size (or font size) may include the virtual objects 541 to 549 being represented at the same size in the three-dimensional virtual space 400. However, even when the virtual objects 541 to 549 have the same size (or font size), the virtual objects 541 to 549 may be recognized by the user 405 to have different sizes according to a distance from the user 405.

In an embodiment, the wearable device 401 may sequentially display the virtual objects 541 to 549 having a first size (or a first font size) at different distances, and then sequentially display virtual objects having a second size (or a second font size) at different distances.

In an embodiment, the user 405 may select resolvable (or recognizable) virtual objects among the sequentially displayed virtual objects 541 to 549. For example, when referring to FIG. 5D, the user 405 may select the virtual objects 543 to 547 as resolvable (or recognizable) virtual objects among the sequentially displayed virtual objects 541 to 549. For example, the wearable device 401 may identify the depth range 520 in which the virtual objects 543 to 547 resolvable (or recognizable) by the user among the virtual objects 541 to 549 having the same size (or font size) are displayed.

In an embodiment, the wearable device 401 may obtain the visual information of the user 405 based on sizes and/or distances of virtual objects selected by the user 405 as resolvable (or recognizable) virtual objects with respect to virtual objects displayed through different sizes and/or different distances. In an embodiment, the visual information of the user 405 may include information on distances of the virtual object resolvable (or recognizable) by the user 405. The information on the distances of the virtual object may include information on the closest distance 521 to the user 405 and the farthest distance 525 to the user 405 that are resolvable by the user 405. In an embodiment, the visual information of the user 405 may include information on sizes of the virtual object resolvable (or recognizable) by the user 405 when the virtual object is displayed at each of the distances. For example, the information on the sizes of the virtual object may include information on the smallest size 561 and the largest size 565 resolvable by the user 405 when the virtual object is displayed at the distance 521. For example, the information on the sizes of the virtual object may include information on the smallest size 571 and the largest size 575 resolvable by the user 405 when the virtual object is displayed at the distance 525.

According to an embodiment, the visual acuity information may be obtained through a method other than an operation in which the wearable device 401 obtaining the visual acuity information of the user 405 described with reference to FIGS. 5C, 5D and 5E.

For example, as the wearable device 401 displays selectable options (or options that allow a selection of at least one of visual figures) and then enables the user to select at least one of the displayed selectable options, the wearable device 401 may obtain the visual acuity information of the user 405.

For example, as the wearable device 401 calculates the visual acuity information based on accuracy and/or reaction time of the user 405 selecting a visual object, while the user 405 uses the wearable device 401, the wearable device 401 may obtain the visual acuity information of the user 405. In an embodiment, the wearable device 401 calculating the visual acuity information may include calculating based on a specified rule. In an embodiment, the wearable device 401 calculating the visual acuity information may include calculating based on a specified artificial intelligence model (e.g., an artificial intelligence model trained to output the visual acuity information of the user 405 based on a usage pattern of the user 405).

For example, based on a specified function (e.g., an auto-focus function of a lens and/or an auto-refractive function) of the wearable device 401, the wearable device 401 may obtain the visual acuity information of the user 405. For example, based on an eye image of the user 405 obtained through a camera of the wearable device 401 (e.g., information on an eye condition of the user 405 obtained from the eye image), the wearable device 401 may obtain the visual acuity information of the user 405.

Figure 6A:
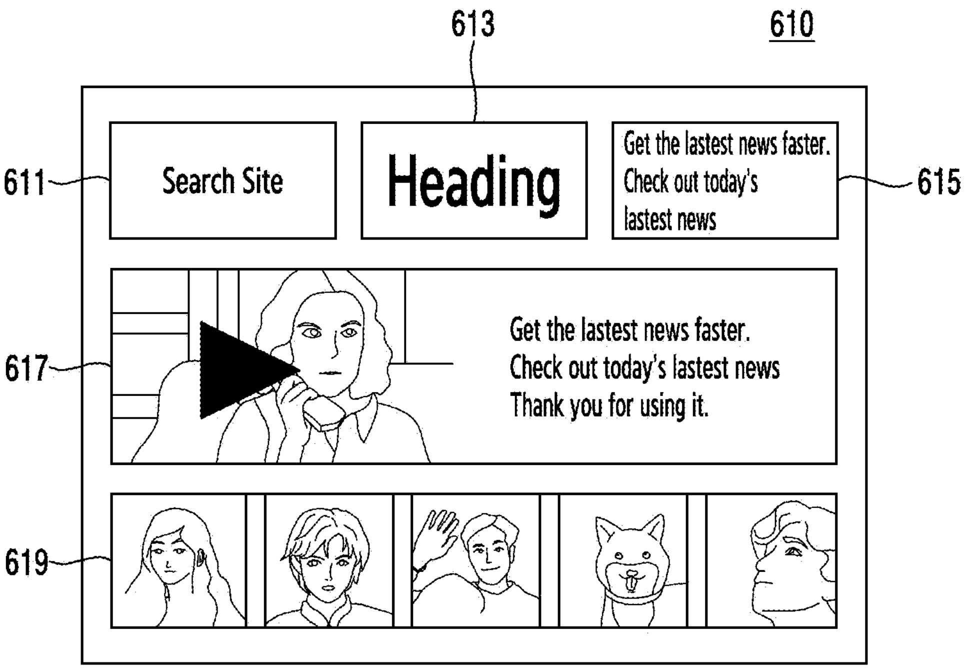
FIG. 6A is a diagram illustrating an example of a two-dimensional window displayed in a virtual three-dimensional space by a wearable device according to various embodiments.
Figure 6B:
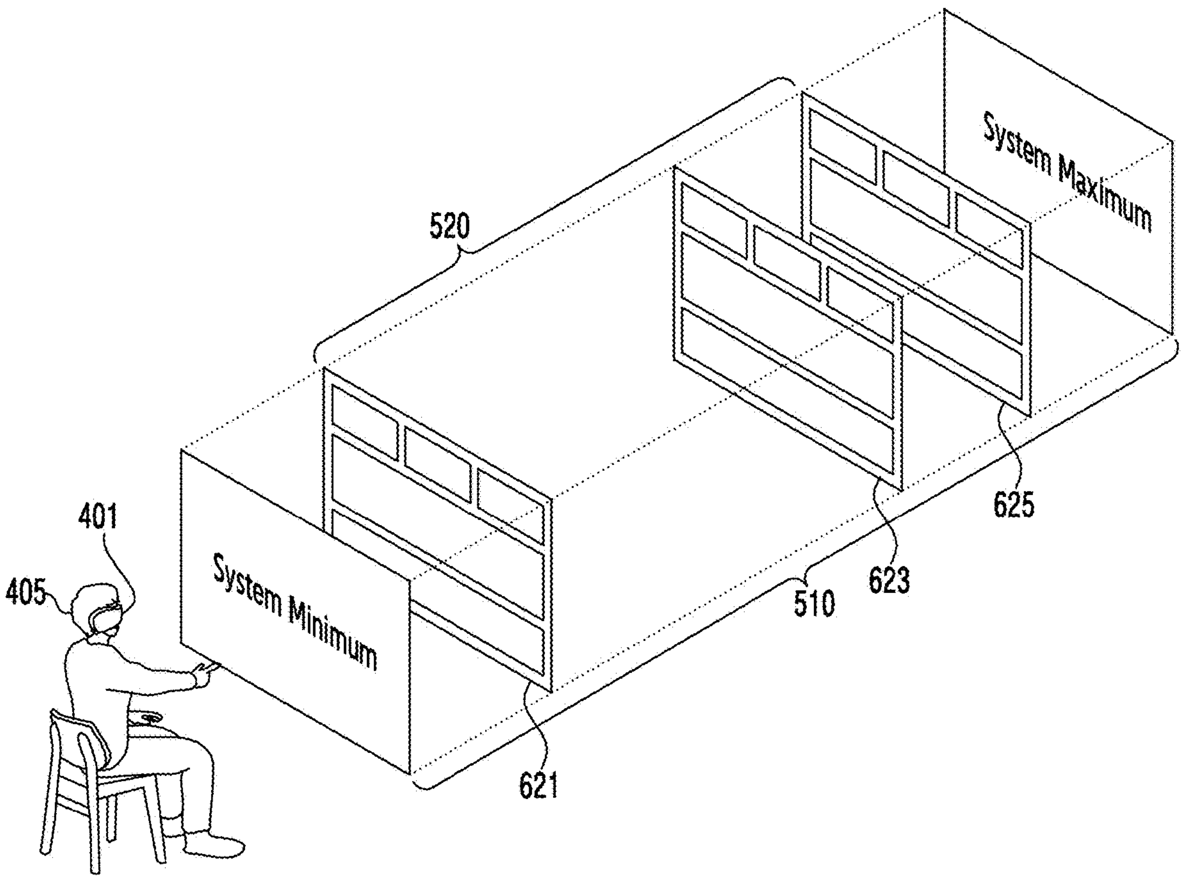
FIG. 6B is a diagram illustrating an example of an operation in which a wearable device determines a display position of a two-dimensional window within a depth range resolvable by a user according to various embodiments.

FIG. 6A is a diagram illustrating an example of a two-dimensional window displayed in a virtual three-dimensional space by a wearable device according to various embodiments. FIG. 6B is a diagram illustrating an example of an operation in which a wearable device determines a display position of a two-dimensional window within a depth range resolvable by a user according to various embodiments.

FIGS. 6A and 6B may be described with reference to FIGS. 1 to 5E.

In an embodiment, referring to FIG. 6A, a wearable device 401 may receive an input for displaying a window 610 through a display assembly 460. For example, the wearable device 401 may receive an input for displaying the window 610 in a three-dimensional virtual space 400. For example, the wearable device 401 may receive an input for displaying the window 610 through a FOV 410 corresponding to a gaze of a user 405 in the three-dimensional virtual space 400. In an embodiment, the input for displaying the window 610 may include an input for executing an application. In an embodiment, the input for displaying the window 610 may include an input for executing an application related to the window 610. For example, the window 610 may be a virtual object on a two-dimensional plane. For example, the window 610 may be a virtual object (or a virtual object having no volume) extending in three directions orthogonal to each other. For example, the window 610 may be a window on a two-dimensional plane. However, the disclosure is not limited thereto. For example, the window 610 may be a virtual object (or a virtual object having a volume) extending in three orthogonal directions.

In an embodiment, the wearable device 401 may determine a position, a direction, and/or a size in the three-dimensional virtual space 400 for displaying the window 610 based on receiving the input for displaying the window 610 through the display assembly 460. In an embodiment, the position of the window 610 may be defined based on a coordinate system (e.g., a Cartesian coordinate system, a cylindrical coordinate system, or a spherical coordinate system) based on (or centered on) the user 405. For example, based on the spherical coordinate system, the position of the window 610 may be determined by a distance from the user 405 and/or angles (e.g., an azimuth or a zenith angle). In an embodiment, the direction of the window 610 may be determined by a degree of rotation based on three axes orthogonal to each other. For example, the direction of the window 610 may be determined by a degree of rotation to a vertical axis (e.g., a yawing axis), a degree of rotation to a horizontal axis (e.g., a pitching axis), and/or a degree of rotation to a longitudinal axis (e.g., a rolling axis).

In an embodiment, based on receiving the input for displaying the window 610 through the display assembly 460, the wearable device 401 may determine a position and/or a size in the three-dimensional virtual space 400 for displaying the window 610, based on visual acuity information of the user 405.

In an embodiment, the wearable device 401 may determine a position in the FOV 410 for displaying the window 610 within a depth range 520 indicated by the visual acuity information of the user 405. In an embodiment, the wearable device 401 may determine the position in the FOV 410 based on a size of the window 610, within the depth range 520. For example, the wearable device 401 may determine the position based on sizes of contents 611, 613, 615, 617, and 619 within the window 610, within the depth range 520. In an embodiment, the contents 611, 613, 615, 617, and 619 may be an image, a video, and/or text.

For example, the wearable device 401 may determine the position of the window 610 based on a size of the smallest content 611, 613, or 615 among the contents 611, 613, 615, 617, and 619 within the window 610. For example, the wearable device 401 may determine the position of the window 610 based on the smallest font size in text described in the contents 611, 613, 615, 617, and 619 within the window 610. For example, the wearable device 401 may determine the position of the window 610 based on a size of the content 617 positioned relatively at a center among the contents 611, 613, 615, 617, and 619 within the window 610. For example, the wearable device 401 may determine the position of the window 610 based on a font size of text described in the content 617 positioned relatively at the center among the contents 611, 613, 615, 617, and 619 within the window 610. For example, the wearable device 401 may determine the position of the window 610 based on the size of the main content 617 among the contents 611, 613, 615, 617, and 619 within the window 610. For example, the wearable device 401 may determine the position of the window 610 based on the font size of the text described in the main content 617 among the contents 611, 613, 615, 617, and 619 within the window 610.

For example, the wearable device 401 may determine the position of the window 610 based on a size of a content having a specified attribute among the contents 611, 613, 615, 617, and 619 within the window 610. For example, the specified attribute of the content may include a type (e.g., an image, text, and a figure) of a content, resolution of a content, and/or a tag related to a content.

For example, the wearable device 401 may determine the position of the window 610 based on a content (e.g., 611, 613, 615, or 617) having a specified type (e.g., text) among the contents 611, 613, 615, 617, and 619 within the window 610.

For example, the wearable device 401 may determine the position of the window 610 based on a content (e.g., 619) having the lowest image resolution among the contents 611, 613, 615, 617, and 619 within the window 610. For example, the wearable device 401 may determine the position of the window 610 based on a content (e.g., 615) having the smallest text size among the contents 611, 613, 615, 617, and 619 within the window 610.

For example, the wearable device 401 may determine the position of the window 610 based on a content having a specified tag (or a specified value in a key-value pair) among the contents 611, 613, 615, 617, and 619 within the window 610. In an embodiment, the tag may determine the position of the window 610 based on a content indicated by a resource having a specified attribute (e.g., <body>, <p>, <br>, <hr>, <font>, <table>, and/or <small text>) in a case that the contents 611, 613, 615, 617, and 619 are a resource indicated by a markup language. For example, in a case that a content in a specified paragraph (<p>, <br>) and/or table (<table>) included in a specified area (e.g., <body>) among the contents 611, 613, 615, 617, and 619 within the window 610 has a specified attribute (e.g., a specified font (<font>) or specified small text (<small text>)), the wearable device 401 may determine the position of the window 610 based on the corresponding content.

For example, the wearable device 401 may determine the position of the window 610 based on a content that occupies the largest proportion among proportions (e.g., a ratio of an area of each of the contents 611, 613, 615, 617, and 619 displayed in the window 610) of the contents 611, 613, 615, 617, and 619 within the window 610. For example, the wearable device 401 may determine the position of the window 610 based on a size of text and/or an object included in the content that occupies the largest proportion.

For example, the wearable device 401 may determine the position of the window 610 based on the most recently updated content among the contents 611, 613, 615, 617, and 619 within the window 610. For example, the wearable device 401 may determine the position of the window 610 based on a size of text and/or an object included in the most recently updated content.

For example, the wearable device 401 may determine the position of the window 610 based on a content with the highest user interest among the contents 611, 613, 615, 617, and 619 within the window 610. For example, the wearable device 401 may determine the position of the window 610 based on a size of text and/or an object included in the content with the highest user interest. In an embodiment, the user interest may be identified according to a usage pattern of the wearable device 401 of the user. For example, the user interest may be determined based on an order of web pages (or an order of executed applications) accessed through the wearable device 401.

For example, referring to FIG. 6B, as a size of a content that determines the position of the window 610 is smaller, the window 610 may be positioned at a position 621 closer to the user 405 within the depth range 520. For example, referring to FIG. 6B, as size of the content that determines the position of the window 610 is larger, the window 610 may be positioned at a position 625 farther from the user 405 within the depth range 520. For example, the wearable device 401 may display the window 610 at a position 623 based on the smallest font size in the text described in the contents 611, 613, 615, 617, and 619 within the window 610.

Figure 6C:
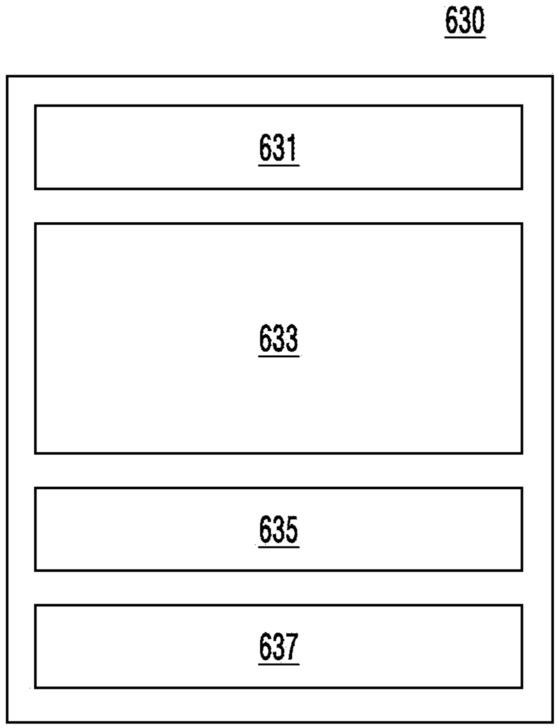
FIG. 6C is a diagram illustrating an example of a two-dimensional window displayed in a virtual three-dimensional space by a wearable device according to various embodiments.
Figure 6D:
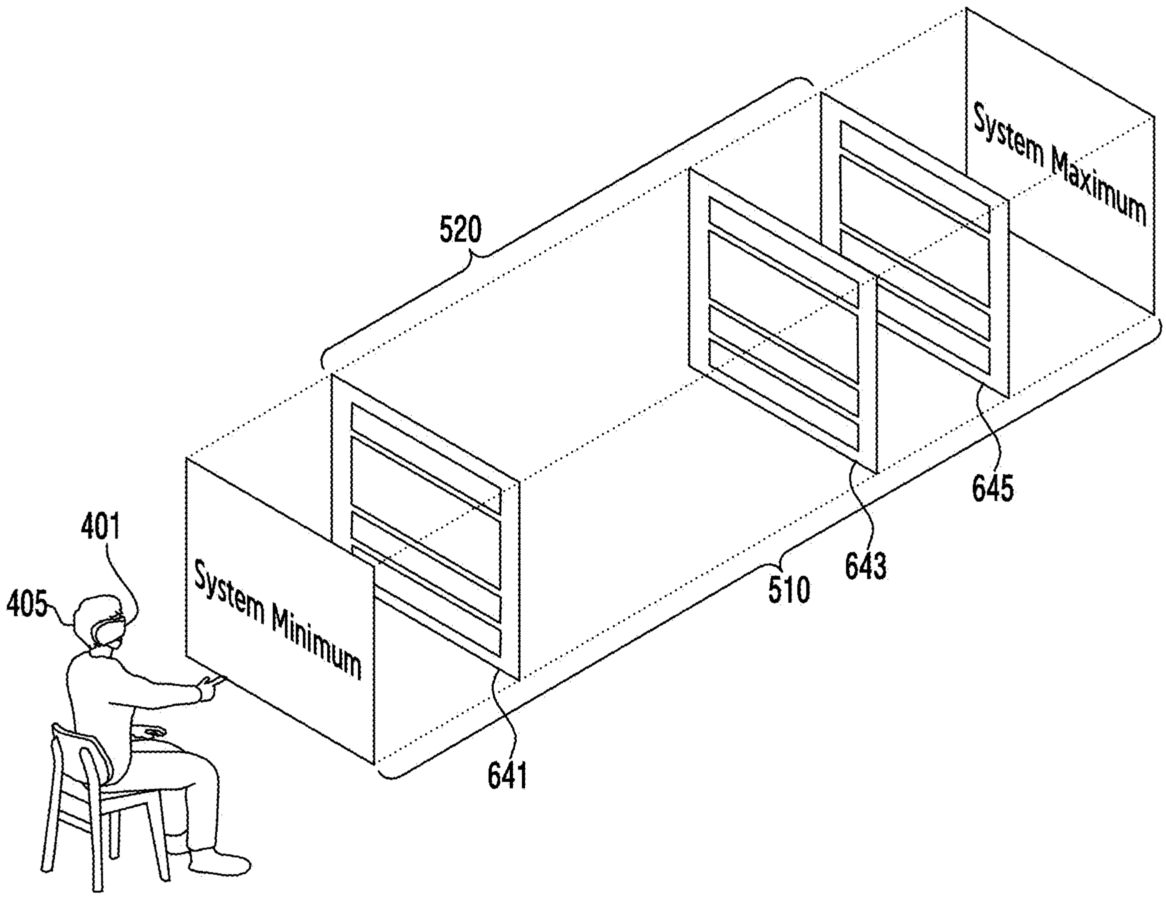
FIG. 6D is a diagram illustrating an example of an operation in which a wearable device determines a display position of a two-dimensional window within a depth range resolvable by a user according to various embodiments.

FIG. 6C is a diagram illustrating an example of a two-dimensional window displayed in a virtual three-dimensional space by a wearable device according to various embodiments. FIG. 6D is a diagram illustrating an example of an operation in which a wearable device determines a display position of a two-dimensional window within a depth range resolvable by a user according to various embodiments.

FIGS. 6C and 6D may be described with reference to FIGS. 1 to 5E. Among descriptions of FIGS. 6C and 6D, descriptions that overlap with descriptions of FIGS. 6A and 6B may not be repeated.

In an embodiment, referring to FIG. 6C, a wearable device 401 may receive an input for displaying a window 630 through a display assembly 460.

In an embodiment, the wearable device 401 may determine a position, a direction, and/or a size in a three-dimensional virtual space 400 for displaying the window 630 based on receiving the input for displaying the window 630 through the display assembly 460. In an embodiment, the wearable device 401 may determine a position and/or a size in the three-dimensional virtual space 400 for displaying the window 630 based on visual acuity information of a user 405 based on receiving the input for displaying the window 630 through the display assembly 460.

In an embodiment, the wearable device 401 may determine a position in a FOV 410 for displaying the window 630 within a depth range 520 indicated by the visual acuity information of the user 405. In an embodiment, the wearable device 401 may determine the position in the FOV 410 based on a size of the window 630, within the depth range 520. For example, the wearable device 401 may determine a position based on sizes of contents 631, 633, 635, and 637 within the window 630, within the depth range 520.

For example, referring to FIG. 6D, as the size of the content that determines the position of the window 630 is smaller, the window 630 may be positioned at a position 641 closer to the user 405 within the depth range 520. For example, referring to FIG. 6D, as the size of the content that determines the position of the window 630 is larger, the window 630 may be positioned at a position 645 farther from the user 405 within the depth range 520. For example, the wearable device 401 may display the window 630 at a position 643 based on the smallest font size in text described in the contents 631, 633, 635, and 637 within the window 630.

Figure 6E:
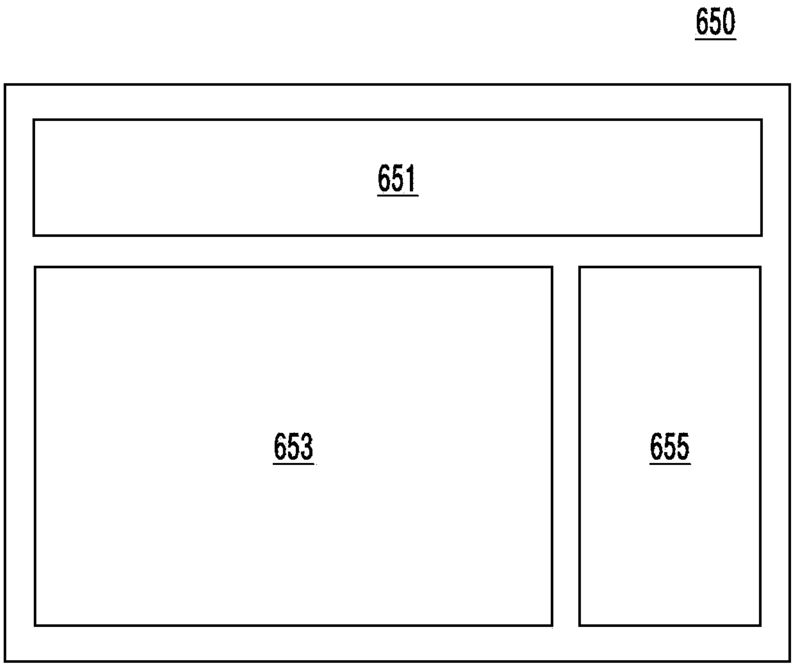
FIG. 6E is a diagram illustrating an example of a two-dimensional window displayed in a virtual three-dimensional space by a wearable device according to various embodiments.
Figure 6F:
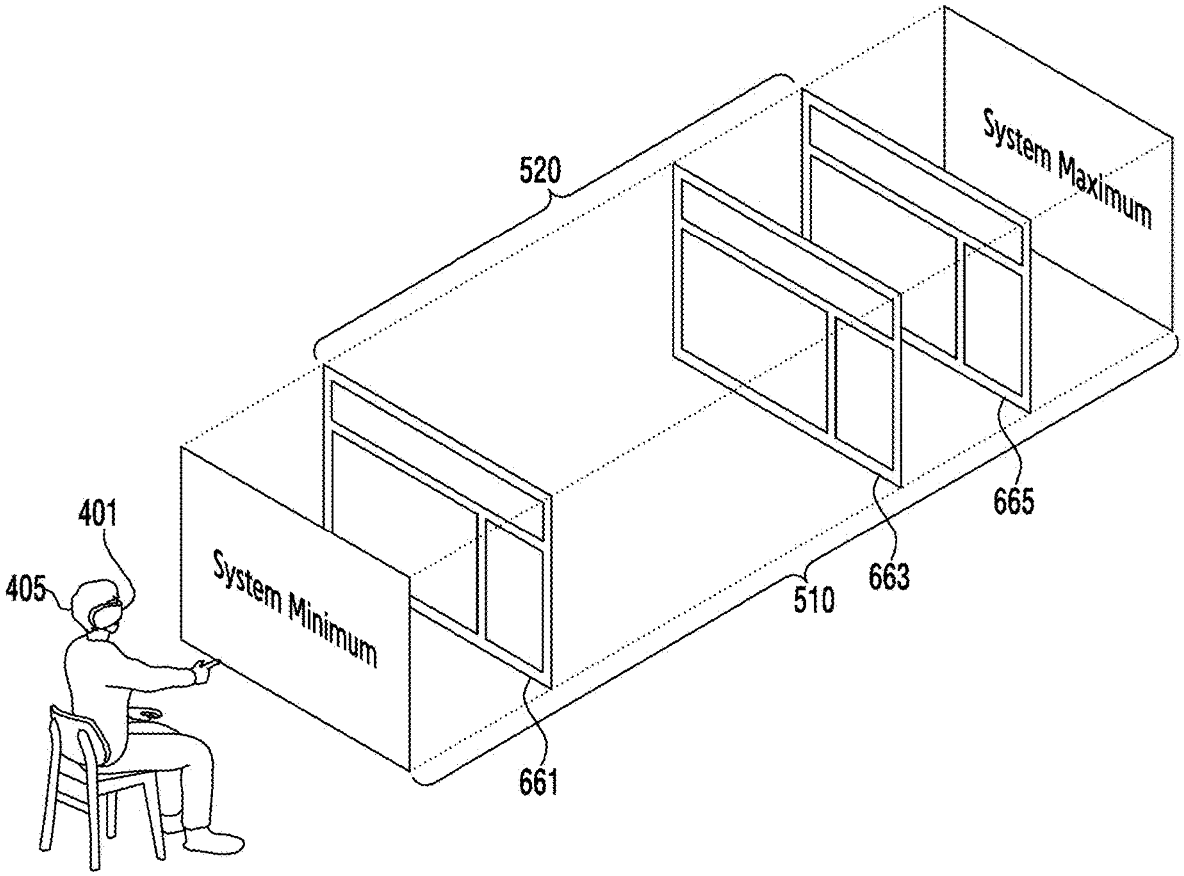
FIG. 6F is a diagram illustrating an example of an operation in which a wearable device determines a display position of a two-dimensional window within a depth range resolvable by a user according to various embodiments.

FIG. 6E is a diagram illustrating an example of a two-dimensional window displayed in a virtual three-dimensional space by a wearable device according to various embodiments. FIG. 6F is a diagram illustrating an example of an operation in which a wearable device determines a display position of a two-dimensional window within a depth range resolvable by a user according to various embodiments.

FIGS. 6E and 6F may be described with reference to FIGS. 1 to 5E. Among descriptions of FIGS. 6E and 6F, descriptions that overlap with descriptions of FIGS. 6A and 6B may not be repeated.

In an embodiment, referring to FIG. 6E, a wearable device 401 may receive an input for displaying a window 650 through a display assembly 460.

In an embodiment, the wearable device 401 may determine a position, a direction, and/or a size in a three-dimensional virtual space 400 for displaying the window 650 based on receiving the input for displaying the window 650 through the display assembly 460. In an embodiment, the wearable device 401 may determine a position and/or a size in the three-dimensional virtual space 400 for displaying the window 650 based on visual acuity information of a user 405 based on receiving the input for displaying the window 650 through the display assembly 460.

In an embodiment, the wearable device 401 may determine a position in a FOV 410 for displaying the window 650 within a depth range 520 indicated by the visual acuity information of the user 405. In an embodiment, the wearable device 401 may determine the position in the FOV 410 based on a size of the window 650 within the depth range 520. For example, the wearable device 401 may determine a position based on sizes of contents 651, 653, and 655 within the window 650 within the depth range 520.

For example, referring to FIG. 6F, as the size of the content that determines the position of the window 650 is smaller, the window 650 may be positioned at a position 661 closer to the user 405 within the depth range 520. For example, referring to FIG. 6F, as the size of the content that determines the position of the window 650 is larger, the window 650 may be positioned at a position 665 farther from the user 405 within the depth range 520. For example, the wearable device 401 may display the window 650 at a position 663 based on the smallest font size in text described in the contents 651, 653, and 655 within the window 650.

Figure 7A:
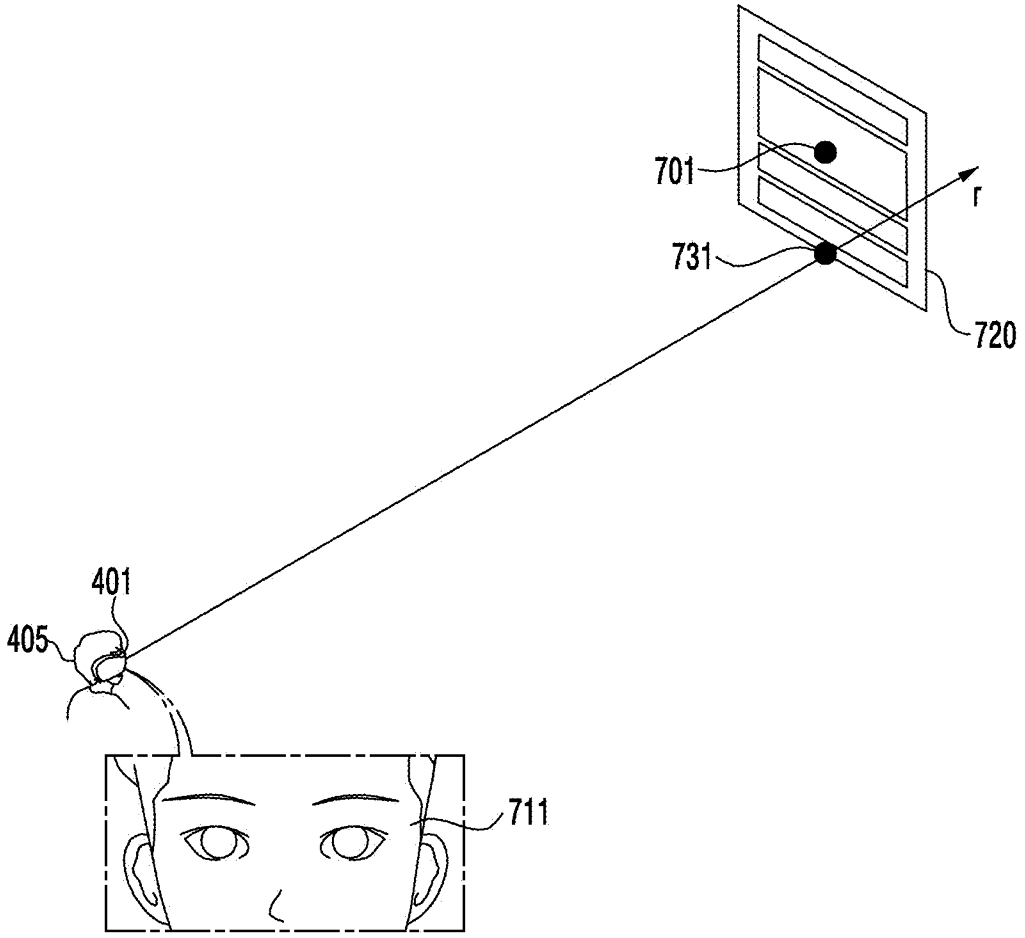
FIG. 7A is a diagram illustrating an example of an operation in which a wearable device displays a two-dimensional window within a depth range resolvable by a user according to various embodiments.
Figure 7B:
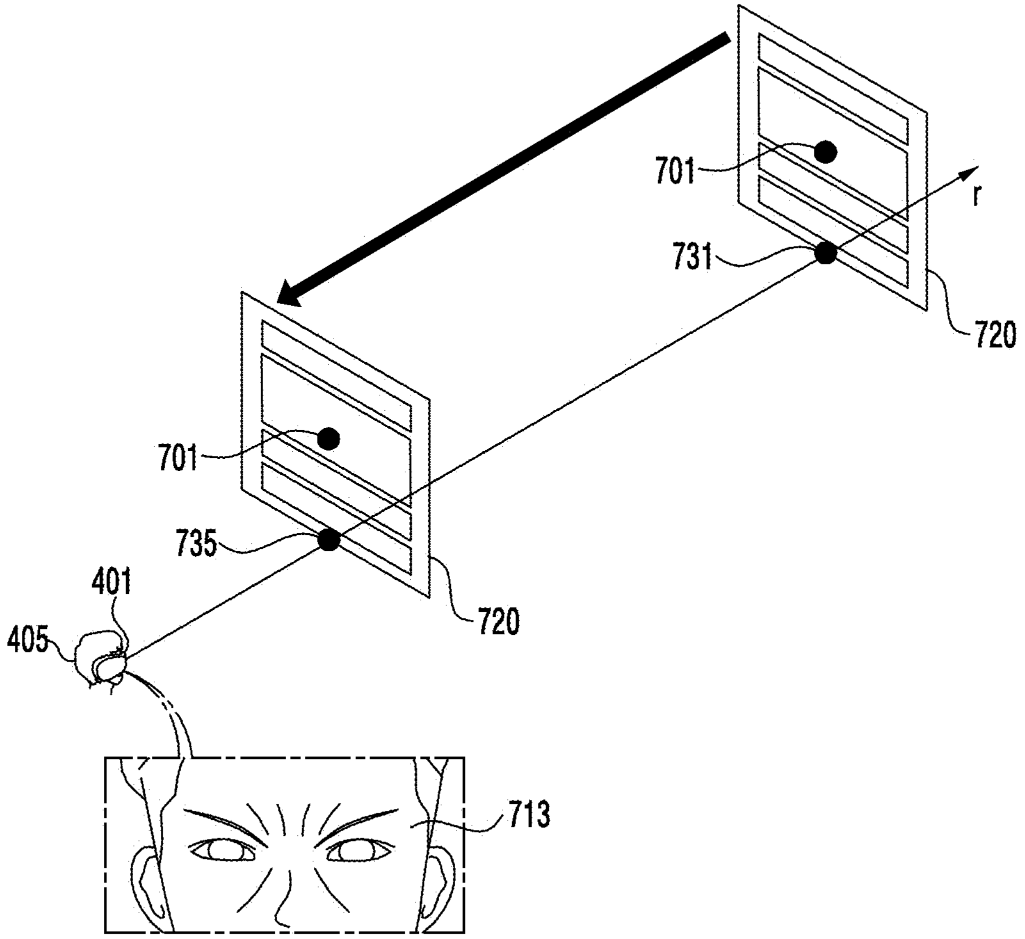
FIG. 7B is a diagram illustrating an example of an operation in which a wearable device changes a display position of a two-dimensional window based on a user input according to various embodiments.
Figure 7C:
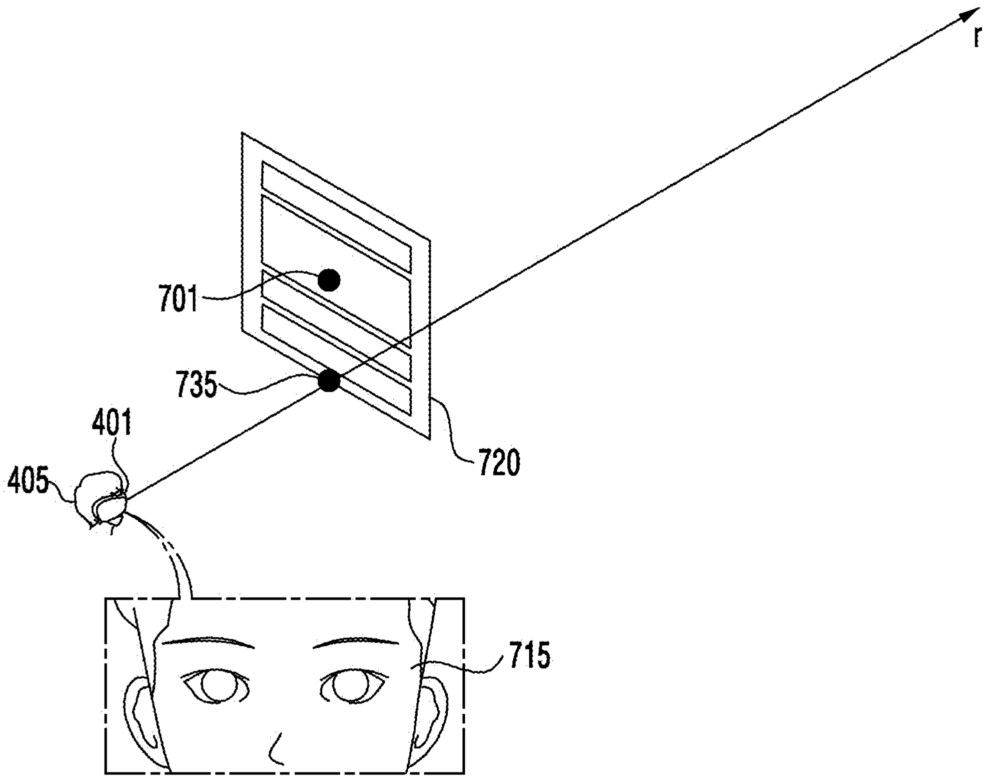
FIG. 7C is a diagram illustrating an example of an operation in which a wearable device displays a two-dimensional window at a changed position within a depth range resolvable by a user according to various embodiments.

FIG. 7A is a diagram illustrating an example of an operation in which a wearable device displays a two-dimensional window within a depth range resolvable by a user according to various embodiments. FIG. 7B is a diagram illustrating an example of an operation in which a wearable device changes a display position of a two-dimensional window based on a user input according to various embodiments. FIG. 7C is a diagram illustrating an example of an operation in which a wearable device displays a two-dimensional window at a changed position within a depth range resolvable by a user according to various embodiments.

FIGS. 7A, 7B and 7C may be described with reference to FIGS. 1 to 5E.

In an embodiment, a wearable device 401 may display a window 720 through a display assembly 460. In an embodiment, the wearable device 401 may display the window 720 in a three-dimensional virtual space 400 based on a position, a direction, and/or a size determined based on an input for displaying the window 720 through the display assembly 460. In an embodiment, the wearable device 401 may display the window 720 within a depth range 520 indicated by visual acuity information of a user 405. For example, referring to FIG. 7A, the wearable device 401 may display the window 720 at a first distance 731 from the user 405.

In an embodiment, the wearable device 401 may receive an input for changing a position of the window 720 while displaying the window 720 through the display assembly 460. In an embodiment, the input for changing the position of the window 720 may be an input for changing a depth of the window 720. In an embodiment, the input for changing the position of the window 720 may be an input for changing a distance of the window 720 from the user 405. For example, the input for changing the position of the window 720 may be an input for changing the position of the window 720 close to the user 405. However, the disclosure is not limited thereto. For example, the input for changing the position of the window 720 may be an input for changing the position of the window 720 far from the user 405.

For example, reception of the input for changing the position of the window 720 may include a voice input (e.g., "Change a display position of the window 720", "Display the window 720 closer") of the user 405. For example, the reception of the input for changing the position of the window 720 may include an input transmitted from an external electronic device (e.g., the electronic device 102 of FIG. 1) (e.g., a smart ring, a smart watch, a smartphone, a remote controller, or a stylus). For example, the reception of the input for changing the position of the window 720 may include a gesture (e.g., a gesture for zooming in, a gesture for zooming out) of the user 405.

In an embodiment, the gesture of the user 405 may be a gesture through one of hands of the user 405 identified through an image obtained through a camera 485. In an embodiment, the gesture of the user 405 may be a gesture through at least one of eyes of the user 405 identified through images capturing the eyes of the user 405 obtained through a camera assembly 480. In an embodiment, the gesture through at least one of the eyes of the user 405 may include a gesture in which the user 405 half-closes the eyes. For example, referring to FIG. 7A, the wearable device 401 may not identify a gesture for changing the position of the window 720 in a state 711 in which the user 405 generally opens the eyes. For example, referring to FIG. 7B, the wearable device 401 may identify the gesture for changing the position of the window 720 in a state 713 in which the user 405 half-opens the eyes.

In an embodiment, the wearable device 401 may determine a new position and/or a new size of the window 720 in the three-dimensional virtual space 400 based on receiving the input for changing the position of the window 720.

In an embodiment, the wearable device 401 may determine a position in a FOV 410 for displaying the window 720 within the depth range 520 indicated by the visual acuity information of the user 405 based on receiving the input for changing the position of the window 720. In an embodiment, the wearable device 401 may determine the position in the FOV 410 based on a size of the window 720 within the depth range 520. For example, the wearable device 401 may determine the position based on sizes of contents within the window 720 within the depth range 520.

For example, the wearable device 401 may determine the position of the window 720 based on a size of the smallest content among the contents within the window 720. For example, the wearable device 401 may determine the position of the window 720 based on the smallest font size in text described in the contents within the window 720. For example, the wearable device 401 may determine the position of the window 720 based on a size of a content positioned relatively at a center among the contents within the window 720. For example, the wearable device 401 may determine the position of the window 720 based on a font size of text described in the content positioned relatively at the center among the contents within the window 720. For example, the wearable device 401 may determine the position of the window 720 based on a size of a main content among the contents within the window 720. For example, the wearable device 401 may determine the position of the window 720 based on a font size of text described in the main content among the contents within the window 720.

For example, the wearable device 401 may determine the position of the window 720 based on a size of a content that a gaze 701 of the user 405 faces among the contents within the window 720. For example, the wearable device 401 may determine the position of the window 720 based on a font size of text described in the content that the gaze 701 of the user 405 faces among the contents within the window 720. In an embodiment, the wearable device 401 may identify the gaze 701 of the user 405 based on the images of the eyes of the user 405 obtained through the camera assembly 480. For example, the wearable device 401 may identify the gaze 701 of the user 405 based on positions of irises of the eyes indicated by the images of the eyes of the user 405.

For example, referring to FIG. 7B, the wearable device 401 may move the window 720 from the first distance 731 from the user 405 to a second distance 735 from the user 405 based on receiving the input (e.g., the state 713 in which the eyes are half-opened) for changing the position of the window 720. However, the disclosure is not limited thereto. For example, the wearable device 401 may display a new window at the second distance 735 from the user 405 closer than the window 720 displayed at the first distance 731 from the user 405 based on receiving the input (e.g., the state 713 in which the eyes are half-opened). In an embodiment, the new window may have the same size as the window 720. In an embodiment, a size of a content included in the new window may have the same size as the content within the window 720. In an embodiment, the new window may be displayed on a virtual axis connecting the user 405 and the window 720.

For example, the wearable device 401 may display at least one content at the second distance 735 from the user 405 among the contents within the window 720 at the second distance 735 from the user 405 closer than the window 720 displayed at the first distance 731 from the user 405, based on receiving the input (e.g., the state 713 in which the eyes are half-opened).

For example, the wearable device 401 may display a content, at the second distance 735 from the user 405, that the gaze 701 faces at the second distance 735 from the user 405 closer than the window 720 displayed at the first distance 731 from the user 405 based on receiving the input (e.g., the state 713 in which the eyes are half-opened). In an embodiment, a content displayed at the second distance 735 may have the same size as a content of the window 720 displayed at the first distance 731. In an embodiment, the content displayed at the second distance 735 may be displayed on the virtual axis connecting the user 405 and the window 720.

In an embodiment, the wearable device 401 may move the window 720 from the first distance 731 to the second distance 735 based on translational transform. In an embodiment, the wearable device 401 may move the window 720 from the first distance 731 to the second distance 735 based on the translational transform without scaling transform. In an embodiment, the translational transform may be to move the window 720 so that the size of the window 720 and a size of a content within the window 720 are not changed in the three-dimensional virtual space 400. In an embodiment, the translational transform may be to translate the window 720 so that a ratio of the window 720 and a ratio of the content within the window 720 with respect to the window 720 are not changed in the three-dimensional virtual space 400. In an embodiment, the size of the window 720 in the three-dimensional virtual space 400 may be maintained by the translational transform. In an embodiment, the size of the window 720 shown to the user 405 may be changed by the translational transform. This may refer, for example, to the window 720 being seen to be large as the window 720 is close to or far away from the user 405, and does not refer, for example, to the size of the window 720 changing in the three-dimensional virtual space 400. In an embodiment, the scaling transform may be changing the size of the window 720 in the three-dimensional virtual space 400.

Referring to FIG. 7C, for example, after the window 720 is moved from the first distance 731 from the user 405 to the second distance 735 from the user 405, the input (e.g., the state 713 in which the eyes are half-opened) for changing the position of the window 720 may be released (e.g., a state 715 in which the eyes are generally opened). However, the disclosure is not limited thereto. For example, the wearable device 401 may cease moving the window 720 based on the movement of the window 720 from the first distance 731 from the user 405 to the second distance 735 from the user 405 while the input for changing the position of the window 720 is maintained. For example, the wearable device 401 may fix the window 720 in a state positioned at the second distance 735 for a specified time even while the input for changing the position of the window 720 is maintained.

Figure 8A:
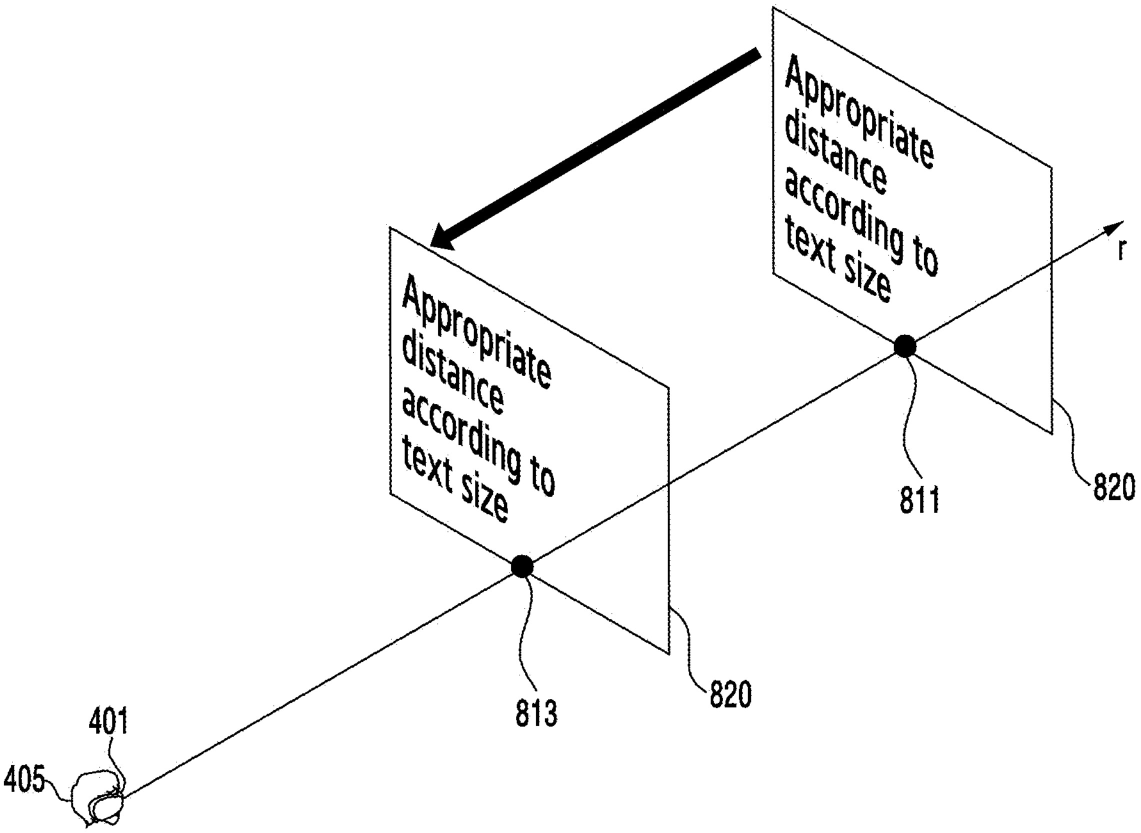
FIG. 8A is a diagram illustrating an example of an operation in which a wearable device moves a two-dimensional window to a position determined according to visual acuity of a user within a depth range resolvable by the user according to various embodiments.

FIG. 8A is a diagram illustrating an example of an operation in which a wearable device moves a two-dimensional window to a position determined according to visual acuity of a user within a depth range resolvable by the user according to various embodiments.

FIG. 8A may be described with reference to FIGS. 1 to 5E.

In an embodiment, a wearable device 401 may display a window 820 through a display assembly 460. In an embodiment, the wearable device 401 may display the window 820 in a three-dimensional virtual space 400 based on a position, a direction, and/or a size determined based on an input for displaying the window 820 through the display assembly 460. For example, referring to FIG. 8A, the wearable device 401 may display the window 820 at a first distance 811 from a user 405.

In an embodiment, the wearable device 401 may receive an input for changing a position of the window 820 while displaying the window 820 through the display assembly 460. In an embodiment, the input for changing the position of the window 820 may be an input for changing a depth of the window 820. In an embodiment, the input for changing the position of the window 820 may be an input for changing a distance of the window 820 from the user 405. For example, the input for changing the position of the window 820 may be an input for changing the position of the window 820 close to the user 405. However, the disclosure is not limited thereto. For example, the input for changing the position of the window 820 may be an input for changing the position of the window 820 far from the user 405.

For example, reception of the input for changing the position of the window 820 may include a voice input of the user 405, an input transmitted from an external electronic device (e.g., a smart ring, a smart watch, a smartphone, a remote controller, or a stylus), and/or a gesture of the user 405.

In an embodiment, the wearable device 401 may determine a new position and/or a new size of the window 820 in the three-dimensional virtual space 400 based on receiving the input for changing the position of the window 820.

For example, referring to FIG. 8A, the wearable device 401 may move the window 820 from the first distance 811 from the user 405 to a second distance 813 from the user 405 based on receiving the input for changing the position of the window 820.

In an embodiment, the wearable device 401 may move the window 820 from the first distance 811 to the second distance 813 based on translational transform. In an embodiment, the wearable device 401 may move the window 820 from the first distance 811 to the second distance 813 based on the translational transform without scaling transform.

In an embodiment, the wearable device 401 may move the window 820 so that a size of the window 820 and a size of a content within the window 820 are not changed in the three-dimensional virtual space 400. In an embodiment, the wearable device 401 may move the window 820 so that a ratio of the window 820 and a ratio of the content within the window 820 with respect to the window 820 are not changed in the three-dimensional virtual space 400. In an embodiment, the wearable device 401 may move the window 820 so that the size of the window 820 is maintained in the three-dimensional virtual space 400.

For example, referring to FIG. 8A, according to the movement of the window 820, a size of the window 820 at the first distance 811 may be the same as a size of the window 820 at the second distance 813. For example, referring to FIG. 8A, according to the movement of the window 820, a size (e.g., a font size) of a content within the window 820 at the first distance 811 may be the same as a size (e.g., a font size) of a content within the window 820 at the second distance 813. For example, referring to FIG. 8A, according to the movement of the window 820, an arrangement (e.g., a line change) of a content within the window 820 at the first distance 811 may be the same as an arrangement (e.g., a line change) of a content within the window 820 at the second distance 813.

For example, the wearable device 401 may move the window 820 from the first distance 811 from the user 405 to the second distance 813 from the user 405 while the input for changing the position of the window 820 is maintained.

For example, the wearable device 401 may cease moving the window 820 based on the movement of the window 820 from the first distance 811 to the second distance 813 while the input for changing the position of the window 820 is maintained. For example, the wearable device 401 may fix the window 820 in a state positioned at the second distance 813 for a specified time even while the input for changing the position of the window 820 is maintained.

Figure 8B:
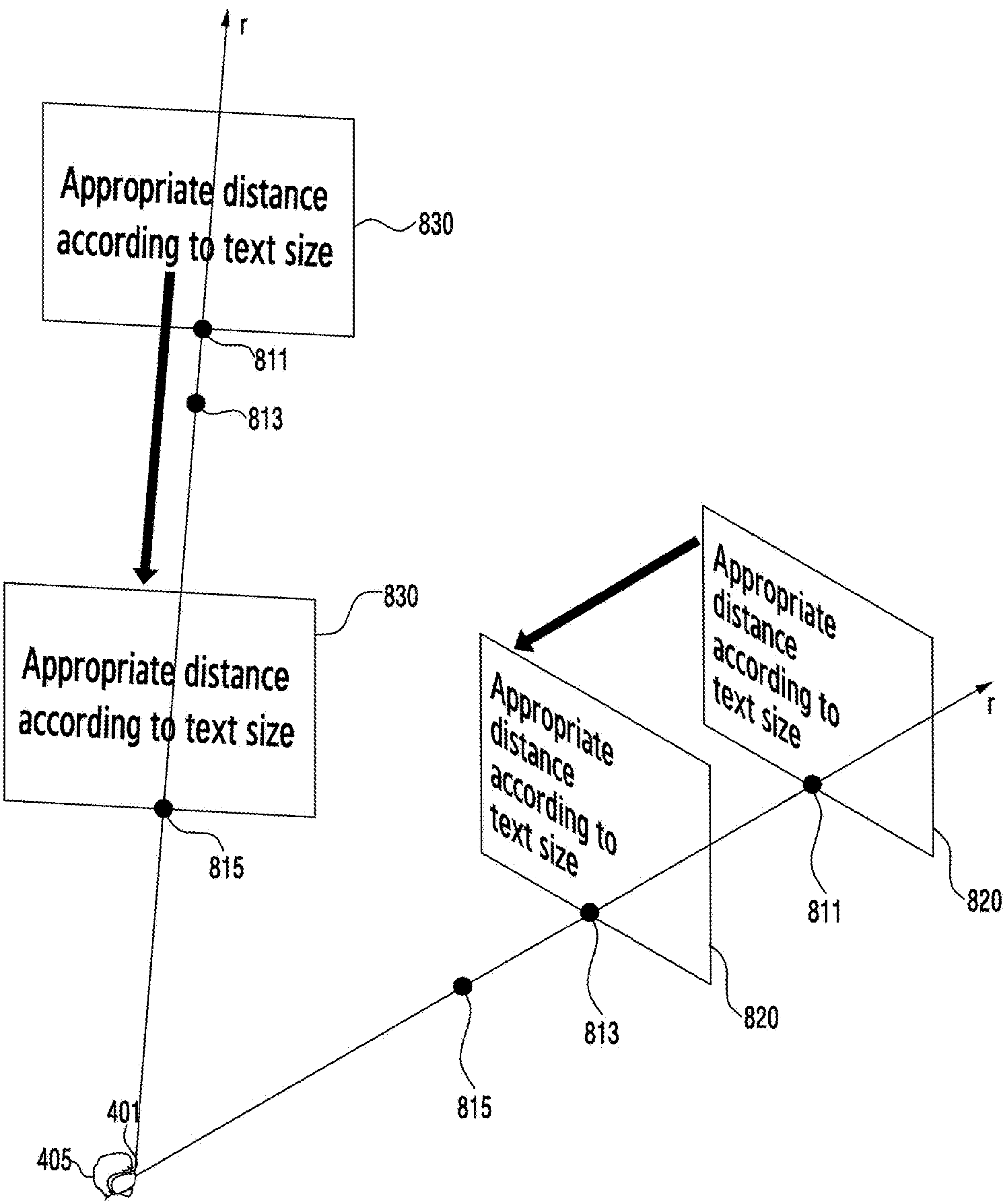
FIG. 8B illustrates an example of an operation in which a wearable device moves a two-dimensional window to a position determined according to visual acuity of a user within a depth range resolvable by the user according to various embodiments.
Figure 8C:
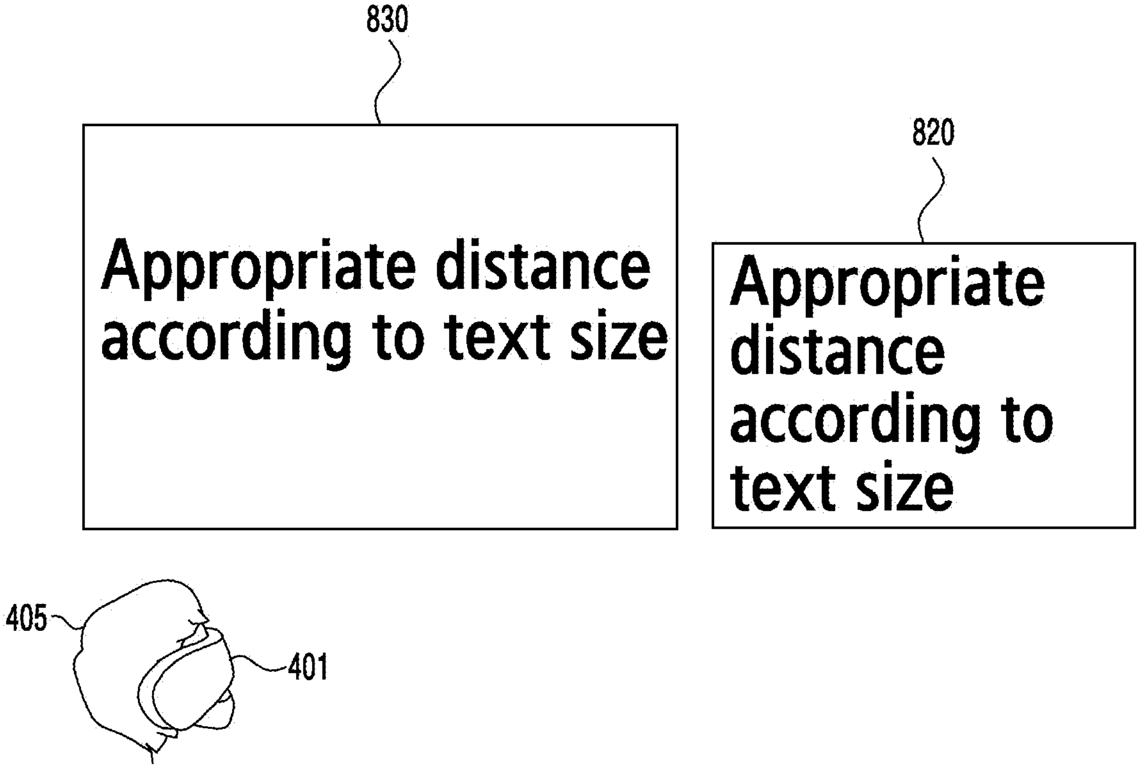
FIG. 8C is a diagram illustrating two-dimensional windows moved by a wearable device on a plane according to various embodiments.

FIG. 8B is a diagram illustrating an example of an operation in which a wearable device moves a two-dimensional window to a position determined according to visual acuity of a user within a depth range resolvable by the user according to various embodiments. FIG. 8C is a diagram illustrating two-dimensional windows moved by a wearable device on a plane according to various embodiments.

FIGS. 8B and 8C may be described with reference to FIGS. 1 to 5E and FIG. 8A.

In an embodiment, a wearable device 401 may display a window 820 and a window 830 through a display assembly 460. In an embodiment, the wearable device 401 may display the window 820 and the window 830 in a three-dimensional virtual space 400 based on a position, a direction, and/or a size determined based on an input for displaying the window 820 and the window 830 through the display assembly 460. For example, referring to FIG. 8B, the wearable device 401 may display the window 820 and the window 830 at a first distance 811 from a user 405.

In an embodiment, the wearable device 401 may receive an input for changing a position of the window 820 and/or the window 830 while displaying the window 820 and the window 830 through the display assembly 460. In an embodiment, the input for changing the position of the window 820 and/or the window 830 may be an input for changing a depth of the window 820 and/or the window 830. In an embodiment, the input for changing the position of the window 820 and/or the window 830 may be an input for changing a distance of the window 820 and/or the window 830 from the user 405.

In an embodiment, the wearable device 401 may determine a new position and/or a new size of the window 820 and/or the window 830 in the three-dimensional virtual space 400 based on receiving the input for changing the position of the window 820 and/or the window 830.

For example, referring to FIG. 8B, the wearable device 401 may move the window 820 from the first distance 811 from the user 405 to a second distance 813 from the user 405 based on receiving a first input for changing the position of the window 820. For example, referring to FIG. 8B, the wearable device 401 may move the window 830 from the first distance 811 from the user 405 to a third distance 815 from the user 405 based on receiving a second input for changing the position of the window 830.

In an embodiment, the wearable device 401 may move the window 820 from the first distance 811 to the second distance 813 based on translational transform. In an embodiment, the wearable device 401 may move the window 820 from the first distance 811 to the second distance 813 based on the translational transform without scaling transform. In an embodiment, the wearable device 401 may move the window 830 from the first distance 811 to the third distance 815 based on the translational transform. In an embodiment, the wearable device 401 may move the window 830 from the first distance 811 to the third distance 815 based on the translational transform without the scaling transform.

Referring to FIG. 8B, since a size (e.g., a font size) of a content within the window 830 is smaller than a size (e.g., a font size) of a content within the window 820, the wearable device 401 may move the window 830 to the third distance 815 closer than the second distance 813. Referring to FIG. 8C, the wearable device 401 may move the window 830 to the third distance 815 in which the size (e.g., the font size) of the content within the window 830 is visible to the user 405 the same as the size (e.g., the font size) of the content within the window 820.

For example, referring to FIG. 8B, according to the movement of the window 820, a size of the window 820 at the first distance 811 may be the same as a size of the window 820 at the second distance 813. For example, referring to FIG. 8B, according to the movement of the window 820, a size (e.g., a font size) of a content within the window 820 at the first distance 811 may be the same as a size (e.g., a font size) of a content within the window 820 at the second distance 813. For example, referring to FIG. 8B, according to the movement of the window 820, an arrangement (e.g., a line change) of a content within the window 820 at the first distance 811 may be the same as an arrangement (e.g., a line change) of a content within the window 820 at the second distance 813.

For example, referring to FIG. 8B, according to the movement of the window 830, a size of the window 830 at the first distance 811 may be the same as a size of the window 830 at the third distance 815. For example, referring to FIG. 8B, according to the movement of the window 830, a size (e.g., a font size) of a content within the window 830 at the first distance 811 may be the same as a size (e.g., a font size) of a content within the window 830 at the third distance 815. For example, referring to FIG. 8B, according to the movement of the window 830, an arrangement (e.g., a line change) of a content within the window 830 at the first distance 811 may be the same as an arrangement (e.g., a line change) of a content within the window 830 at the third distance 815.

Referring to FIG. 8C, as the wearable device 401 may move the window 830 to the third distance 815 in which the size (e.g., the font size) of the content within the window 830 is visible to the user 405 the same as the size (e.g., the font size) of the content within the window 820, the user 405 may feel that the font size within the window 830 and the font size within the window 820 are the same. However, this may refer, for example, to the font size within the window 830 and the font size within the window 820 appearing to be the same as the window 830 and the window 820 are separated from the user 405 by relatively different distances, and does not refer, for example, to the font size within the window 830 changing to be the same as the font size within the window 820.

For example, the wearable device 401 may cease moving the window 830 based on movement of the window 830 from the first distance 811 to the third distance 815, while the input for changing the position of the window 830 is maintained. For example, the wearable device 401 may fix the window 830 in a state positioned at the third distance 815 for a specified time even while the input for changing the position of the window 830 is maintained.

Figure 9A:
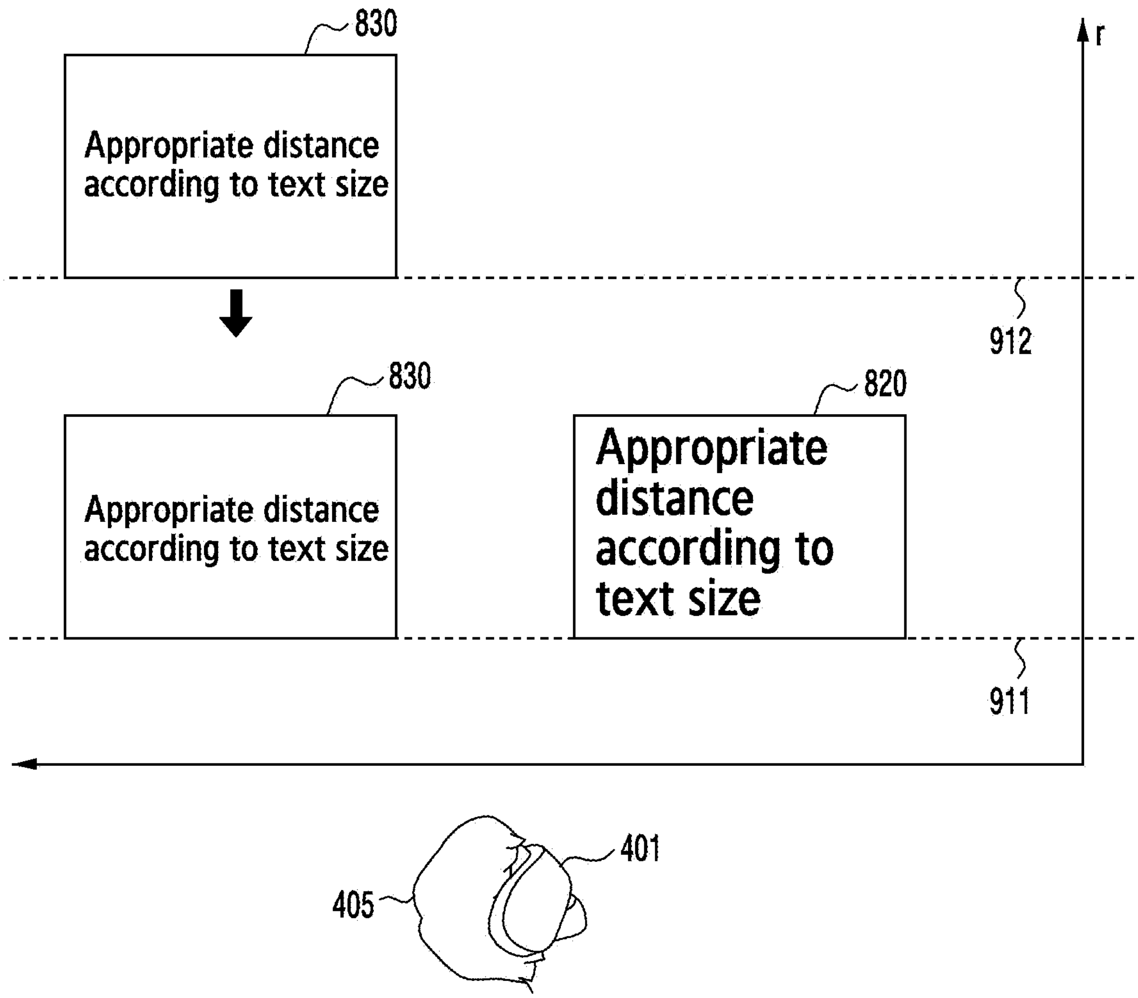
FIG. 9A is a diagram illustrating a situation on a plane in which a wearable device positions two-dimensional windows at different depths according to various embodiments.

FIG. 9A is a diagram illustrating a situation on a plane in which a wearable device positions two-dimensional windows at different depths according to various embodiments.

FIG. 9A may be described with reference to FIGS. 1 to 5E.

In an embodiment, a wearable device 401 may display a window 820 and a window 830 through a display assembly 460. In an embodiment, the wearable device 401 may display the window 820 and the window 830 in a three-dimensional virtual space 400 based on a position, a direction, and/or a size determined based on an input for displaying the window 820 and the window 830 through the display assembly 460. For example, referring to FIG. 9A, the wearable device 401 may display the window 820 at a first distance 911 from a user 405 and the window 830 at a second distance 912 from the user 405. In an embodiment, the first distance 911 may be determined based on a size of the window 820 and/or a size of a content within the window 820. In an embodiment, the second distance 912 may be determined based on a size of the window 830 and/or a size of a content within the window 830.

In an embodiment, the wearable device 401 may receive an input for changing a position of the window 830 while displaying the window 820 and the window 830 through the display assembly 460. In an embodiment, the input for changing the position of the window 830 may be an input for changing a depth of the window 830. In an embodiment, the input for changing the position of the window 830 may be an input for changing a distance of the window 830 from the user 405.

In an embodiment, the wearable device 401 may determine a new position and/or a new size of the window 830 in the three-dimensional virtual space 400 based on receiving the input for changing the position of the window 830. In an embodiment, the wearable device 401 may determine a new position and/or a new size of the window 830 in the three-dimensional virtual space 400 based on another window other than the window 830.

In an embodiment, the wearable device 401 may move the window 830 to a distance corresponding to a distance of the other window to align with the other window based on receiving the input for changing the position of the window 830. For example, referring to FIG. 9A, the wearable device 401 may move the window 830 from the second distance 912 from the user 405 to the first distance 911 corresponding to a distance of the window 820 based on receiving the input for changing the position of the window 830.

In an embodiment, the wearable device 401 may move the window 830 from the second distance 912 to the first distance 911 based on translational transform. In an embodiment, the wearable device 401 may move the window 830 from the second distance 912 to the first distance 911 based on the translational transform without scaling transform.

For example, the wearable device 401 may cease moving the window 830 based on the movement of the window 830 from the second distance 912 to the first distance 911 while the input for changing the position of the window 830 is maintained. For example, the wearable device 401 may fix the window 830 in a state positioned at the first distance 911 for a specified time even while the input for changing the position of the window 830 is maintained. For example, the wearable device 401 may fix the window 830 in a state of being aligned to the other window 820 for a specified time based on the window 830 being aligned with the other window 820 while the input for changing the position of the window 830 is maintained.

Figure 9B:
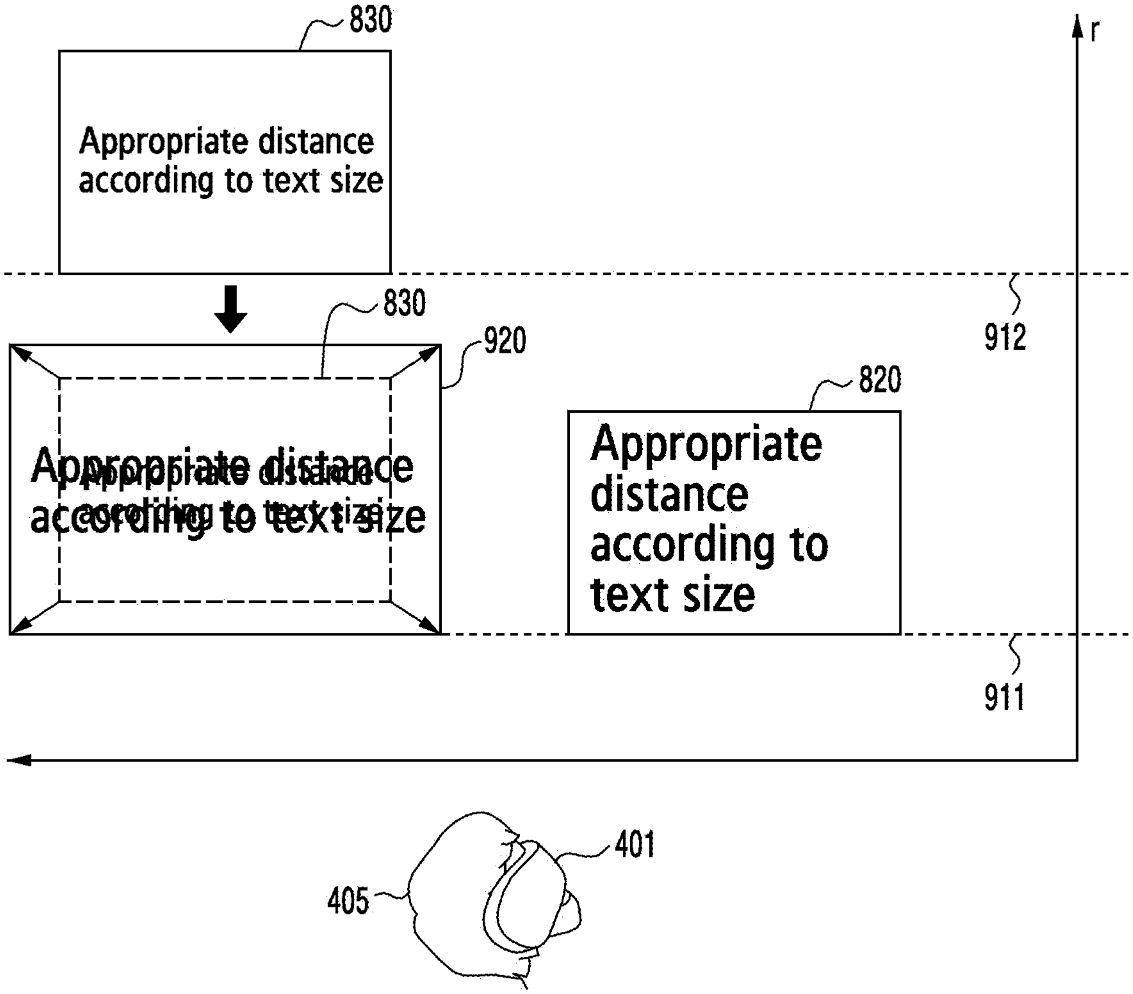
FIG. 9B is a diagram illustrating a situation on a plane in which a size changes as a wearable device moves a two-dimensional window according to various embodiments.
Figure 9C:
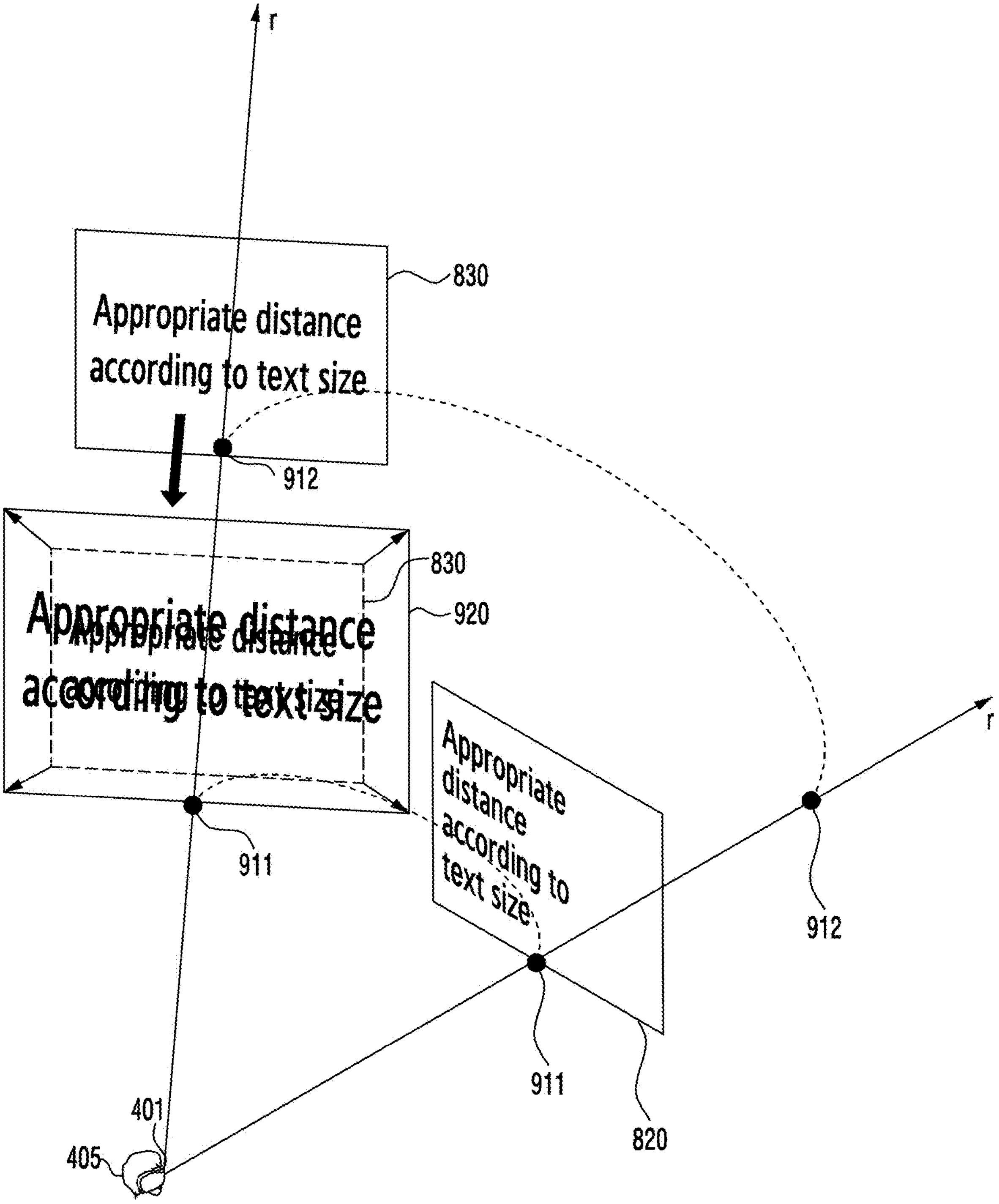
FIG. 9C is a diagram illustrating a situation in which a size changes as a wearable device moves a two-dimensional window according to various embodiments.

FIG. 9B is a diagram illustrating a situation on a plane in which a size changes as a wearable device moves a two-dimensional window according to various embodiments. FIG. 9C is a diagram illustrating a situation in which a size changes as a wearable device moves a two-dimensional window according to various embodiments.

FIGS. 9B and 9C may be described with reference to FIGS. 1 to 5E. In FIGS. 9B and 9C, compared to FIG. 9A, an operation of further performing scaling transform with respect to a window 830 together with translational transform with respect to the window 830 may be described.

In an embodiment, a wearable device 401 may display a window 820 and the window 830 through a display assembly 460. In an embodiment, the wearable device 401 may display the window 820 and the window 830 in a three-dimensional virtual space 400 based on a position, a direction, and/or a size determined based on an input for displaying the window 820 and the window 830 through the display assembly 460. For example, referring to FIGS. 9B and 9C, the wearable device 401 may display the window 820 at a first distance 911 from a user 405 and the window 830 at a second distance 912 from the user 405. In an embodiment, the first distance 911 may be determined based on a size of the window 820 and/or a size of a content within the window 820. In an embodiment, the second distance 912 may be determined based on a size of the window 830 and/or a size of a content within the window 830.

In an embodiment, the wearable device 401 may receive an input for changing a position of the window 830 while displaying the window 820 and the window 830 through the display assembly 460. In an embodiment, the input for changing the position of the window 830 may be an input for changing a depth of the window 830. In an embodiment, the input for changing the position of the window 830 may be an input for changing a distance of the window 830 from the user 405.

In an embodiment, the wearable device 401 may determine a new position and/or a new size of the window 830 in the three-dimensional virtual space 400 based on receiving the input for changing the position of the window 830. In an embodiment, the wearable device 401 may determine a new position and/or a new size of the window 830 in the three-dimensional virtual space 400 based on another window other than the window 830.

In an embodiment, the wearable device 401 may move the window 830 to a distance corresponding to a distance of the other window to align with the other window based on receiving the input for changing the position of the window 830. For example, referring to FIGS. 9B and 9C, the wearable device 401 may move the window 830 from the second distance 912 from the user 405 to the first distance 911 corresponding to a distance of the window 820 based on receiving the input for changing the position of the window 830. In an embodiment, the wearable device 401 may move the window 830 from the second distance 912 to the first distance 911 based on translational transform.

In an embodiment, based on receiving the input for changing the position of the window 830, the wearable device 401 may enlarge the window 830, so that the size of the content within the window 830 corresponds to the size of the content within the window 820 for alignment with the size of the content within the window 820.

In an embodiment, the wearable device 401 may enlarge the size of the window 830 and the size of the content within the window 830 so that the size of the content within the window 830 corresponds to the size of the content within the window 820. In an embodiment, the wearable device 401 may enlarge the size of the window 830 and the size of the content within the window 830 so that a ratio of the window 830 and/or a ratio of the content within the window 830 are maintained. As the size of the window 830 and the size of the content within the window 830 are enlarged so that the ratio of the window 830 and/or the ratio of the content within the window 830 are maintained, a layout of an enlarged window 920 and/or a layout of a content within the enlarged window 920 may not be changed.

For example, the wearable device 401 may enlarge the size of the window 830 and the size of the content within the window 830 so that the size (e.g., a font size) of the content within the window 830 corresponds to the size (e.g., a font size) of the content within the window 820 while moving the window 830 from the second distance 912 to the first distance 911, based on receiving the input for changing the position of the window 830. However, the disclosure is not limited thereto. For example, the wearable device 401 may enlarge the size of the window 830 and the size of the content within the window 830 so that the size (e.g., a font size) of the content within the window 830 corresponds to the size (e.g., a font size) of the content within the window 820 after moving the window 830 from the second distance 912 to the first distance 911, based on receiving the input for changing the position of the window 830.

For example, referring to FIGS. 9B and 9C, according to the translational transform and the scaling transform of the window 830, a size of the enlarged window 920 at the first distance 911 may be larger than the size of the window 830 at the second distance 912. For example, referring to FIGS. 9B and 9C, according to the translational transform and the scaling transform of the window 830, an arrangement (e.g., a line change) of a content within the enlarged window 920 at the first distance 911 may be the same as an arrangement (e.g., a line change) of a content within the window 830 at the second distance 912.

For example, referring to FIGS. 9B and 9C, according to the translational transform and the scaling transform of the window 830, a size (e.g., a font size) of the content within the enlarged window 920 at the first distance 911 may be larger than the size (e.g., the font size) of the content within the window 820 at the second distance 912.

For example, the wearable device 401 may cease moving the window 830 based on the movement of the window 830 from the second distance 912 to the first distance 911 while the input for changing the position of the window 830 is maintained. For example, the wearable device 401 may fix the window 830 in a state positioned at the first distance 911 for a specified time even while the input for changing the position of the window 830 is maintained. For example, the wearable device 401 may fix the window 830 in a state of being aligned to the other window 820 for a specified time based on the window 830 being aligned with the other window 820 while the input for changing the position of the window 830 is maintained.

Figure 9D:
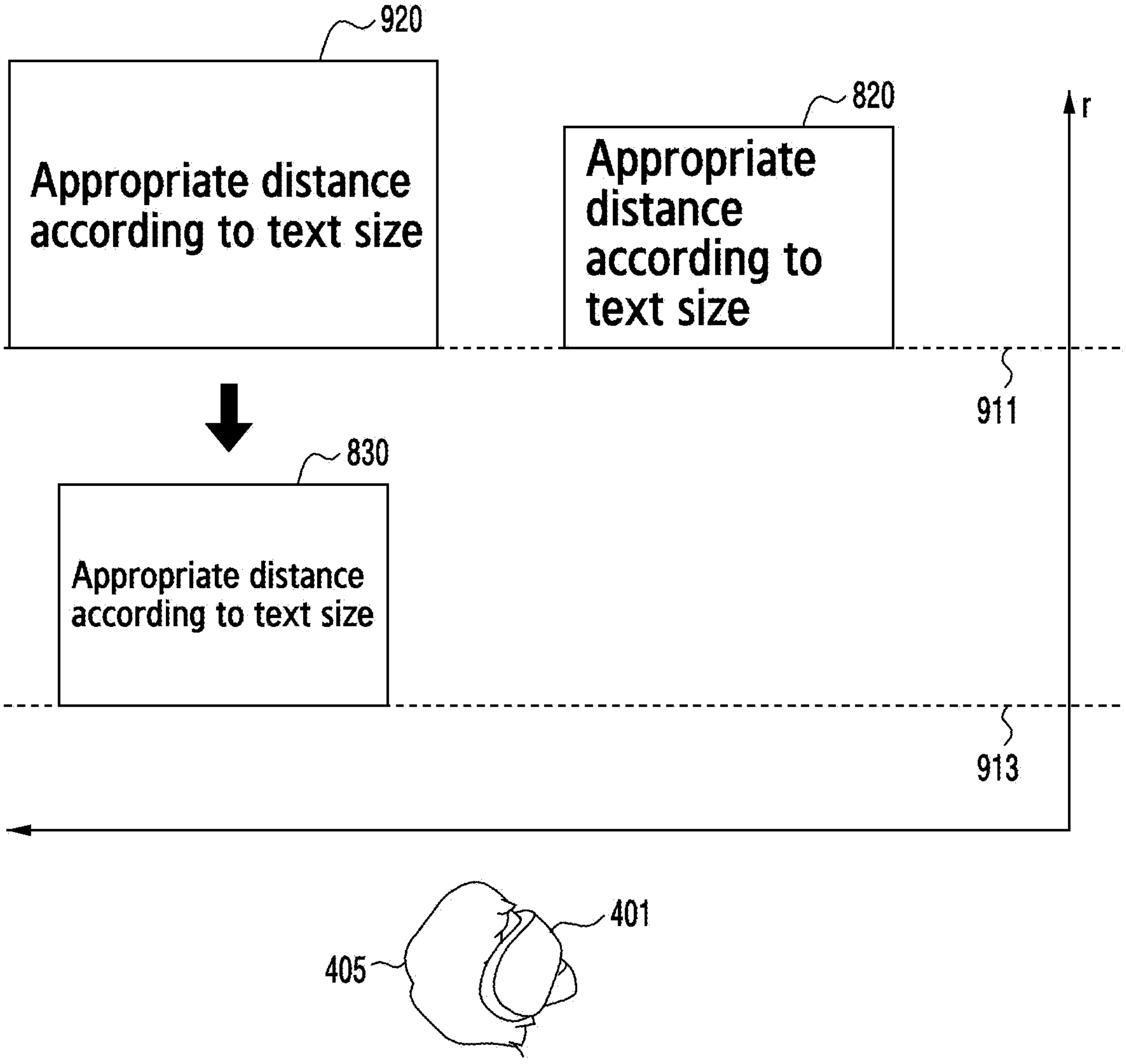
FIG. 9D is a diagram illustrating a situation on a plane in which a size changes as a wearable device moves a two-dimensional window according to various embodiments.
Figure 9E:
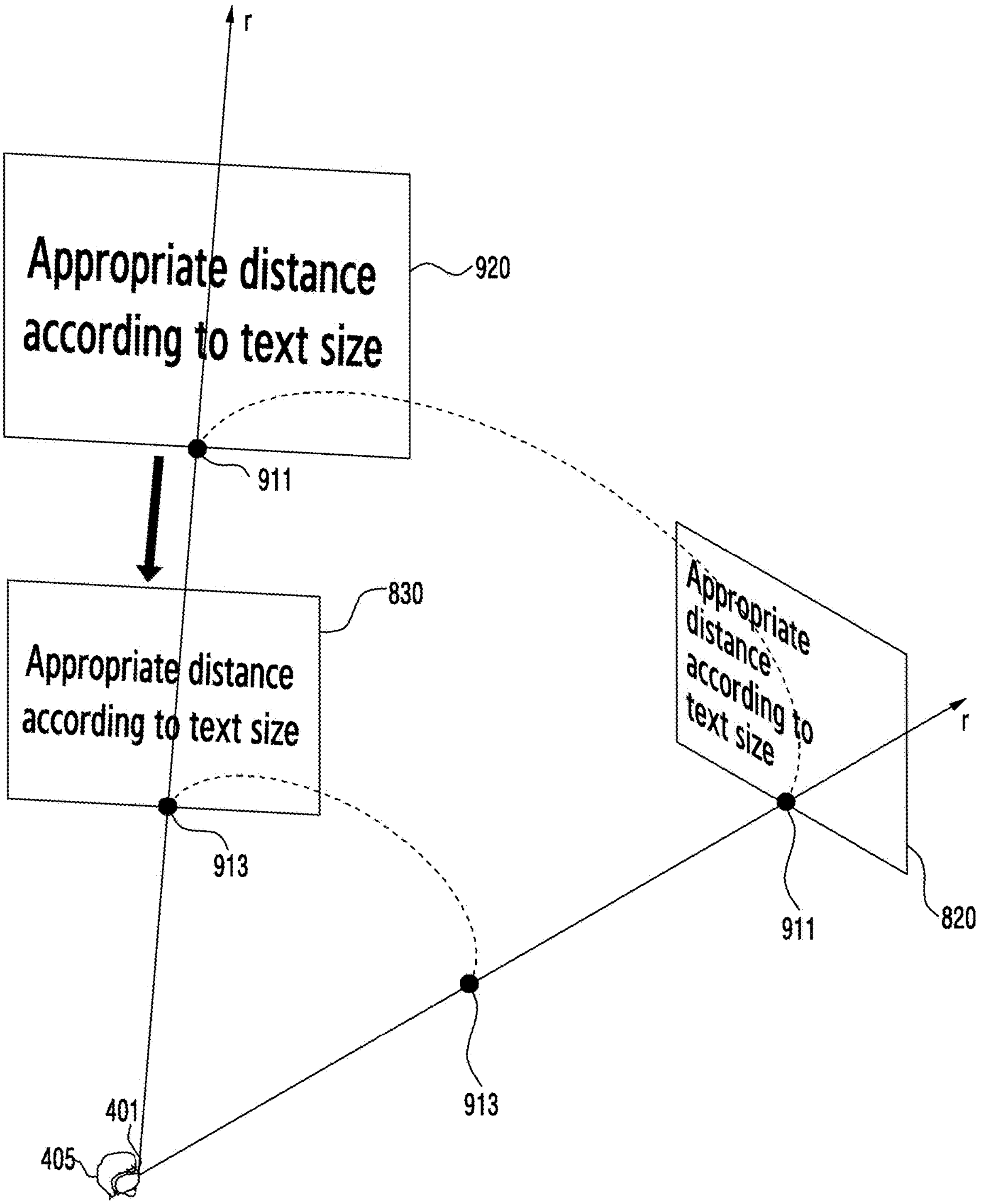
FIG. 9E is a diagram illustrating a situation in which a size changes as a wearable device moves a two-dimensional window according to various embodiments.

FIG. 9D is a diagram illustrating a situation on a plane in which a size changes as a wearable device moves a two-dimensional window according to various embodiments. FIG. 9E is a diagram illustrating a situation in which a size changes as a wearable device moves a two-dimensional window according to various embodiments.

FIGS. 9D and 9E may be described with reference to FIGS. 1 to 5E and FIGS. 9B and 9C. FIGS. 9D and 9E may illustrate a subsequent operation of FIGS. 9B and 9C. In FIGS. 9D and 9E, compared to FIG. 9A, an operation of further performing scaling transform with respect to an enlarged window 920 together with translational transform with respect to the enlarged window 920 may be described.

In an embodiment, the wearable device 401 may display a window 820 and the enlarged window 920 through a display assembly 460. In an embodiment, while displaying a window 830 at a second distance 912, the wearable device 401 may display the enlarged window 920 at a first distance 911 through the display assembly 460 based on an input for changing a position of the window 830. In an embodiment, the wearable device 401 may display the window 820 and the enlarged window 920 at the first distance 911.

In an embodiment, the wearable device 401 may receive an input for changing a position of the enlarged window 920 while displaying the window 820 and the enlarged window 920 through the display assembly 460. In an embodiment, the input for changing the position of the enlarged window 920 may be an input for changing a depth of the enlarged window 920. In an embodiment, the input for changing the position of the enlarged window 920 may be an input for changing a distance of the enlarged window 920 from the user 405. In an embodiment, the input for changing the position of the enlarged window 920 may be a continuous input to the input for changing the position of the window 830 described through FIGS. 9B and 9C. However, the disclosure is not limited thereto. For example, the input for changing the position of the enlarged window 920 may be an input input after the input for changing the position of the window 830 described through FIGS. 9B and 9C is released.

In an embodiment, the wearable device 401 may determine a new position and/or a new size of the enlarged window 920 in a three-dimensional virtual space 400 based on receiving the input for changing the position of the enlarged window 920. In an embodiment, the wearable device 401 may determine a new position and/or a new size of the enlarged window 920 in the three-dimensional virtual space 400 based on release of alignment between the enlarged window 920 and the window 820. For example, referring to FIGS. 9D and 9E, the wearable device 401 may move the enlarged window 920 based on receiving the input for changing the position of the enlarged window 920 aligned with another window (e.g., the window 820).

In an embodiment, the wearable device 401 may reduce a size of the window 920 enlarged for size alignment with the window 820 to a size of the original window 820 based on receiving the input for changing the position of the enlarged window 920. In an embodiment, the wearable device 401 may reduce a size of a content within the window 920 enlarged for size alignment with a content within the window 820 to a size of a content within the original window 830 based on receiving the input for changing the position of the enlarged window 920. In an embodiment, the wearable device 401 may reduce the size of the enlarged window 920 and the size of the content within the enlarged window 920. In an embodiment, the wearable device 401 may reduce the size of the enlarged window 920 and the size of the content within the enlarged window 920 so that a ratio of the enlarged window 920 and/or a ratio of the content within the enlarged window 920 are maintained.

For example, the wearable device 401 may enlarge the size of the enlarged window 920 and the size of the content within the enlarged window 920 so that the size (e.g., a font size) of the content within the enlarged window 920 corresponds to the size (e.g., a font size) of the content within the original window 830 while moving the enlarged window 920 from the first distance 911 to a third distance 913, based on receiving the input for changing the position of the enlarged window 920. However, the disclosure is not limited thereto. For example, the wearable device 401 may enlarge the size of the enlarged window 920 and the size of the content within the enlarged window 920 so that the size (e.g., the font size) of the content within the enlarged window 920 corresponds to the size (e.g., the font size) of the content within the original window 830 after moving the enlarged window 920 from the first distance 911 to the third distance 913, based on receiving the input for changing the position of the enlarged window 920.

For example, referring to FIGS. 9D and 9E, according to the translational transform and the scaling transform of the enlarged window 920, a size of the reduced window 830 at the third distance 913 may be the same as a size of the original window 830 at the second distance 912. For example, referring to FIGS. 9D and 9E, according to the translational transform and the scaling transform of the enlarged window 920, an arrangement (e.g., a line change) of a content within the reduced window 830 at the third distance 913 may be the same as an arrangement (e.g., a line change) of a content within the original window 830 at the second distance 912. For example, referring to FIGS. 9D and 9E, according to the translational transform and the scaling transform of the enlarged window 920, a size (e.g., a font size) of the content within the reduced window 830 at the third distance 913 may be the same as a size (e.g., a font size) of the content within the original window 830 at the second distance 912.

Figure 10A:
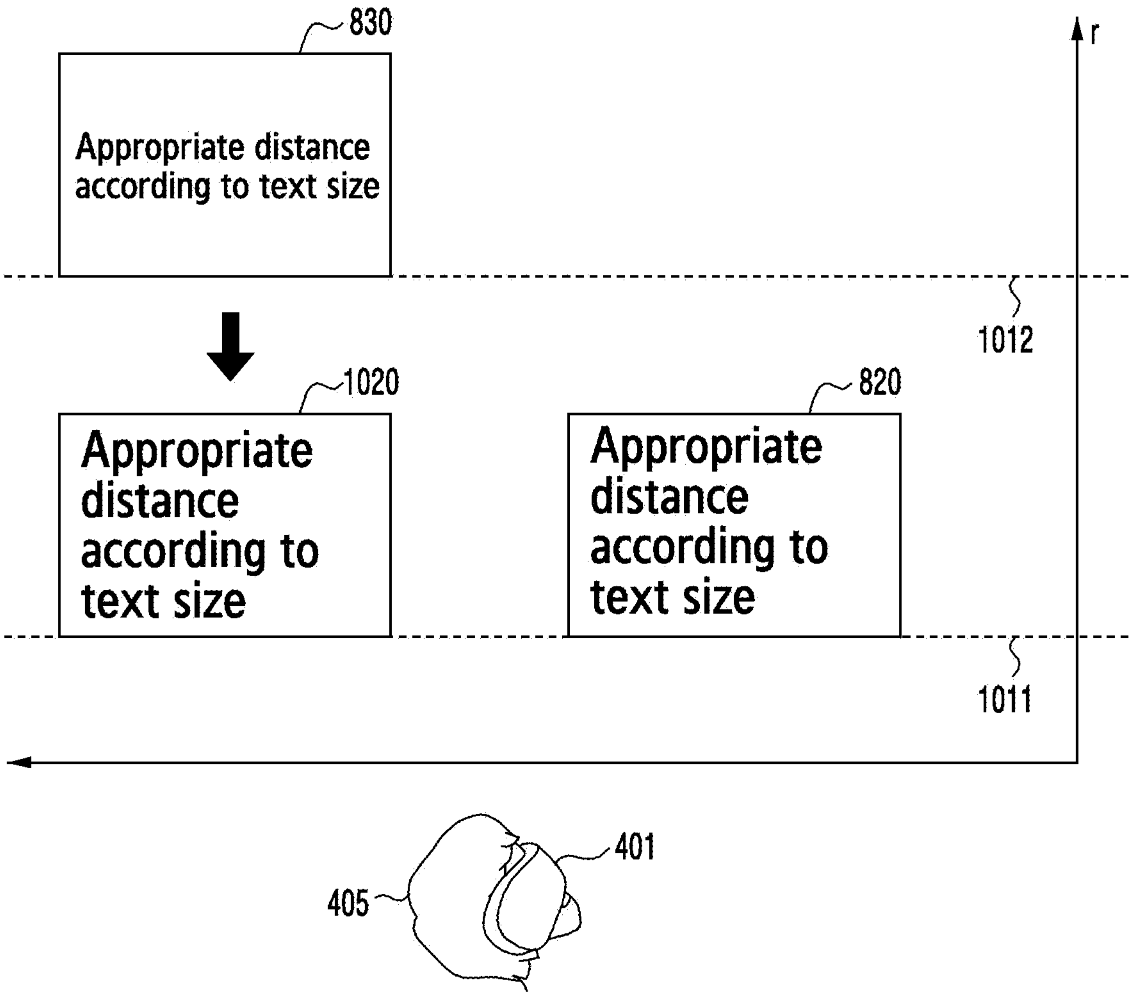
FIG. 10A is a diagram illustrating a situation on a plane in which a size changes as a wearable device moves a two-dimensional window according to various embodiments.
Figure 10B:
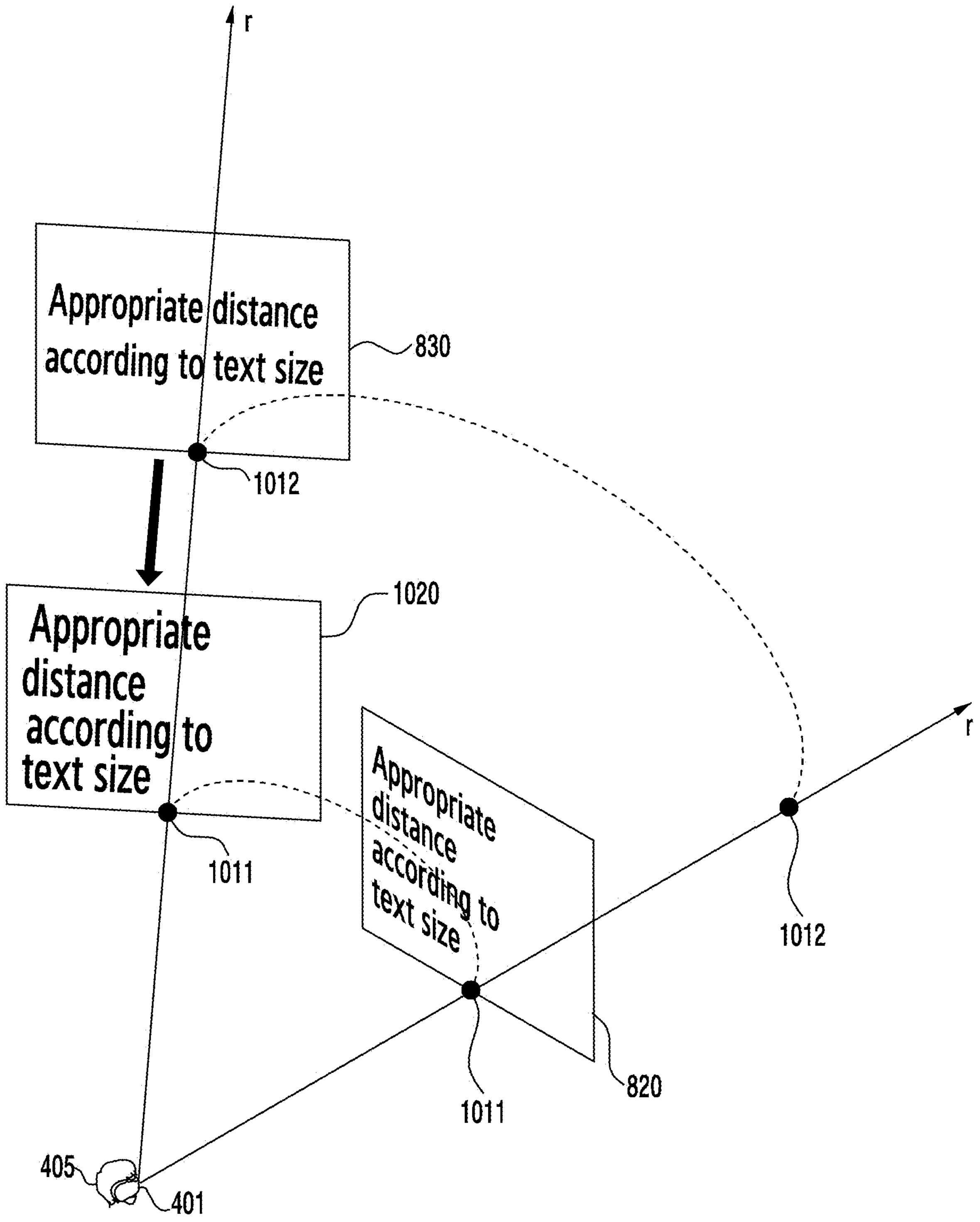
FIG. 10B is a diagram illustrating a situation in which a size changes as a wearable device moves a two-dimensional window according to various embodiments.

FIG. 10A is a diagram illustrating a situation on a plane in which a size changes as a wearable device moves a two-dimensional window according to various embodiments. FIG. 10B is a diagram illustrating a situation in which a size changes as a wearable device moves a two-dimensional window according to various embodiments.

FIGS. 10A and 10B may be described with reference to FIGS. 1 to 5E. In FIGS. 10A and 10B, compared to FIGS. 9B and 9C, an operation of performing scaling transform with respect to a content within a window 830 without scaling transform with respect to the window 830 may be described.

In an embodiment, a wearable device 401 may display a window 820 and the window 830 through a display assembly 460. For example, referring to FIGS. 10A and 10B, the wearable device 401 may display the window 820 at a first distance 1011 from a user 405 and the window 830 at a second distance 1012 from the user 405. In an embodiment, the first distance 1011 may be determined based on a size of the window 820 and/or a size of a content within the window 820. In an embodiment, the second distance 1012 may be determined based on a size of the window 830 and/or a size of a content within the window 830.

In an embodiment, the wearable device 401 may receive an input for changing a position of the window 830 while displaying the window 820 and the window 830 through the display assembly 460. In an embodiment, the input for changing the position of the window 830 may be an input for changing a depth of the window 830. In an embodiment, the input for changing the position of the window 830 may be an input for changing a distance of the window 830 from the user 405.

In an embodiment, the wearable device 401 may determine a new position and/or a new size of the window 830 in a three-dimensional virtual space 400 based on receiving the input for changing the position of the window 830. In an embodiment, the wearable device 401 may determine a new position and/or a new size of the window 830 in the three-dimensional virtual space 400 based on another window other than the window 830.

In an embodiment, the wearable device 401 may move the window 830 to a distance corresponding to a distance of the other window to align with the other window based on receiving the input for changing the position of the window 830. For example, referring to FIGS. 10A and 10B, the wearable device 401 may move the window 830 from the second distance 1012 from the user 405 to the first distance 1011 corresponding to a distance of the window 820 based on receiving the input for changing the position of the window 830. In an embodiment, the wearable device 401 may move the window 830 from the second distance 1012 to the first distance 1011 based on translational transform.

In an embodiment, the wearable device 401 may enlarge the size of the content within the window 830 so that the size of the content within the window 830 corresponds to the size of the content within the window 820 for alignment with the size of the content within the window 820 based on receiving the input for changing the position of the window 830. In an embodiment, the wearable device 401 may enlarge the size of the content within the window 830 without changing the size of the window 830 so that the size of the content within the window 830 corresponds to the size of the content within the window 820. As the size of the content within the window 830 is enlarged without changing the size of the window 830, a layout of a content within a window 1020 may be changed.

For example, the wearable device 401 may enlarge the size of the content within the window 830 without changing the size of the window 830 so that the size (e.g., a font size) of the content within the window 830 corresponds to the size (e.g., a font size) of the content within the window 820 while moving the window 830 from the second distance 1012 to the first distance 1011, based on receiving the input for changing the position of the window 830. However, the disclosure is not limited thereto. For example, the wearable device 401 may enlarge the size of the content within the window 830 without changing the size of the window 830 so that the size (e.g., a font size) of the content within the window 830 corresponds to the size (e.g., a font size) of the content within the window 820 after moving the window 830 from the second distance 1012 to the first distance 1011, based on receiving the input for changing the position of the window 830.

For example, referring to FIGS. 10A and 10B, according to translational transform of the window 830, a size of the window 1020 at the first distance 1011 may be the same as the window 830 at the second distance 1012. For example, referring to FIGS. 10A and 10B, according to the translational transform of the window 830 and scaling transform of the content, an arrangement (e.g., a line change) of a content within the window 1020 at the first distance 1011 may be different from an arrangement (e.g., a line change) of a content within the window 830 at the second distance 1012. For example, referring to FIGS. 10A and 10B, according to the translational transform of the window 830 and the scaling transform of the content, a size (e.g., a font size) of a content within the window 1020 at the first distance 1011 may be larger than a size (e.g., a font size) of a content within the window 820 at the second distance 1012.

For example, the wearable device 401 may cease moving the window 830 based on the movement of the window 830 from the second distance 1012 to the first distance 1011 while the input for changing the position of the window 830 is maintained. For example, the wearable device 401 may fix the window 830 in a state positioned at the first distance 1011 for a specified time even while the input for changing the position of the window 830 is maintained. For example, the wearable device 401 may fix the window 830 in a state of being aligned to the other window 820 for a specified time based on the window 830 being aligned with the other window 820 while the input for changing the position of the window 830 is maintained.

Figure 10C:
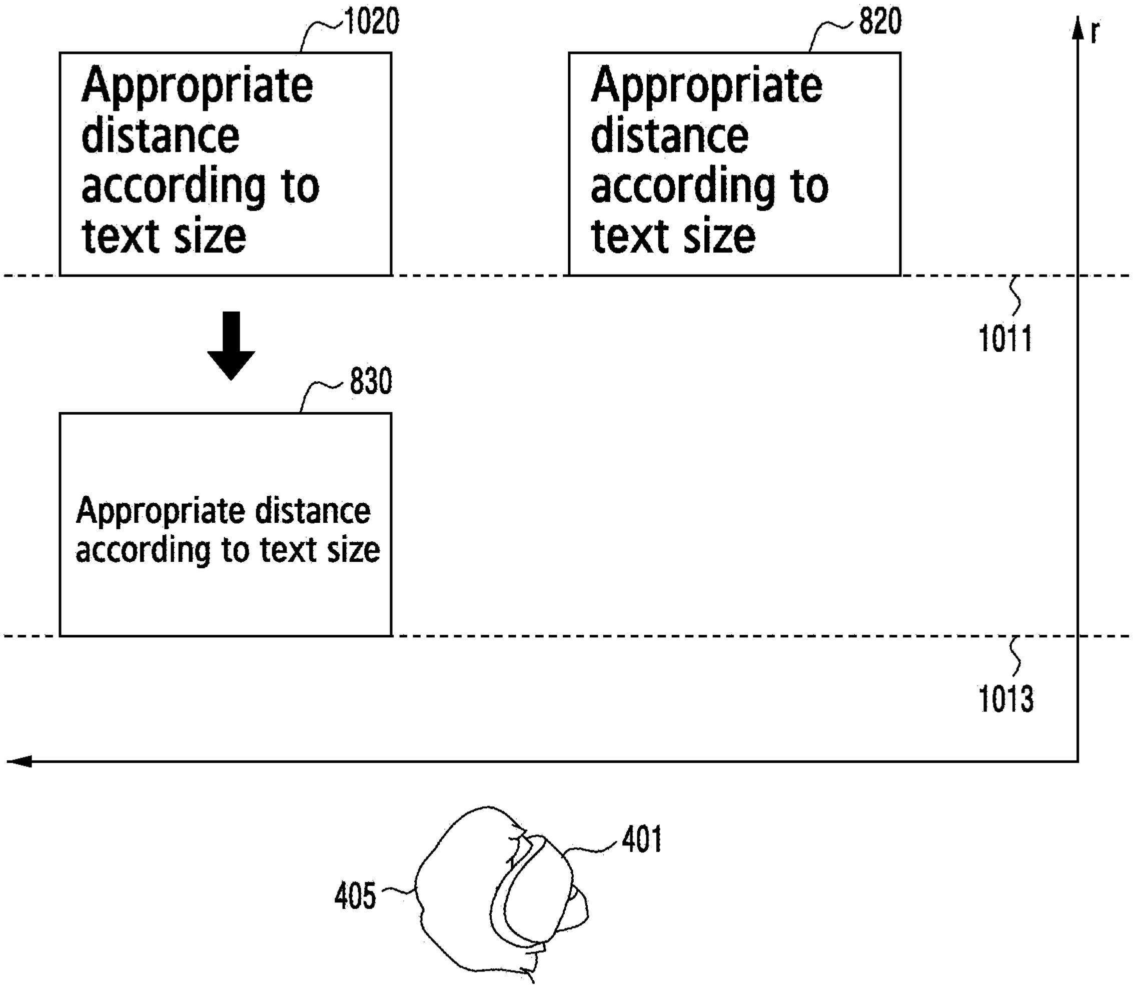
FIG. 10C is a diagram illustrating a situation on a plane in which a size changes as a wearable device moves a two-dimensional window according to various embodiments.
Figure 10D:
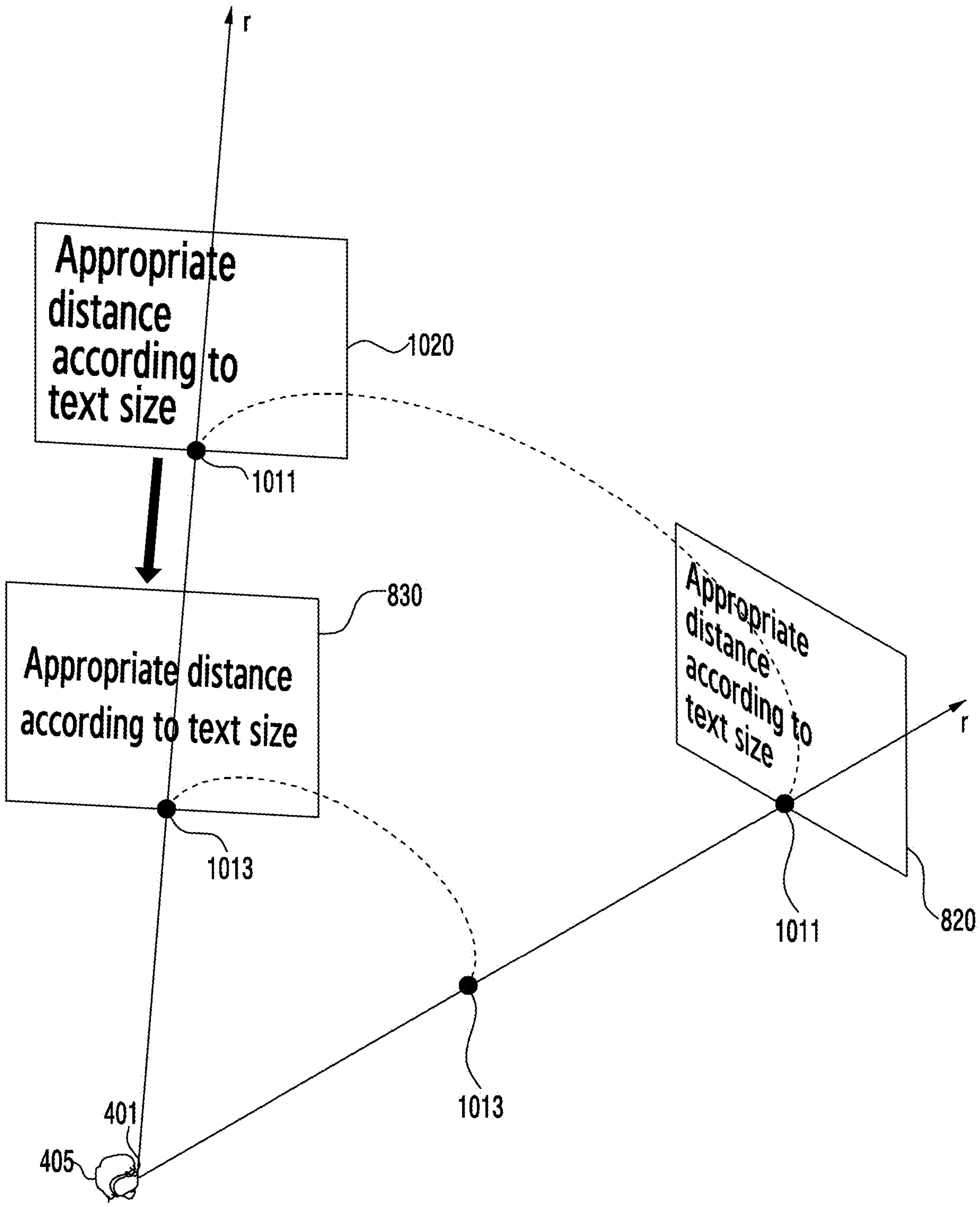
FIG. 10D is a diagram illustrating a situation in which a size changes as a wearable device moves a two-dimensional window according to various embodiments.

FIG. 10C is a diagram illustrating a situation on a plane in which a size changes as a wearable device moves a two-dimensional window according to various embodiments. FIG. 10D is a diagram illustrating a situation in which a size changes as a wearable device moves a two-dimensional window according to various embodiments.

FIGS. 10C and 10D may be described with reference to FIGS. 1 to 5E and FIGS. 9A to 9C. FIGS. 10C and 10D may illustrate a subsequent operation of FIGS. 9B and 9C. In FIGS. 10C and 10D, compared to FIGS. 9D and 9E, an operation of performing scaling transform with respect to a content within a window 1020 without scaling transform with respect to the window 1020 may be described.

In an embodiment, a wearable device 401 may display a window 820 and the window 1020 through a display assembly 460. In an embodiment, the wearable device 401 may display the window 1020 through the display assembly 460 at a first distance 1011 based on an input for changing a position of a window 830 while displaying the window 830 at a second distance 1012. In an embodiment, the wearable device 401 may display the window 820 and the window 1020 at the first distance 1011.

In an embodiment, the wearable device 401 may receive an input for changing a position of the window 1020 while displaying the window 820 and the window 1020 through the display assembly 460. In an embodiment, the input for changing the position of the window 1020 may be an input for changing a depth of the window 1020. In an embodiment, the input for changing the position of the window 1020 may be an input for changing a distance of the window 1020 from the user 405. In an embodiment, the input for changing the position of the window 1020 may be a continuous input to the input for changing the position of the window 830 described through FIGS. 10A and 10B. However, the disclosure is not limited thereto. For example, the input for changing the position of the window 1020 may be an input input after the input for changing the position of the window 830 described through FIGS. 10A and 10B is released.

In an embodiment, the wearable device 401 may determine a new position and/or a new size of the window 1020 in a three-dimensional virtual space 400 based on receiving the input for changing the position of the window 1020. In an embodiment, the wearable device 401 may determine a new position and/or a new size of the window 1020 in the three-dimensional virtual space 400 based on release of alignment between the window 1020 and the window 820. For example, referring to FIGS. 10C and 10D, the wearable device 401 may move the window 1020 based on receiving the input for changing the position of the window 1020 aligned with another window (e.g., the window 820).

In an embodiment, the wearable device 401 may reduce a size of the content within the window 1020, for size alignment with a content within the window 820, to a size of a content within the original window 830 based on receiving the input for changing the position of the window 1020. In an embodiment, the wearable device 401 may reduce the size of the content within the window 1020 without scaling transform of the window 1020. In an embodiment, the wearable device 401 may reduce the size of the content within the window 1020 without scaling transform of a size of the window 1020 so that a ratio of the window 1020 is maintained.

For example, the wearable device 401 may enlarge the size of the content within the window 1020 so that the size (e.g., a font size) of the content within the window 1020 corresponds to the size (e.g., a font size) of the content within the original window 830 while moving the window 1020 from the first distance 1011 to a third distance 1013, based on receiving the input for changing the position of the window 1020. However, the disclosure is not limited thereto. For example, the wearable device 401 may enlarge the size of the content within the window 1020 so that the size (e.g., the font size) of the content within the window 1020 corresponds to the size (e.g., the font size) of the content within the original window 830 after moving the window 1020 from the first distance 1011 to the third distance 1013, based on receiving the input for changing the position of the window 1020.

For example, referring to FIGS. 10C and 10D, according to translational transform of the window 1020, a size of the window 830 at the third distance 1013 may be the same as a size of the window 1020 at the first distance 1011 and a size of the window 830 at the second distance 1012. For example, referring to FIGS. 10C and 10D, according to the translational transform of the window 1020 and scaling transform of the content, an arrangement (e.g., a line change) of a content within the window 830 at the third distance 1013 may be the same as an arrangement (e.g., a line change) of a content within the original window 830 at the second distance 1012. For example, referring to FIGS. 10C and 10D, according to the translational transform of the window 1020 and the scaling transform of the content, a size (e.g., a font size) of the content within the reduced window 830 at the third distance 1013 may be the same as a size (e.g., a font size) of the content within the original window 830 at the second distance 1012.

Figure 11A:
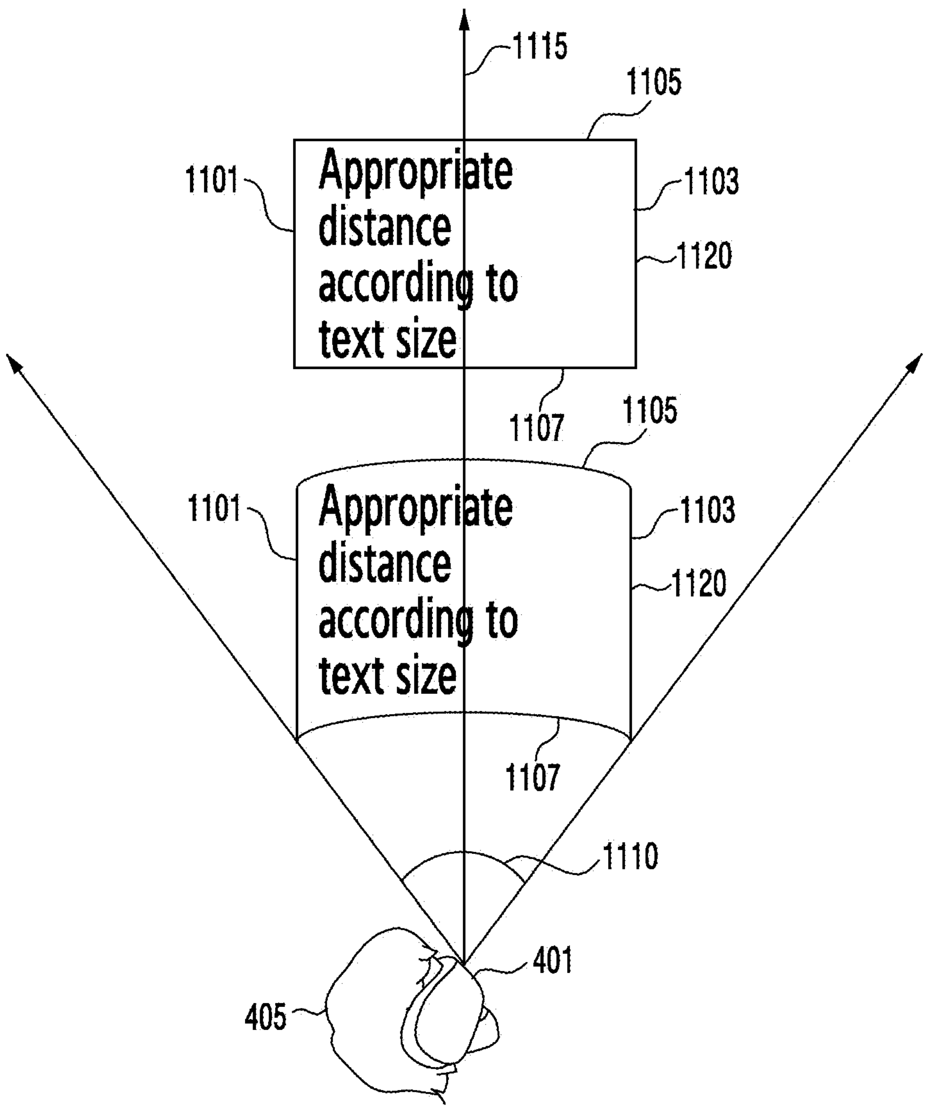
FIG. 11A is a diagram illustrating a situation on a plane in which a two-dimensional window is curved as a wearable device moves a two-dimensional window according to various embodiments.
Figure 11B:
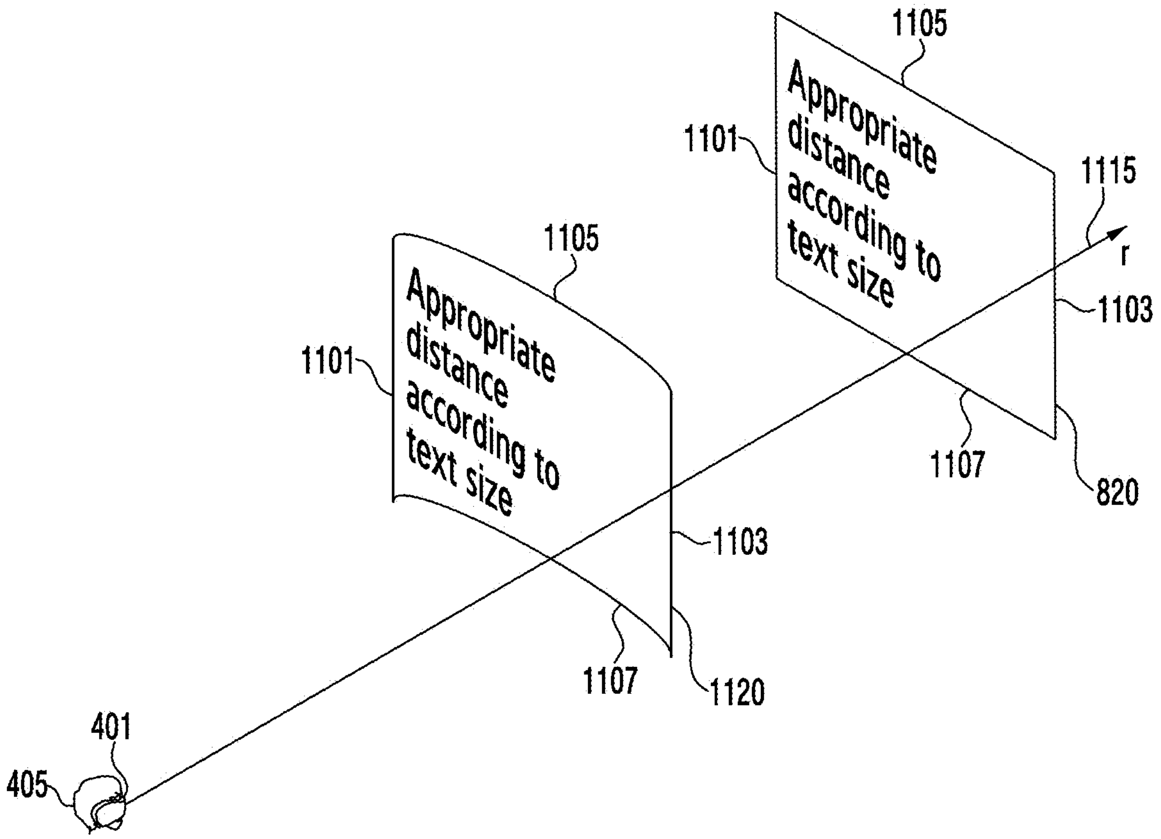
FIG. 11B is a diagram illustrating a situation in which a two-dimensional window is curved in a left-right direction as a wearable device moves a two-dimensional window according to various embodiments.
Figure 11C:
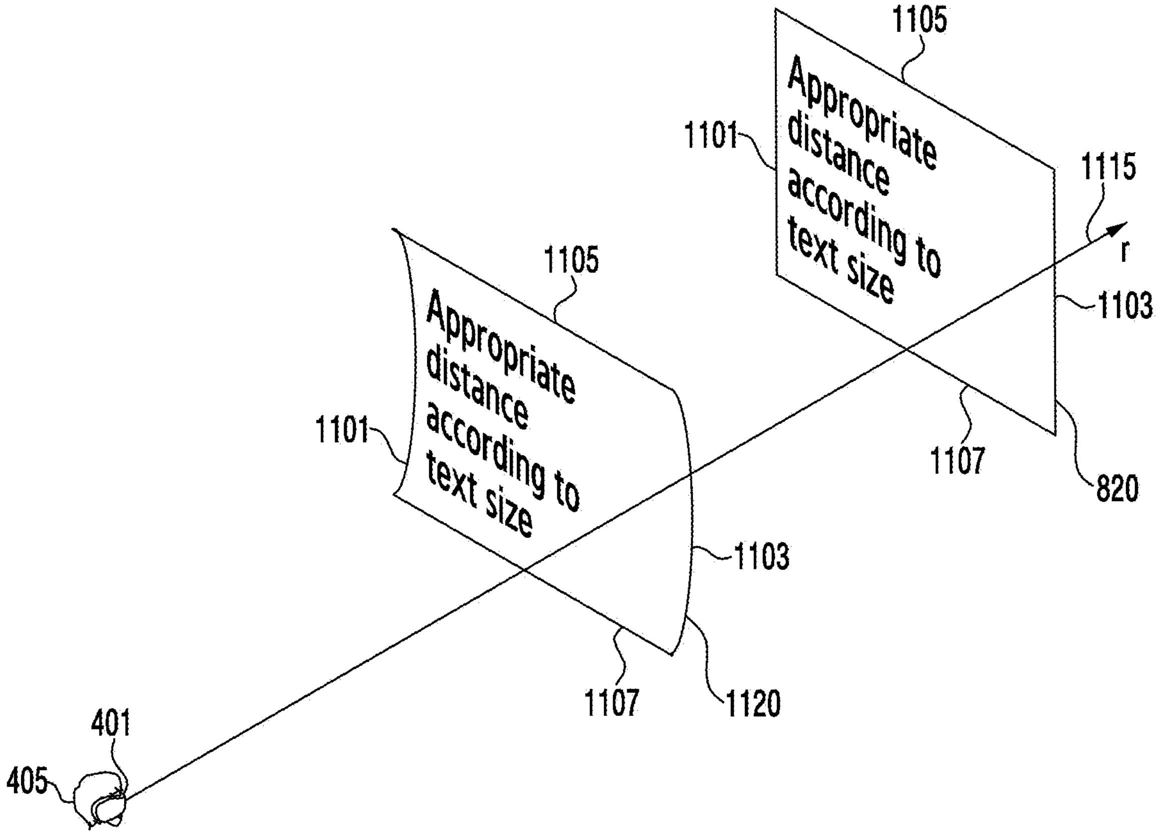
FIG. 11C is a diagram illustrating a situation in which a two-dimensional window is curved in an up-down direction as a wearable device moves a two-dimensional window according to various embodiments.

FIG. 11A is a diagram illustrating a situation on a plane in which a two-dimensional window is curved as a wearable device moves the two-dimensional window according to various embodiments. FIG. 11B is a diagram illustrating a situation in which a two-dimensional window is curved in a left-right direction as a wearable device moves the two-dimensional window according to various embodiments. FIG. 11C is a diagram illustrating a situation in which a two-dimensional window is curved in an up-down direction as a wearable device moves the two-dimensional window according to various embodiments.

FIGS. 11A, 11B and 11C may be described with reference to FIGS. 1 to 5E.

In an embodiment, a wearable device 401 may display a window 820 through a display assembly 460. In an embodiment, the wearable device 401 may receive an input for changing a position of the window 820 while displaying the window 820 through the display assembly 460. In an embodiment, the input for changing the position of the window 820 may be an input for changing a depth of the window 820.

For example, referring to FIGS. 11A, 11B and 11C, the wearable device 401 may move the window 820 toward a user 405 based on receiving the input for changing the position of the window 820.

In an embodiment, as the window 820 is moved toward the user 405, the wearable device 401 may identify whether the window 820 is out of a field of view 1110 (e.g., 30 degrees to left and right, 15 degrees up and down) of the user 405. For example, the window 820 being out of the field of view 1110 of the user 405 may include a length of the window 820 being longer than a length (or a length of a side opposite (or opposite the field of view 1110) when the user 405 is a vertex) (e.g., a left-right length, or an up-down length) considering the field of view 1110 of the user 405.

In an embodiment, as the window 820 is moved toward the user 405, the wearable device 401 may identify whether at least one side of sides 1101, 1103, 1105, and 1107 of the window 820 is out of the field of view 1110 of the user 405. For example, a side of the window 820 being out of the field of view 1110 of the user 405 may include the side of the window 820 being out of a boundary (or a limit) of the field of view 1110 centered on a gaze 1115 of the user 405.

In an embodiment, the wearable device 401 may curve the window 820 so that the sides 1101 and 1103 of the window 820 are not out of the field of view 1110 based on identifying that the sides 1101 and 1103 of the window 820 are out of the field of view 1110. In an embodiment, the wearable device 401 may curve at least one side of the sides 1101, 1103, 1105, and 1107 based on identifying that the window 820 is out of the field of view 1110 of the user 405. In an embodiment, the wearable device 401 may curve at least one side of the sides 1101, 1103, 1105, and 1107 according to a specified curvature based on identifying that the window 820 is out of the field of view 1110 of the user 405. In an embodiment, the specified curvature may be determined based on a size of the window 820, a length of a side of the window 820, and/or a size of a content within the window 820. In an embodiment, the specified curvature may be determined based on visual acuity information of the user 405.

For example, referring to FIGS. 11A and 11B, the wearable device 401 may curve the sides 1105 and 1107 of the window 820 so that the sides 1101 and 1103 are not out of the field of view 1110 based on identifying that the sides 1101 and 1103 of the window 820 are out of the field of view 1110. However, the disclosure is not limited thereto. For example, referring to FIG. 11C, the wearable device 401 may curve the sides 1101 and 1103 of the window 820 so that the sides 1105 and 1107 are not out of the field of view 1110 based on identifying that the sides 1105 and 1107 of the window 820 are out of the field of view 1110.

In an embodiment, a layout of a content within a curved window 1120 may be the same as a layout of a content within the window 820. For example, referring to FIGS. 11A and 11B, a size (e.g., a font size) of the content within the curved window 1120 may be the same as a size (e.g., a font size) of the content within the window 820.

Figure 12:
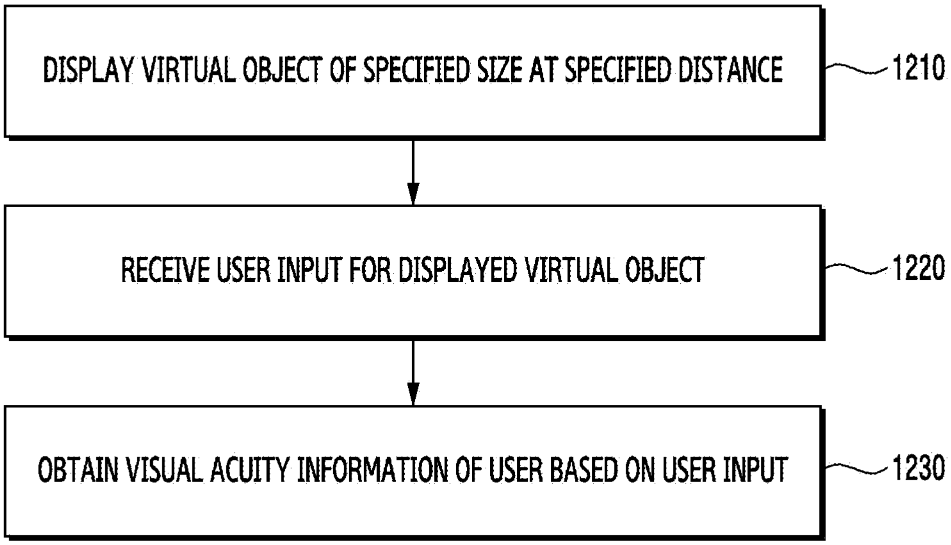
FIG. 12 is a flowchart illustrating an example operation of a wearable device according to various embodiments.

FIG. 12 is a flowchart illustrating an example operation of a wearable device 401 according to various embodiments.

FIG. 12 may be described with reference to FIGS. 4A to 11C. Operations of FIG. 12 may be sequentially performed for each of a plurality of distances. The operations of FIG. 12 may be sequentially performed for each of a plurality of sizes.

Referring to FIG. 12, in operation 1210, a wearable device 401 may display a virtual object of a specified size at a specified distance. In an embodiment, when displaying a FOV 410 in a three-dimensional virtual space 400 through a display assembly 460, the wearable device 401 may display a virtual object at a specified distance determined within a system depth range 510. In an embodiment, when displaying the FOV 410 in the three-dimensional virtual space 400 through the display assembly 460, the wearable device 401 may display a virtual object at a size determined within a size range (e.g., between a maximum size 531 and a minimum size 535).

In operation 1220, the wearable device 401 may receive an input (e.g., a user input) for the displayed virtual object. For example, the wearable device 401 may receive a user input indicating that the displayed virtual object is resolvable by a user 405. For example, the wearable device 401 may receive a user input indicating that the displayed virtual object is not resolvable by the user 405.

In operation 1230, the wearable device 401 may obtain visual acuity information of the user 405 based on a user input. For example, the wearable device 401 may obtain visual acuity information indicating that a size and a distance of the displayed virtual object are resolvable by the user 405, based on receiving the user input indicating that the displayed virtual object is resolvable by the user 405. For example, the wearable device 401 may obtain visual acuity information indicating that the size and the distance of the displayed virtual object are not resolvable by the user 405, based on receiving the user input indicating that the displayed virtual object is not resolvable by the user 405.

In an embodiment, the wearable device 401 may obtain the visual acuity information of the user 405 according to a plurality of distances and a plurality of sizes by sequentially performing the operations of FIG. 12 for each of the plurality of distances and the plurality of sizes.

Figure 13:
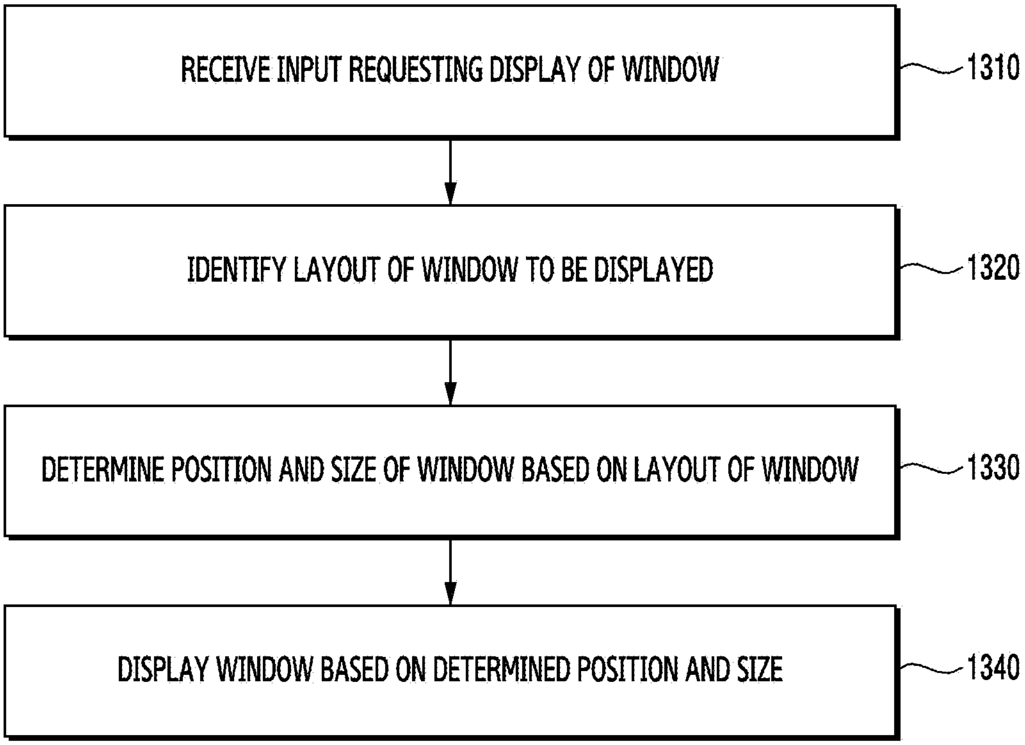
FIG. 13 is a flowchart illustrating an example operation of a wearable device according to various embodiments.

FIG. 13 is a flowchart illustrating an example operation of a wearable device 401 according to various embodiments.

FIG. 13 may be described with reference to FIGS. 4A to 11C.

Referring to FIG. 13, in operation 1310, a wearable device 401 may receive an input requesting display of a window. In an embodiment, the input requesting the display of the window may include an input for executing an application. For example, the window may be a virtual object on a two-dimensional plane. For example, the window may be a virtual object (or a virtual object having no volume) extending in three directions orthogonal to each other. For example, the window may be a window on a two-dimensional plane. However, the disclosure is not limited thereto. For example, the window may be a virtual object (or a virtual object having a volume) extending in three directions orthogonal to each other.

In an embodiment, an input for displaying the window may include an input for executing an application related to the window. For example, the input requesting the display of the window may include a voice input (e.g., "Display the window" and "Run the application") of a user 405. For example, the input requesting the display of the window may include an input transmitted from an external electronic device (e.g., the electronic device 102 of FIG. 1) (e.g., a smart ring, a smart watch, a smartphone, a remote controller, or a stylus). For example, the input requesting the display of the window may include a gesture (e.g., a gesture for displaying the window, a gesture for execution of an application) of the user 405. In an embodiment, the gesture of the user 405 may be a gesture through one of hands of the user 405 identified through an image obtained through a camera 485. In an embodiment, the gesture of the user 405 may be a gesture through at least one of eyes of the user 405 identified through images capturing the eyes of the user 405 obtained through a camera assembly 480.

In operation 1320, the wearable device 401 may identify a layout of the window to be displayed. In an embodiment, the wearable device 401 may identify dispositions of contents within the window to be displayed. In an embodiment, the wearable device 401 may identify sizes (or font sizes) of the contents within the window to be displayed. In an embodiment, the contents may be an image, a video, and/or text.

In operation 1330, the wearable device 401 may determine a position and a size of the window based on a layout of the window.

For example, the wearable device 401 may determine the position of the window based on a size of the smallest content among the contents within the window. For example, the wearable device 401 may determine the position of the window based on the smallest font size in text described in the contents within the window. For example, the wearable device 401 may determine the position of the window based on a size of a content relatively centered among the contents within the window. For example, the wearable device 401 may determine the position of the window based on a font size of text described in the content relatively centered among the contents within the window. For example, the wearable device 401 may determine the position of the window based on a size of a main content among the contents within the window. For example, the wearable device 401 may determine the position of the window based on a font size of text described in the main content among the contents within the window.

In operation 1340, the wearable device 401 may display the window based on a determined position and size.

Figure 14:
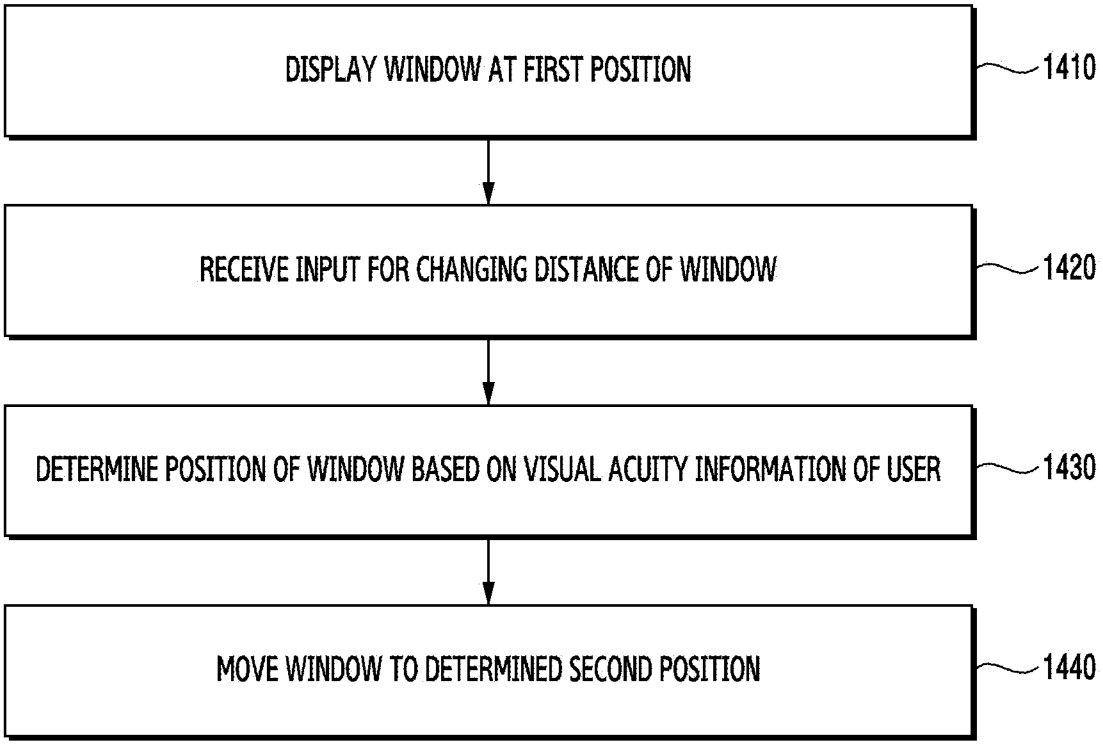
FIG. 14 is a flowchart illustrating an example operation of a wearable device according to various embodiments.

FIG. 14 is a flowchart illustrating an example operation of a wearable device 401 according to various embodiments.

FIG. 14 may be described with reference to FIGS. 4A to 11C.

Referring to FIG. 14, in operation 1410, a wearable device 401 may display a window at a first position. In an embodiment, the first position may be a position determined based on the operations according to FIG. 13.

In operation 1420, the wearable device 401 may receive an input for changing a distance of the window.

In an embodiment, the wearable device 401 may receive an input for changing a position of the window while displaying the window through a display assembly 460. In an embodiment, the input for changing the position of the window may be an input for changing a depth of the window. In an embodiment, the input for changing the position of the window may be an input for changing a distance of the window from a user 405. For example, the input for changing the position of the window may be an input for changing the position of the window close to the user 405. However, the disclosure is not limited thereto. For example, the input for changing the position of the window may be an input for changing the position of the window far from the user 405.

For example, reception of the input for changing the position of the window may include a voice input (e.g., "Change a display position of the window", "Display the window closer") of the user 405. For example, the reception of the input for changing the position of the window may include an input transmitted from an external electronic device (e.g., the electronic device 102 of FIG. 1) (e.g., a smart ring, a smart watch, a smartphone, a remote controller, or a stylus). For example, the reception of the input for changing the position of the window may include a gesture (e.g., a gesture for zooming in, a gesture for zooming out) of the user 405.

In an embodiment, the gesture of the user 405 may be a gesture through one of hands of the user 405 identified through an image obtained through a camera 485. In an embodiment, the gesture of the user 405 may be a gesture through at least one of eyes of the user 405 identified through images capturing the eyes of the user 405 obtained through a camera assembly 480. In an embodiment, the gesture through at least one of the eyes of the user 405 may include a gesture in which the user 405 half-closes the eyes.

In operation 1430, the wearable device 401 may determine the position of the window based on visual acuity information of the user. In an embodiment, the wearable device 401 may determine a position in a FOV 410 for displaying the window within a depth range 520 indicated by the visual acuity information of the user 405 based on receiving the input for changing the position of the window. In an embodiment, the wearable device 401 may determine the position in the FOV 410 based on a size of the window within the depth range 520. For example, the wearable device 401 may determine a position within the depth range 520 based on sizes of contents within the window.

For example, the wearable device 401 may determine the position of the window based on a size of the smallest content among the contents within the window. For example, the wearable device 401 may determine the position of the window based on the smallest font size in text described in the contents within the window. For example, the wearable device 401 may determine the position of the window based on a size of a content relatively centered among the contents within the window. For example, the wearable device 401 may determine the position of the window based on a font size of text described in the content relatively centered among the contents within the window. For example, the wearable device 401 may determine the position of the window based on a size of a main content among the contents within the window. For example, the wearable device 401 may determine the position of the window based on a font size of text described in the main content among the contents within the window.

For example, the wearable device 401 may determine the position of the window based on a size of a content that a gaze of the user 405 faces among the contents within the window. For example, the wearable device 401 may determine the position of the window based on a font size of text described in the content that the gaze of the user 405 faces among the contents within the window. In an embodiment, the wearable device 401 may identify the gaze of the user 405 based on the images of the eyes of the user 405 obtained through the camera assembly 480. For example, the wearable device 401 may identify the gaze of the user 405 based on positions of irises of the eyes indicated by the images of the eyes of the user 405.

In operation 1440, the wearable device 401 may move the window to a determined second position. In an embodiment, the determined second position may be a position determined according to the operation 1430.

In an embodiment, the wearable device 401 may move the window from the first position to the second position based on translational transform. In an embodiment, the wearable device 401 may move the window from the first position to the second position based on the translational transform without scaling transform. In an embodiment, the translational transform may be moving the window so that a size of the window and a size of a content within the window are not changed in a three-dimensional virtual space 400.

For example, after the window is moved from the first position from the user 405 to the second position from the user 405, the input (e.g., a state in which the eyes are half-opened) for changing the position of the window may be released (e.g., a state in which the eyes are generally opened). However, the disclosure is not limited thereto. For example, the wearable device 401 may cease moving the window based on the movement of the window from the first position from the user 405 to the second position from the user 405 while the input for changing the position of the window is maintained. For example, the wearable device 401 may fix the window in a state positioned at the second position for a specified time even while the input for changing the position of the window is maintained.

Figure 15:
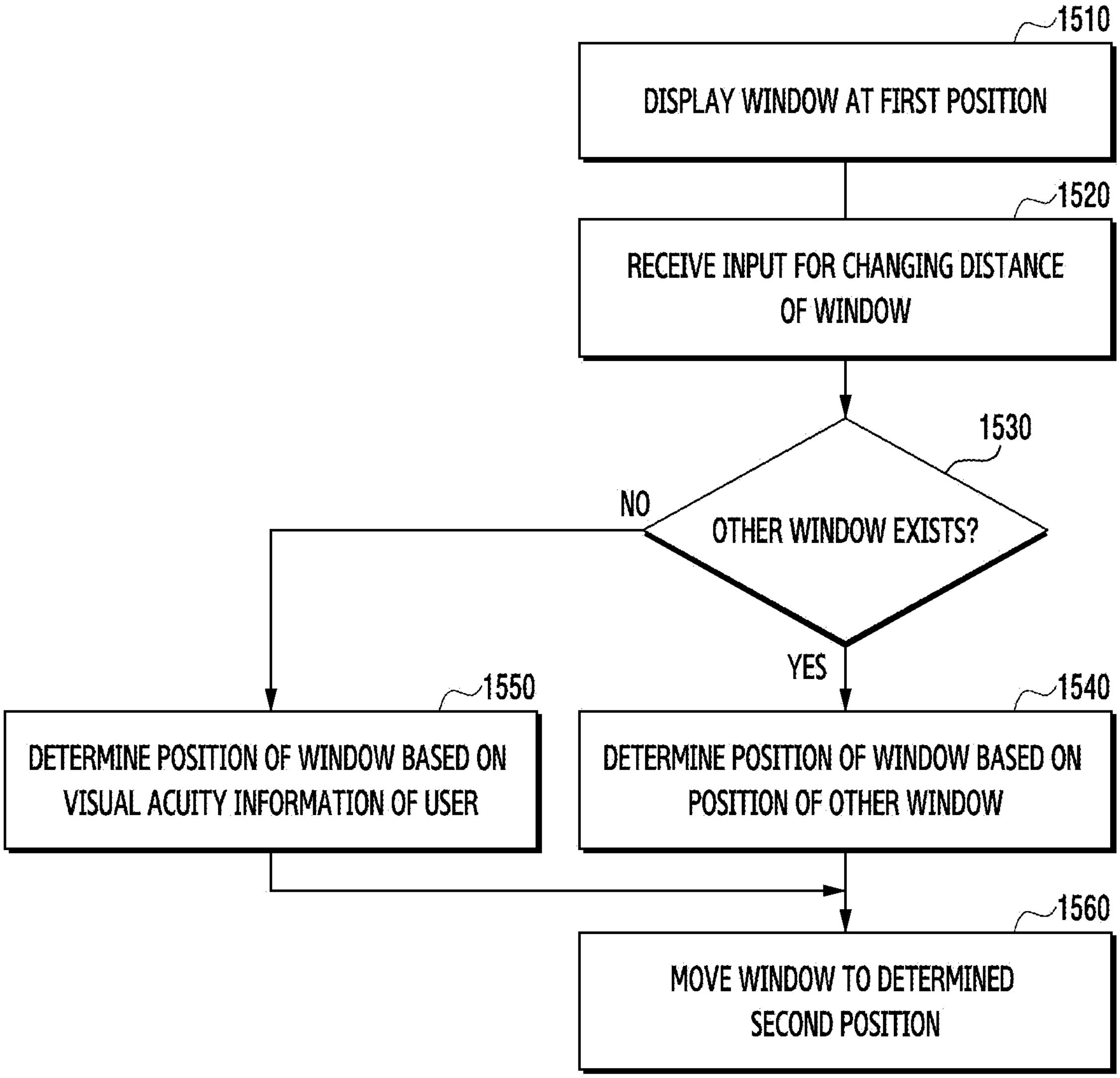
FIG. 15 is a flowchart illustrating an example operation of a wearable device according to various embodiments.

FIG. 15 is a flowchart illustrating an example operation of a wearable device 401 according to various embodiments.

FIG. 15 may be described with reference to FIGS. 4A to 11C. In an embodiment, operations 1510, 1520, 1550, and 1560 of FIG. 15 may correspond to the operations 1410, 1420, 1430, and 1440 of FIG. 14, respectively. Hereinafter, among descriptions of the operations 1510, 1520, 1550, and 1560 of FIG. 15, a description overlapping a description of the operations 1410, 1420, 1430, and 1440 of FIG. 14 may not be repeated.

Referring to FIG. 15, in operation 1510, a wearable device 401 may display a window at a first position. In operation 1520, the wearable device 401 may receive an input for changing a distance of the window.

In operation 1530, the wearable device 401 may determine whether another window exists. For example, the wearable device 401 may determine whether the other window exists in a direction in which the window is moved. For example, the wearable device 401 may determine whether the other window that will be aligned with the window exists in the direction in which the window is moved.

In operation 1530, based on determining that the other window exists, the wearable device 401 may perform an operation 1540. In operation 1530, based on determining that the other window does not exist, the wearable device 401 may perform the operation 1550.

In operation 1540, the wearable device 401 may determine a position of the window based on a position of the other window. In an embodiment, the wearable device 401 may determine a position at which the window is to be moved based on the position of the other window according to the input for changing the distance of the window. For example, the wearable device 401 may determine the position at which the window is to be moved so that a distance of the window from a user 405 is the same as a distance of the other window from the user 405.

In operation 1550, the wearable device 401 may determine the position of the window based on visual acuity information of the user 405.

In operation 1560, the wearable device 401 may move the window to a determined second position. In an embodiment, the determined second position may be one position among a position determined according to the operation 1540 or a position determined according to the operation 1550.

In an embodiment, in a case that the window is moved so that the window is aligned with the other window, the wearable device 401 may move the window from the first position to the second position based on translational transform. In an embodiment, in a case that the window is moved so that the window is aligned with the other window, the wearable device 401 may move the window from the first position to the second position based on the translational transform together with scaling transform for the window. In an embodiment, in a case that the window is moved so that the window is aligned with the other window, the wearable device 401 may move the window from the first position to the second position based on the translational transform together with scaling transform for contents within the window. In an embodiment, the translational transform may be moving the window so that a size of the window and a size of a content within the window are not changed in a three-dimensional virtual space 400.

For example, after the window is moved from the first position from the user 405 to the second position from the user 405, the input (e.g., a state in which the eyes are half-opened) for changing the position of the window may be released (e.g., a state in which the eyes are generally opened). However, the disclosure is not limited thereto. For example, the wearable device 401 may cease moving the window based on the movement of the window from the first position from the user 405 to the second position from the user 405 while the input for changing the position of the window is maintained. For example, the wearable device 401 may fix the window in a state positioned at the second position for a specified time even while the input for changing the position of the window is maintained.

Figure 16:
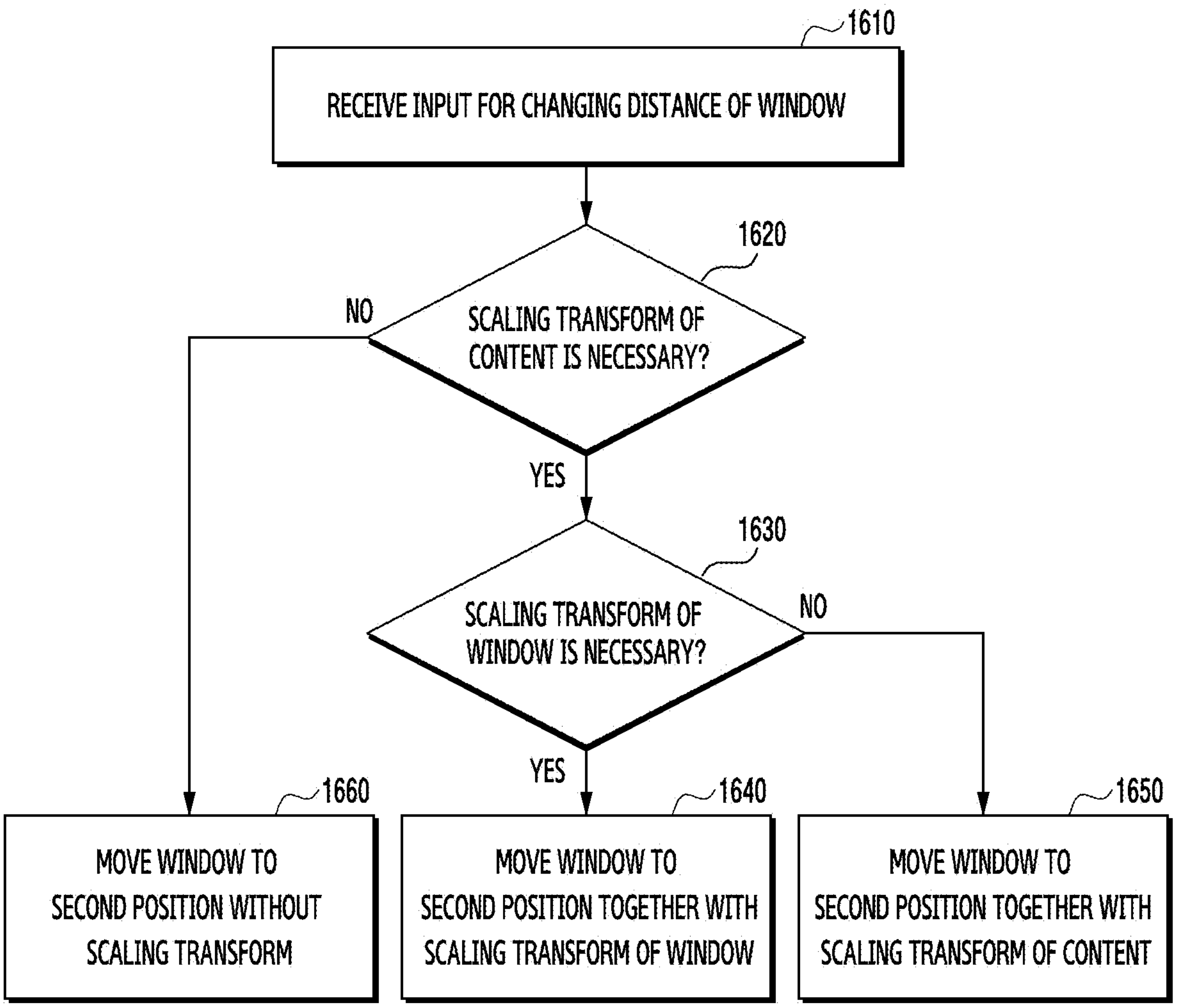
FIG. 16 is a flowchart illustrating an example operation of a wearable device according to various embodiments.

FIG. 16 is a flowchart illustrating an example operation of a wearable device 401 according to various embodiments.

FIG. 16 may be described with reference to FIGS. 4A to 11C. In an embodiment, an operation 1610 of FIG. 16 may correspond to the operation 1420 of FIG. 14. Hereinafter, among descriptions of the operation 1610 of FIG. 16, a description overlapping a description of the operations 1420 of FIG. 14 may not be repeated.

Referring to FIG. 16, in operation 1610, a wearable device 401 may receive an input for changing a distance of a window.

In operation 1620, the wearable device 401 may determine whether scaling transform of a content is necessary. In an embodiment, the wearable device 401 may determine that the scaling transform of the content is necessary based on determining that a display position of the window is not moved to a position corresponding to visual acuity information of a user 405, and that the window is aligned with another window. In an embodiment, in a case that the display position of the window is farther than the position corresponding to the visual acuity information of the user 405, the wearable device 401 may determine that a size of the content should be enlarged. In an embodiment, in a case that the display position of the window is closer than the position corresponding to the visual acuity information of the user 405, the wearable device 401 may determine that the size of the content should be reduced.

In operation 1620, based on determining that the scaling transform of the content is necessary, the wearable device 401 may perform an operation 1630. In operation 1620, based on determining the scaling transform of the content is not necessary, the wearable device 401 may perform an operation 1660.

In operation 1630, the wearable device 401 may determine whether scaling transform of the window is necessary.

In an embodiment, the wearable device 401 may determine that the scaling transform of the window is necessary, based on determining that a size of the window is different from a size of the other window. In an embodiment, the wearable device 401 may determine that the scaling transform of the window is necessary so that the size of the window is aligned with the size of the other window. In an embodiment, in a case that the size of the window is larger than the size of the other window, the wearable device 401 may determine that the size of the window should be reduced. In an embodiment, when the size of the window is smaller than the size of the other window, the wearable device 401 may determine that the size of the window should be enlarged. However, the disclosure is not limited thereto. For example, the wearable device 401 may determine that the scaling transform of the window is necessary based on determining that the display position of the window is not moved to the position corresponding to the visual acuity information of the user 405, and that the window is aligned with the other window. In an embodiment, in a case that the display position of the window is farther than the position corresponding to the visual acuity information of the user 405, the wearable device 401 may determine that the size of the window should be enlarged. In an embodiment, in a case that the display position of the window is closer than the position corresponding to the visual acuity information of the user 405, the wearable device 401 may determine that the size of the window should be reduced.

In operation 1630, based on determining that the scaling transform of the window is necessary, the wearable device 401 may perform an operation 1640. In operation 1630, based on determining the scaling transform of the window is not necessary, the wearable device 401 may perform an operation 1650.

In operation 1640, the wearable device 401 may move the window to a second position together with the scaling transform of the window. For example, the wearable device 401 may move the window to the second position together with the scaling transform of the window so that a size of a content within the window corresponds to a size of a content within the other aligned window. For example, the wearable device 401 may move the window to the second position together with the scaling transform of the window so that the size of the window corresponds to the size of the aligned other window.

In operation 1650, the wearable device 401 may move the window to the second position together with the scaling transform of the content. For example, the wearable device 401 may move the window to the second position together with the scaling transform of the content without the scaling transform of the window so that the size of the content within the window corresponds to the size of the content within the aligned other window.

In operation 1660, the wearable device 401 may move the window to the second position without scaling transform.

Figure 17:
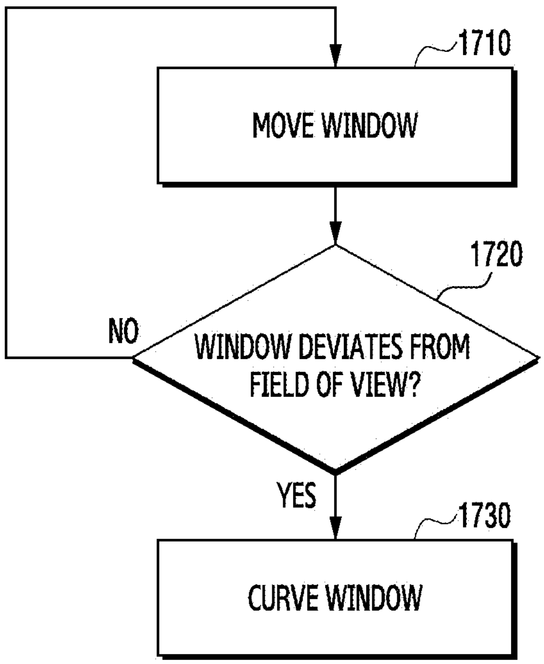
FIG. 17 is a flowchart illustrating an example operation of a wearable device according to various embodiments.

FIG. 17 is a flowchart illustrating an example operation of a wearable device 401 according to various embodiments.

FIG. 17 may be described with reference to FIGS. 4A to 11C. Operations of FIG. 17 may be performed together with the operation 1440 of FIG. 14, the operation 1560 of FIG. 15, and the operations 1640, 1650, and 1660 of FIG. 16.

Referring to FIG. 17, in operation 1710, a wearable device 401 may move a window.

In operation 1720, the wearable device 401 may determine whether the window deviates from a field of view. In an embodiment, as the window is moved toward a user 405, the wearable device 401 may identify whether the window is out of the field of view (e.g., 30 degrees left and right, 15 degrees up and down) of the user 405. For example, the window being out of the field of view of the user 405 may include a length of the window being longer than a length (or a length of a side opposite (or opposite the field of view) when the user 405 is a vertex) (e.g., a left-right length, or an up-down length) considering the field of view of the user 405.

In an embodiment, as the window is moved toward the user 405, the wearable device 401 may identify whether at least one side of sides of the window is out of the field of view of the user 405. For example, a side of the window being out of the field of view of the user 405 may include the side of the window being out of a boundary (or a limit) of the field of view centered on a gaze of the user 405.

In operation 1720, based on determining that the window is out of the field of view, the wearable device 401 may perform operation 1730. In operation 1720, based on determining that the window is not out of the field of view, the wearable device 401 may perform operation 1710.

In operation 1730, the wearable device 401 may curve the window.

In an embodiment, the wearable device 401 may curve the window so that the sides of the window are not out of the field of view based on identifying that the sides of the window are out of the field of view. In an embodiment, the wearable device 401 may curve at least one side of the sides based on identifying that the window is out of the field of view of the user 405. In an embodiment, the wearable device 401 may curve at least one side of the sides according to a specified curvature based on identifying that the window is out of the field of view of the user 405. In an embodiment, the specified curvature may be determined based on a size of the window, a length of a side of the window, and/or a size of a content within the window. In an embodiment, the specified curvature may be determined based on visual acuity information of the user 405.

In an embodiment, a layout of a content within a curved window may be the same as a layout of a content within the window. For example, a size (e.g., a font size) of the content within the curved window may be the same as a size (e.g., a font size) of the content within the window.

The technical problems addressed in the present disclosure are not limited to those described above, and other technical problems not mentioned herein will be clearly understood by those having ordinary knowledge in the art to which the present disclosure belongs.

As described above, according to an example embodiment, a wearable device may comprise a display assembly including displays arranged directly to eyes of a user, based on the user wearing the wearable device, at least one processor comprising processing circuitry, and memory, comprising one or more storage mediums, storing instructions. The instructions, when executed by the at least one processor individually or collectively, may cause the wearable device to: display a virtual window including at least one content at a position at a first distance from the user based on a gaze of the user on the display assembly; receive an input for changing a distance between the user and the virtual window; while receiving the input, based on changing the distance between the user and the virtual window from the first distance, identify that a size of the at least one content included in the virtual window at a second distance of the virtual window from the user, changed from the first distance, corresponds to visual acuity information of the user from the gaze of the user; and based on identifying the second distance of the virtual window based on the visual acuity information, cease changing the distance between the user 405 and the virtual window according to the input being received.

The instructions, when executed by the at least one processor individually or collectively, may cause the wearable device to: identify a specified gesture by the eyes through the images of the eyes; and identify the specified gesture as the input for changing the distance of the virtual window.

The instructions, when executed by the at least one processor individually or collectively, may cause the wearable device to: while changing the distance of the virtual window from the first distance, identify that a third distance of the virtual window, changed from the first distance, corresponds to a distance of another virtual window; and cease changing the distance of the virtual window according to the input being received, based on identifying the third distance corresponding to the distance of the other virtual window.

The instructions, when executed by the at least one processor individually or collectively, may cause the wearable device to: while changing the distance of the virtual window from the first distance, change a size of the virtual window from a first size to a second size corresponding to the size of the other virtual window such that the size of the virtual window corresponds to the size of the virtual window at the third distance.

The instructions, when executed by the at least one processor individually or collectively, may cause the wearable device to: after ceasing changing the distance of the virtual window for a specified time, according to the input being received, change the distance of the virtual window from the third distance; and change the size of the virtual window from the second size to the first size based on changing the distance of the virtual window from the third distance.

The instructions, when executed by the at least one processor individually or collectively, may cause the wearable device to: while changing the distance of the virtual window from the first distance, change a size of a content within the virtual window from a first size to a second size corresponding to the size of the another content within the other virtual window without changing the size of the virtual window at the third distance, such that the size of the content within the virtual window corresponds to the size of the other content within the virtual window.

The instructions, when executed by the at least one processor individually or collectively, may cause the wearable device to: after ceasing changing the distance of the virtual window for a specified time, according to the input being received, change the distance of the virtual window 820 from the third distance; and based on changing the distance of the virtual window from the third distance, change the size of the content within the virtual window from the second size to the first size without changing the size of the virtual window.

The second distance corresponding to the visual acuity information may include a distance that allows the size of the virtual window seen to the user to have a size resolvable by the user.

The second distance corresponding to the visual acuity information may include a distance that allows a size of a content that the gaze of the user is directed to among a plurality of contents within the virtual window to have a size resolvable by the user.

The second distance corresponding to the visual acuity information may include a distance that allows a size of the smallest content among a plurality of contents within the virtual window to have a size resolvable by the user.

The virtual window may be a two-dimensional plane window. The instructions, when executed by the at least one processor individually or collectively, may cause the wearable device to, while receiving the input, based on changing the distance of the virtual window from the first distance, change a curvature of the virtual window from a first curvature to a second curvature corresponding to the visual acuity information of the user.

The instructions, when executed by the at least one processor individually or collectively, may cause the wearable device to: receive another input for displaying the virtual window; identify the size of the virtual window based on receiving the other input; and display the virtual window using the first distance corresponding to the size of the virtual window within a distance range corresponding to the visual acuity information of the user.

As described above, according to an example embodiment, a method may be performed by a wearable device including a display assembly including displays arranged directly to eyes of a user, based on the user wearing the wearable device. The method may comprise: displaying a virtual window including at least one content at a position at a first distance from the user based on a gaze of the user on the display assembly; receiving an input for changing a distance between the user and the virtual window; while receiving the input, based on changing the distance between the user and the virtual window from the first distance, identifying that a size of the at least one content included in the virtual window at a second distance of the virtual window from the user, changed from the first distance, corresponds to visual acuity information of the user from the gaze of the user; and based on identifying the second distance of the virtual window based on the visual acuity information, ceasing changing the distance between the user and the virtual window according to the input being received.

The method may comprise identifying a specified gesture by the eyes through images of the eyes obtained through a camera assembly including cameras configured to obtain the images of the eyes of the user based on the user wearing the wearable device; and identifying the specified gesture as the input for changing the distance of the virtual window.

The method may comprise: while changing the distance of the virtual window from the first distance, identifying that a third distance of the virtual window, changed from the first distance, corresponds to a distance of another virtual window; and changing the distance of the virtual window according to the input being received, based on identifying the third distance corresponding to the distance of the other virtual window.

The method may comprise: while changing the distance of the virtual window from the first distance, changing a size of the virtual window from a first size to a second size corresponding to the size of the other virtual window such that the size of the virtual window corresponds to the size of the virtual window at the third distance.

The method may comprise: after ceasing changing the distance of the virtual window for a specified time, according to the input being received, changing the distance of the virtual window from the third distance; and changing the size of the virtual window from the second size to the first size based on changing the distance of the virtual window from the third distance.

The method may comprise: while changing the distance of the virtual window from the first distance, changing a size of a content within the virtual window from a first size to a second size corresponding to the size of the another content within the other virtual window without changing the size of the virtual window at the third distance, such that the size of the content within the virtual window corresponds to the size of the other content within the virtual window.

The method may comprise: after ceasing changing the distance of the virtual window for a specified time, according to the input being received, changing the distance of the virtual window from the third distance; and based on changing the distance of the virtual window from the third distance, changing the size of the content within the virtual window from the second size to the first size without changing the size of the virtual window.

The virtual window may be a two-dimensional plane window. The method may comprise, while receiving the input, based on changing the distance of the virtual window from the first distance, changing a curvature of the virtual window from a first curvature to a second curvature corresponding to the visual acuity information of the user.

As described above, a non-transitory computer-readable storage medium may store a program including instructions. The instructions, when executed by at least one processor, comprising processing circuitry, individually or collectively of a wearable device comprising a display assembly including displays arranged directly to eyes of a user, based on the user wearing the wearable device, may cause the wearable device to: display a virtual window including at least one content at a position at a first distance from the user based on a gaze of the user on the display assembly; receive an input for changing a distance between the user and the virtual window; while receiving the input, based on changing the distance between the user 405 and the virtual window from the first distance, identify that a size of the at least one content included in the virtual window at a second distance of the virtual window from the user, changed from the first distance, corresponds to visual acuity information of the user 405 from the gaze of the user; and based on identifying the second distance of the virtual window based on the visual acuity information, cease changing the distance between the user and the virtual window according to the input being received.

The effects that may be obtained from the present disclosure are not limited to those described above, and any other effects not mentioned herein will be clearly understood by those having ordinary knowledge in the art to which the present disclosure belongs.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” or “connected with” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modifications, alternatives and/or variations of the various example embodiments may be made without departing from the true technical spirit and full technical scope of the disclosure, including the appended claims and their equivalents. It will also be understood that any of the embodiment(s) described herein may be used in conjunction with any other embodiment(s) described herein.

What is claimed is:

1. A wearable device comprising:

a display assembly including displays arranged directly to eyes of a user, based on the user wearing the wearable device, at least one processor comprising processing circuitry; and memory, comprising one or more storage mediums, storing instructions, wherein, the instructions, when executed by the at least one processor individually or collectively, cause the wearable device to:

display a virtual window including at least one content at a position at a first distance from the user based on a gaze of the user on the display assembly, receive an input for changing a distance between the user and the virtual window, determine whether another virtual window is displayed with the virtual window, in accordance with determination that the other virtual window is not displayed:

while receiving the input, based on changing the distance between the user and the virtual window from the first distance, identify that a size of the at least one content-perceived by the user at a second distance from the user, corresponds to visual acuity information of the user, and based on identifying that the distance between the user and the virtual window corresponds to the second distance of the virtual window, cease changing the distance between the user and the virtual window according to the input being received, and in accordance with determination that the other virtual window is displayed:

while receiving the input, based on changing the distance between the user and the virtual window from the first distance, identify that the distance between the user and the virtual window corresponds to a third distance of the other virtual window from the user, and based on identifying that the distance between the user and the virtual window corresponds to the third distance of the other virtual window, cease changing the distance between the user and the virtual window according to the input being received.

2. The wearable device of claim 1, comprising:

a camera assembly including at least one camera configured to obtain images of the eyes of the user based on the user wearing the wearable device, wherein the instructions, when executed by the at least one processor individually or collectively, cause the wearable device to:

identify a specified gesture by the eyes through the images of the eyes, and identify the specified gesture as the input for changing the distance of the virtual window.

3. The wearable device of claim 1, wherein the instructions, when executed by the at least one processor individually or collectively, cause the wearable device to:

while changing the distance of the virtual window from the first distance, change a size of the virtual window from a first size to a second size corresponding to a size of the other virtual window such that the size of the virtual window corresponds to the size of the virtual window at the third distance.

4. The wearable device of claim 3, wherein the instructions, when executed by the at least one processor individually or collectively, cause the wearable device to:

based on identifying that the input is received continuously after changing the distance between the user and the virtual window is ceased, resume changing the distance between the user and the virtual window from the third distance to a fourth distance, and change the size of the virtual window from the second size to the first size based on changing the distance of the virtual window from the third distance to the fourth distance.

5. The wearable device of claim 1, wherein the instructions, when executed by the at least one processor individually or collectively, cause the wearable device to:

while changing the distance of the virtual window from the first distance, change a size of a content within the virtual window from a first size to a second size corresponding to a size of another content within the other virtual window without changing the size of the virtual window at the third distance, such that the size of the content within the virtual window corresponds to the size of the other content within the other virtual window.

6. The wearable device of claim 5, wherein the instructions, when executed by the at least one processor individually or collectively, cause the wearable device to:

based on identifying that the input is received continuously after changing the distance between the user and the virtual window is ceased, resume changing the distance between the user and the virtual window from the third distance to a fourth distance, and change the size of the content within the virtual window from the second size to the first size without changing the size of the virtual window, based on changing the distance of the virtual window from the third distance to the fourth distance.

7. The wearable device of claim 1, wherein the second distance corresponding to the visual acuity information includes a distance that allows the size of the virtual window seen to the user to have a size resolvable by the user.

8. The wearable device of claim 1, wherein the second distance corresponding to the visual acuity information includes a distance that allows a size of a content that the gaze of the user is directed to among a plurality of contents within the virtual window to have a size resolvable by the user.

9. The wearable device of claim 1, wherein the second distance corresponding to the visual acuity information includes a distance that allows a size of the smallest content among a plurality of contents within the virtual window to have a size resolvable by the user.

10. The wearable device of claim 1, wherein the virtual window is a two-dimensional plane window, and wherein the instructions, when executed by the at least one processor individually or collectively, cause the wearable device to:

while receiving the input, based on changing the distance of the virtual window from the first distance:

change a curvature of the virtual window from a first curvature to a second curvature corresponding to the visual acuity information of the user.

11. The wearable device of claim 1, wherein the instructions, when executed by the at least one processor individually or collectively, cause the wearable device to:

receive another input for displaying the virtual window, identify the size of the virtual window based on receiving the other input, and display the virtual window using the first distance corresponding to the size of the virtual window within a distance range corresponding to the visual acuity information of the user.

12. A method performed by a wearable device including a display assembly including displays arranged directly to eyes of a user, based on the user wearing the wearable device, the method comprising:

displaying a virtual window including at least one content at a position at a first distance from the user based on a gaze of the user on the display assembly, receiving an input for changing a distance between the user and the virtual window, determining whether another virtual window is displayed with the virtual window, in accordance with determination that the other virtual window is not displayed:

while receiving the input, based on changing the distance between the user and the virtual window from the first distance, identifying that a size of the at least one content perceived by the user at a second distance from the user, corresponds to visual acuity information of the user, and based on identifying that the distance between the user and the virtual window corresponds to the second distance of the virtual window, ceasing changing the distance between the user and the virtual window according to the input being received, and in accordance with determination that the another virtual window is displayed:

while receiving the input, based on changing the distance between the user and the virtual window from the first distance, identifying that the distance between the user and the virtual window corresponds to a third distance of the other virtual window from the user, and based on identifying that the distance between the user and the virtual window corresponds to the third distance of the other virtual window, ceasing changing the distance between the user and the virtual window according to the input being received.

13. The method of claim 12, comprising:

identifying a specified gesture by the eyes through images of the eyes obtained through a camera assembly including cameras configured to obtain images of the eyes of the user based on the user wearing the wearable device, and identifying the specified gesture as the input for changing the distance of the virtual window.

* * * * *